US012745192B2

(12) United States Patent
Fahim et al.

(10) Patent No.: US 12,745,192 B2
(45) Date of Patent: Sep. 22, 2026

(54) EMBEDDED SENSORS AND SYSTEMS EXPLOITING EMBEDDED SENSORS

(71) Applicant: GIATEC SCIENTIFIC INC., Nepean (CA)

(72) Inventors: Andrew Fahim, Ottawa (CA); Rouhollah Alizadeh, Nepean (CA); Pouria Ghods, Gloucester (CA); Mustafa Salehi, Nepean (CA); Sarah De Carufel, Ottawa (CA)

(73) Assignee: Giatec Scientific Inc., Nepean (CA)

( * ) Notice: Subject to any disclaimer, the term of this patent is extended or adjusted under 35 U.S.C. 154(b) by 447 days.

(21) Appl. No.: 18/263,660

(22) PCT Filed: Feb. 1, 2022

(86) PCT No.: PCT/CA2022/050141
§ 371 (c)(1),
(2) Date: Jul. 31, 2023

(87) PCT Pub. No.: WO2022/160069
PCT Pub. Date: Aug. 4, 2022

(65) Prior Publication Data

US 2024/0073831 A1 Feb. 29, 2024

Related U.S. Application Data

(60) Provisional application No. 63/199,901, filed on Feb. 1, 2021.

(51) Int. Cl.
*G08C 17/00* (2006.01)
*H04W 52/36* (2009.01)

(52) U.S. Cl.
CPC ....... *H04W 52/367* (2013.01); *H04W 52/362* (2013.01)

(58) Field of Classification Search
CPC ..... H04W 52/362; H04W 4/80; H04W 84/18; H04W 52/02; H04W 52/0216; H04W 84/12; H04W 52/0229
See application file for complete search history.

(56) References Cited

U.S. PATENT DOCUMENTS 9,782,302 B2 10/2017 Johnson et al.
10,999,269 B2 5/2021 Bicket et al.
(Continued)

FOREIGN PATENT DOCUMENTS

WO 2020198872 A1 10/2020

*Primary Examiner* — Phuongchau Ba Nguyen
(74) *Attorney, Agent, or Firm* — Rosenberg, Klein & Lee

(57) ABSTRACT

Some construction materials are chemically active materials, e.g., concrete, requiring analysis to determine structural properties and physical-mechanical properties. Increasing industry demands for cost reductions, profitability, tighter construction deadlines etc. whilst limiting potential liabilities would benefit from embedded sensors to monitor and assess the material life cycle from initial deployment through to its current and future performance. Embodiments of the invention provide for embedded sensors with low power consumption whilst supporting communications to external devices with position within the infrastructure/construction material positional tolerance with low overhead data retrieval. Embodiments of the invention support automated self-contained data acquisition/logging modules for use throughout life cycle points.

10 Claims, 27 Drawing Sheets

(56) References Cited

U.S. PATENT DOCUMENTS

2007/0093974 A1* 4/2007 Hoogenboom ......... G06F 16/95
707/E17.107
2016/0127172 A1* 5/2016 Shaw .................. H04L 41/0806
709/223
2017/0108456 A1* 4/2017 Alizadeh .............. G01N 27/021
2017/0116846 A1* 4/2017 Wengrovitz ...... H04M 1/72412
2020/0329341 A1* 10/2020 Kuber .................. H04B 17/318
2021/0141351 A1* 5/2021 Yang ....................... H04L 67/12
2022/0107251 A1* 4/2022 Ghods .................... G01N 3/066

* cited by examiner

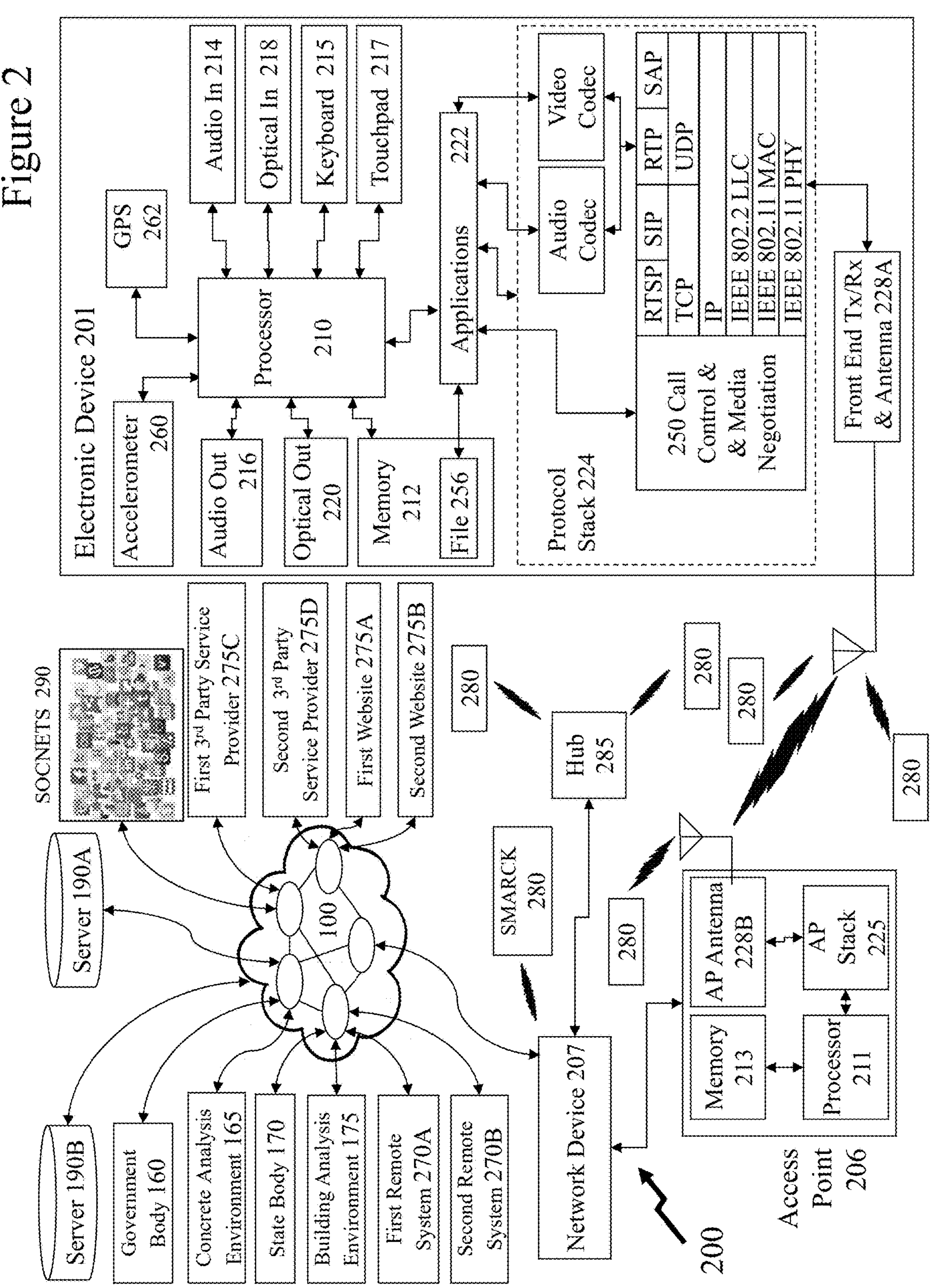
Figure 2
Electronic Device 201
GPS 262
Audio In 214
Optical In 218
Keyboard 215
Touchpad 217
Accelerometer 260
Processor 210
Applications 222
Audio Out 216
Optical Out 220
Memory 212
File 256
Video Codec
Audio Codec
RTSP
SIP
RTP
SAP
TCP
UDP
IP
IEEE 802.2 LLC
IEEE 802.11 MAC
IEEE 802.11 PHY
250 Call Control & Media Negotiation
Protocol Stack 224
Front End Tx/Rx & Antenna 228A
SOCNETS 290
First 3rd Party Service Provider 275C
Second 3rd Party Service Provider 275D
First Website 275A
Second Website 275B
Server 190A
100
280
Hub 285
SMARCK 280
Server 190B
Government Body 160
Concrete Analysis Environment 165
State Body 170
Building Analysis Environment 175
First Remote System 270A
Second Remote System 270B
Network Device 207
AP Antenna 228B
AP Stack 225
Memory 213
Processor 211
Access Point 206
200

590
570
580
540
510
520
530
550
720
710
730

MEMS 140
Control Circuit 510
Wireless Transceiver520
Battery 530
Sensors 550
740
750
745

760
760
520
530
510

520
510
530
770
780
790

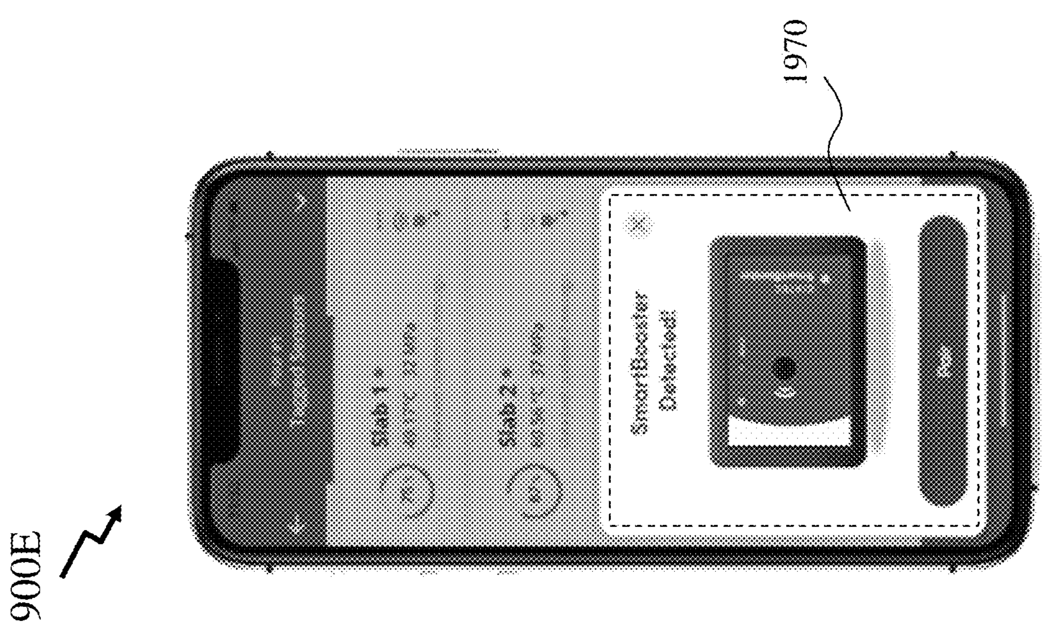
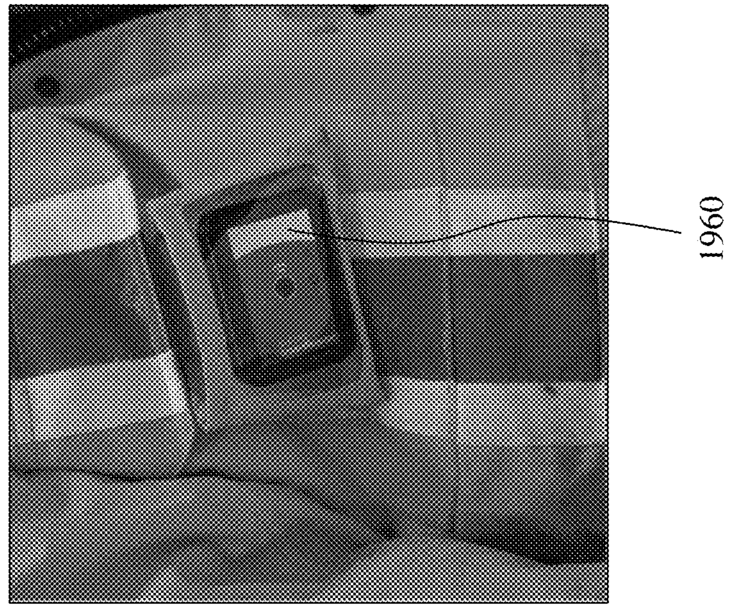
Figure 19B

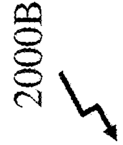
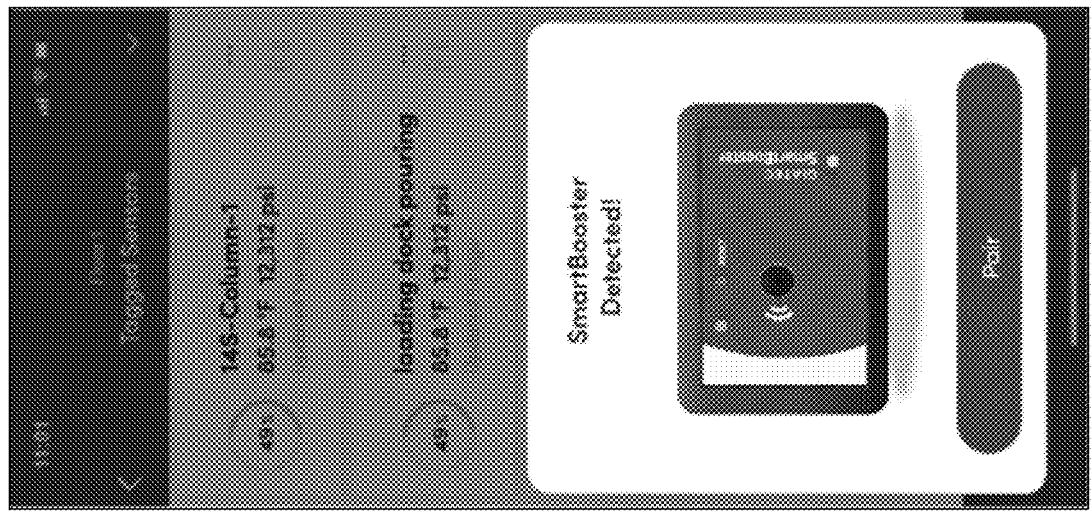
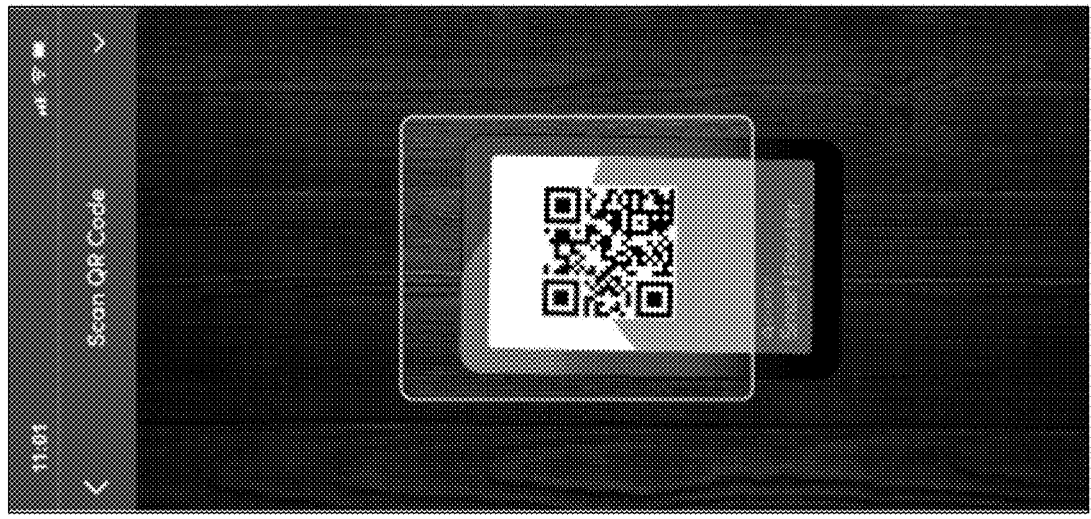
Figure 20

2300B
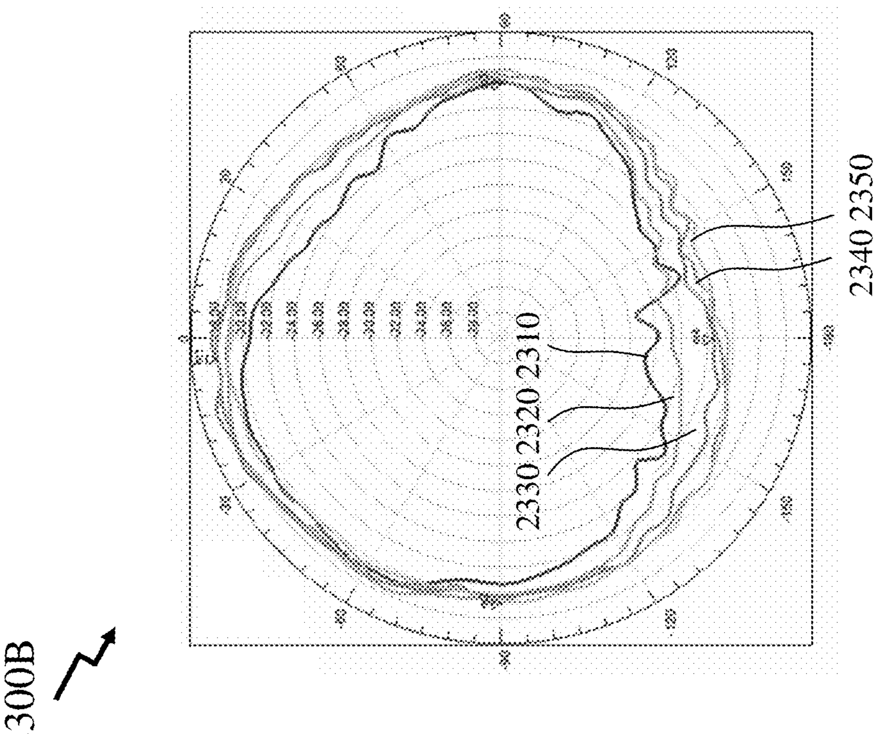
2300A
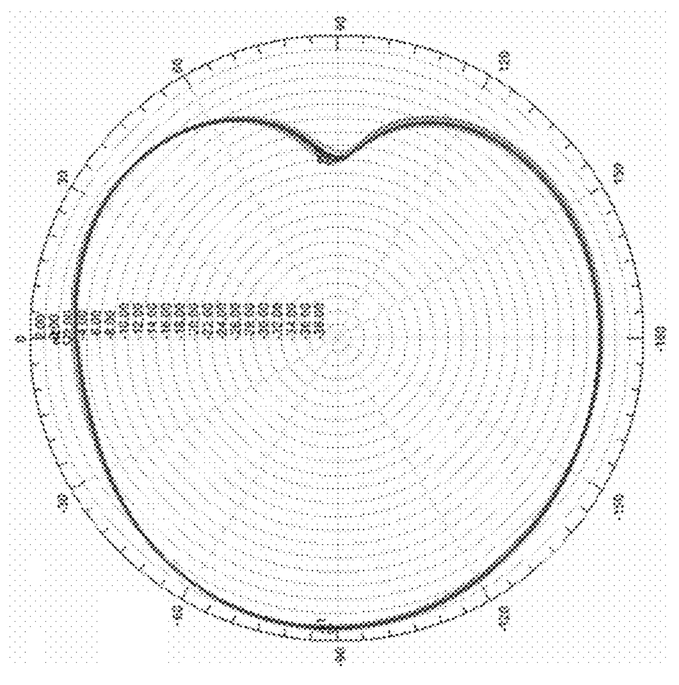
Figure 23

EMBEDDED SENSORS AND SYSTEMS EXPLOITING EMBEDDED SENSORS

CROSS-REFERENCE TO RELATED APPLICATIONS

This patent application claims the benefit of priority from World Intellectual Property Organization Patent Application PCT/CA2022/050141 filed Feb. 1, 2022; which itself claims the benefit of priority from U.S. Provisional Patent Application 63/199,901 filed Feb. 1, 2021; the entire contents of each being incorporated herein by reference.

FIELD OF THE INVENTION

This patent application relates to embeddable sensors and more particularly to the design of antennas for wireless communications within the embeddable sensors, protocols for wireless communications from the embeddable sensors to and from external devices, and repeaters/boosters for use in communication to and from embedded sensors.

BACKGROUND OF THE INVENTION

Globally, the construction industry output is forecast to rise from US$10.8 trillion in 2017 to US$12.9 trillion in 2022. A wide variety of materials are employed within the construction industry of which some are chemically active materials, e.g., concrete, that often need to be analyzed so as to determine the structural properties parameters, particularly strength and other physical-mechanical properties of the final cured product, such as its potential for shrinkage. With increasing demands for cost reductions, profitability, tighter construction deadlines and potential liabilities construction companies, raw material suppliers, infrastructure owners, etc. are seeking to exploit embedded sensors within these construction materials to allow for assessment of initial deployment of the construction material as well as its subsequent properties to provide these parties and/or other parties with data relating to the current and future performance of the construction material.

Accordingly, it would be beneficial to provide construction companies, engineering companies, infrastructure owners, regulators, etc. with means to automated testing/characterization of construction materials during one or more stages of its life cycle from manufacture, transportation, initial deployment, early infrastructure life and subsequent extended infrastructure life. It would be further beneficial for such automated methods to exploit self-contained data acquisition/logging modules allowing them to be employed with ease throughout these different life cycle points. Accordingly, it would be beneficial for the embedded sensors to have low power consumption, support communications to external devices with tolerance to their position within the infrastructure/construction material, and allow data to be retrieved from them with low overhead.

Other aspects and features of the present invention will become apparent to those ordinarily skilled in the art upon review of the following description of specific embodiments of the invention in conjunction with the accompanying figures.

SUMMARY OF THE INVENTION

It is an object of the present invention to mitigate limitations within the prior art relating to embeddable sensors and more particularly to the design of antennas for wireless communications within the embeddable sensors, protocols for wireless communications from the embeddable sensors to and from external devices, and repeaters/boosters for use in communication to and from embedded sensors.

In accordance with an embodiment of the invention there is provided a system comprising: a gateway connected to a network;

a server connected to the network;

a plurality of sensors, each sensor embedded within a construction material; wherein the gateway communicates with the network with a first wireless protocol;

each sensor of the plurality of sensors communicates with the gateway with a second wireless protocol.

In accordance with an embodiment of the invention there is provided a process comprising:

a) transmitting data from a sensor to a gateway upon a first wireless link operating according to a first wireless protocol, wherein the gateway relays the data to a remote server;
b) determining whether the sensor established a link with the gateway;
c) upon a positive determination executing a first process upon the sensor; and
d) upon a negative determination executing a second process upon the sensor.

In accordance with an embodiment of the invention there is provided a process comprising:

a) transmitting first data from a sensor to a gateway upon a first wireless link operating according to a first wireless protocol;
b) determining whether the sensor is authenticated with the gateway;
c) upon a positive determination executing resetting a counter to zero and executing a first process upon the sensor from a first step of the first process; and
d) upon a negative determination executing a first sequence comprising the steps of:
e) incrementing the counter;
f) determining whether the counter has exceeded a threshold value or not;
g) upon a positive determination executing the first process upon the sensor from a second step of the first process;
h) upon a negative determination executing a second process upon the sensor.

In accordance with an embodiment of the invention there is provided a process comprising:

a) transmitting first data from a sensor to a gateway with a transmitter operating according to a wireless protocol at an initial output power;
b) determining whether the sensor has established a first wireless link with the gateway;
c) upon a positive determination storing a new initial output power where the new initial output power is the initial output power reduced by a first predetermined power offset and stopping the process;
d) upon a negative determination executing a process comprising the steps of:
   e) establishing an initial value of a counter to one;
   f) incrementing the output power of the transmitter to a new output power where the new output power is the initial output power plus a value established in dependence upon the counter and a second predetermined power offset;

g) transmitting second data from a sensor to a gateway with a transmitter operating according to a wireless protocol at the new output power;

h) determining whether the sensor has established the first wireless link with the gateway;

i) upon a positive determination storing the new initial output power where the new initial output power is the new output power reduced by a first predetermined power offset and stopping the process;

j) upon a negative determination establishing whether the new output power is equal to or greater than a maximum output power;

k) upon a positive determination that the new output power is equal to or greater than the maximum output power storing the new initial output power where the new initial output power is the new output power reduced by a first predetermined power offset and stopping the process;

l) upon a negative determination that the new output power is equal to or greater than the maximum output power incrementing the counter by one and proceeding to step f).

In accordance with an embodiment of the invention there is provided a process comprising:

a) tagging a sensor with an electronic device to acquire data relating to the sensor;

b) establishing a first wireless link according to a first wireless protocol between the sensor and the electronic device in dependence upon the data acquired through tagging;

c) determining whether the sensor supports a second wireless protocol in dependence upon the data acquired through tagging;

d) upon a positive determination transmitting to a database stored upon a remote server an identity of the sensor established in dependence upon the data acquired through tagging;

e) monitoring by a gateway the database;

f) acquiring by the gateway the identity of the sensor from the database; and g) authenticating the sensor with the gateway in dependence upon communications between the sensor and the gateway according to the second wireless protocol; wherein the first wireless protocol is different to the second wireless protocol.

In accordance with an embodiment of the invention there is provided a device comprising:

a control circuit;

an RF circuit coupled to an antenna for receiving an output of a RF generator and generating a signal to be coupled to the antenna; wherein the RF circuit comprises at least a tunable matching network coupled to the control circuit; and the control circuit establishes the setting of the tunable matching network.

In accordance with an embodiment of the invention there is provided a device comprising:

an interface operating according to a first protocol for receiving first data from an electronic device;

a controller for receiving the first data and generating second data in dependence thereon;

a first wireless transceiver operating according to a second protocol coupled to the controller for transmitting the second data via an antenna.

Other aspects and features of the present invention will become apparent to those ordinarily skilled in the art upon review of the following description of specific embodiments of the invention in conjunction with the accompanying figures.

BRIEF DESCRIPTION OF THE DRAWINGS

Embodiments of the present invention will now be described, by way of example only, with reference to the attached Figures, wherein:

FIG. 2 depicts an exemplary electronic device supporting communications both to a network such as depicted in FIG. 1 and with embedded sensors according to and supporting embodiments of the invention;

FIG. 19B depicts an exemplary embodiment of a booster/repeater assembly according to embodiments of the invention together with a software application screen rendered to a user upon detection of a booster/repeater assembly according to embodiments of the invention;

FIG. 20 depicts exemplary screenshots of a software application for tagging and associating a booster/repeater assembly with a smartphone according to an embodiment of the invention;

FIG. 23 depicts radiation patterns for a custom antennae within embedded sensors according to embodiments of the invention in air and as a function of battery thickness;

DETAILED DESCRIPTION

Figure 1:
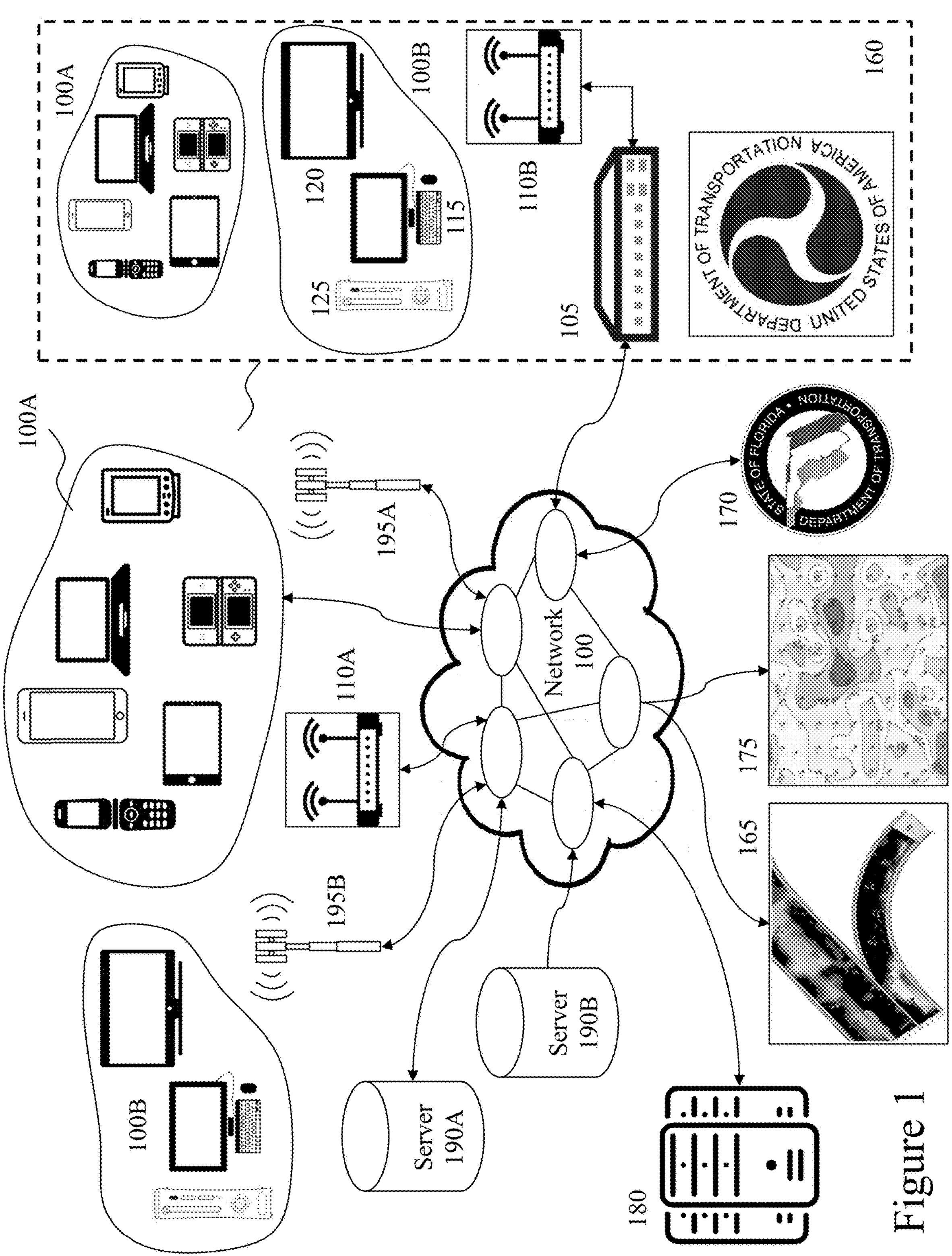
FIG. 1 depicts an exemplary network environment within which embedded sensors can be employed according to and supporting embodiments of the invention may be deployed and operate.

The present invention is directed to embeddable sensors and more particularly to the design of antennas for wireless communications within the embeddable sensors, protocols for wireless communications from the embeddable sensors to and from external devices, and repeaters/boosters for use in communication to and from embedded sensors.

The ensuing description provides representative embodiment(s) only, and is not intended to limit the scope, applicability, or configuration of the disclosure. Rather, the ensuing description of the embodiment(s) will provide those skilled in the art with an enabling description for implementing an embodiment or embodiments of the invention. It being understood that various changes can be made in the function and arrangement of elements without departing from the spirit and scope as set forth in the appended claims. Accordingly, an embodiment is an example or implementation of the inventions and not the sole implementation. Various appearances of "one embodiment," "an embodiment" or "some embodiments" do not necessarily all refer to the same embodiments. Although various features of the invention may be described in the context of a single embodiment, the features may also be provided separately or in any suitable combination. Conversely, although the invention may be described herein in the context of separate embodiments for clarity, the invention can also be implemented in a single embodiment or any combination of embodiments.

Reference in the specification to "one embodiment," "an embodiment," "some embodiments" or "other embodiments" means that a particular feature, structure, or characteristic described in connection with the embodiments is included in at least one embodiment, but not necessarily all embodiments, of the inventions. The phraseology and terminology employed herein is not to be construed as limiting but is for descriptive purposes only. It is to be understood that where the claims or specification refer to "a" or "an" element, such reference is not to be construed as there being only one of that element. It is to be understood that where the specification states that a component feature, structure, or characteristic "may," "might," "can" or "could" be included, that particular component, feature, structure, or characteristic is not required to be included.

Reference to terms such as "left," "right," "top," "bottom," "front" and "back" are intended for use in respect to the orientation of the particular feature, structure, or element within the figures depicting embodiments of the invention. It would be evident that such directional terminology with respect to the actual use of a device has no specific meaning as the device can be employed in a multiplicity of orientations by the user or users.

Reference to terms "including," "comprising," "consisting," and grammatical variants thereof do not preclude the addition of one or more components, features, steps, integers, or groups thereof and that the terms are not to be construed as specifying components, features, steps, or integers. Likewise, the phrase "consisting essentially of," and grammatical variants thereof, when used herein is not to be construed as excluding additional components, steps, features integers or groups thereof but that the additional features, integers, steps, components, or groups thereof do not materially alter the basic and novel characteristics of the claimed composition, device, or method. If the specification or claims refer to "an additional" element, that does not preclude there being more than one of the additional element.

An "electrical receptacle" as used herein and throughout this disclosure, refers to, but is not limited to a housing design designed to be inserted into a work box/electrical utility work box and connected to one or more electrical cables providing power distribution/signal distribution within the environment exploiting embodiments of the invention which may for example be residential, commercial, industrial, entertainment and retail. An electrical receptacle may be manufactured with a predetermined function, e.g., electrical outlet or lighting switch, or it may be configurable as described below in respect of embodiments of the invention.

An electrical receptacle may include, but not be limited to, simplex, duplex, commercial grade, residential (decorator) grade, hospital grade, ground fault circuit interrupter (GFCI), surge protective, arc fault circuit interrupter (AFCI), and tamper resistant. Electrical receptacles may be 110V/120V, 220V/230V/240V, 50 Hz, 60 Hz, 5 A, 6 A, 10 A, 13 A, 15 A, polarized, unpolarised, earthed, fused, ground fault interrupted and arc circuit interrupted. Typically, the electrical receptacle will include a retention means for fastening a faceplate onto the electrical receptacle covering the exposed portions of the electrical receptacle/electrical utility work box.

A "work box" or "electrical utility work box" as used herein and throughout this disclosure, refer to, but is not limited to, the housing that an electrical receptacle is assembled into. As such a work box can include so-called handy box, junction box, new work boxes, old work boxes, outdoor boxes, standard rectangular boxes, square boxes, circular or octagonal boxes, and ceiling boxes. A work box may be formed from metal, plastic, or PVC. Some electrical utility work boxes are defined as being 1-gang/2-gang/3-gang/4-gang etc. which defines the width such that they may contain multiple electrical receptacles as a typical electrical power outlet or electrical switch is 1-gang wide (i.e., they can be ganged together within the work box).

An "electrical outlet" as used herein and throughout this disclosure, refer to, but is not limited to, an electrical receptacle that is configured for providing electrical power, typically at so-called "mains" voltage being that supplied to the environment the outlet is deployed within by the electrical distribution network. As such the "mains" voltage is defined by region/country globally. Electrical receptacles may be 110V/120V, 220V/230V/240V, 50 Hz, 60 Hz, 5 A, 6 A, 10 A, 13 A, 15 A, polarized, unpolarised, earthed, fused, employ insulated pins, have an even number of pins, and have an odd or even number of pins etc. and employ ground fault and/or arc fault interrupter circuits that trigger under predetermined conditions to disable the outlet until the fault is corrected and the circuit reset. However, electrical outlets may provide DC power or AC power at a different current and/or voltage than that to which they are connected depending upon their configuration.

A "switch receptacle" as used herein and throughout this disclosure, refer to, but is not limited to, an electrical receptacle that is configured for providing switching functionality, e.g., turning on/off a light or lights or an electrical device/system for which the switching functionality controls power. A switch receptacle may provide control of an electrical distribution circuit, e.g., be a circuit breaker, or distribution panel comprising other switch receptacles, e.g., circuit breakers. Accordingly, a switch receptacle may vary, for example, in the number of switches and their wired interconnection(s) such that the switch may be single pole, double pole, etc. The switch may control the same voltage and/or current as that which powers the switch receptacle to provide the inserts with functionality or alternatively, the switch may control connection and/or disconnection of a system at a different voltage either derived from the power supply that powers the receptacle or coupled to the switch receptacle via a separate connection. Accordingly, a switch may be powered from and/or controlling an electrical circuit at 110V/120V, 220V/230V/240V, 50 Hz, 60 Hz, 5 A, 6 A, 10 A, 13 A, 15 A, alternating current (AC), direct current (DC), 12V, 24V, and 48V.

A "plug" as used herein and throughout this disclosure, refer to, but is not limited to, one half of an electrical connector with the other half being the socket. The plug is usually considered the male portion of an electrical connector and comprises one or more pins or jacks that are designed to mate with their corresponding socket.

A "socket" as used herein and throughout this disclosure, refer to, but is not limited to, one half of an electrical connector with the other half being the plug. The socket is usually considered the female portion of an electrical connector and comprises one or more openings that are designed to mate with their corresponding plug pins or jack.

An "electrical connector" is an electro-mechanical device used to join electrical terminations and create an electrical circuit. Electrical connectors typically consist of plugs (male-ended) and jacks (female-ended). The connection may be made/unmade manually or may require a tool for assembly and removal.

A "faceplate" (also referred to as wall plate, outlet cover, or socket cover) as used herein and throughout this disclosure, refer to, but is not limited to, a typically plastic cover designed to fit around and/or over an electrical receptacle or switch receptacle and enclose said receptacle within the work box whilst overlapping the surrounding wall/ceiling etc. to provide an aesthetically and/or functional cover. Some faceplates may include a cover to protect the socket when not in use such as in wet outdoor environments for example.

An "electrical contact" as used herein and throughout this disclosure, refer to, but is not limited to, an electrical connection between a first element (e.g., a pin of a plug) with a second element (e.g., a receptacle within a socket). Such electrical contacts may be around the periphery of the pin, on a particular surface of the pin, or particular surface of the pin. Some electrical contacts may be sprung to maintain connection over a range of relative positions of the two elements.

A "demountable insert" or "insert" as used herein and throughout this disclosure, refer to, but is not limited to, an assembly designed to be inserted within an opening/recess within an electrical and/or switch receptacle. Accordingly, a demountable insert may be inserted/removed through the faceplate without requiring the removal of the face plate.

A "retention means" as used herein and throughout this disclosure, refer to, but is not limited to, a means of attaching one element to another element. As such a retention means may include, but not be limited, a screw, a bolt, a nut and bolt, a latch, and a clip.

An "electrical supply" as used herein and throughout this disclosure, refer to, but is not limited to, an electrical power supply to which an electrical receptacle or switch receptacle is connected in order to provide electrical power for the receptacle, its user accessible features such as a socket, switch, etc. and provides power to the demountable insert(s) supported by the electrical receptacle. In most instances the electrical supply is the general-purpose alternating-current (AC) electric power supply received at the residence, retail building, office, commercial building etc. However, in other instances it may be a different AC electrical power supply derived from the general-purpose AC or another power supply such as a generator. In other instances, the electrical supply may be a direct-current (DC) electrical supply. General-purpose AC is typically 110V/120V or 220V/230V/240V at either 50 Hz or 60 Hz. However, in other instances it may be at other frequencies such as 400 Hz for example in avionics applications.

A "wireless standard" as used herein and throughout this disclosure, refer to, but is not limited to, a standard for transmitting signals and/or data through electromagnetic radiation which may be optical, radiofrequency (RF) or microwave although typically RF wireless systems and techniques dominate. A wireless standard may be defined globally, nationally, or specific to an equipment manufacturer or set of equipment manufacturers. Dominant wireless standards at present include, but are not limited to IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1000, Bluetooth, Wi-Fi, Ultra-Wideband and WiMAX. Some standards may be a conglomeration of sub-standards such as IEEE 802.11 which may refer to, but is not limited to, IEEE 802.1a, IEEE 802.11b, IEEE 802.11g, or IEEE 802.11n as well as others under the IEEE 802.11 umbrella.

A "wired standard" as used herein and throughout this disclosure, generally refer to, but is not limited to, a standard for transmitting signals and/or data through an electrical cable discretely or in combination with another signal. Such wired standards may include, but are not limited to, digital subscriber loop (DSL), Dial-Up (exploiting the public switched telephone network (PSTN) to establish a connection to an Internet service provider (ISP)), Data Over Cable Service Interface Specification (DOCSIS), Ethernet, Gigabit home networking (G.hn), Integrated Services Digital Network (ISDN), Multimedia over Coax Alliance (MoCA), and Power Line Communication (PLC, wherein data is overlaid to AC/DC power supply). In some embodiments a "wired standard" may refer to, but is not limited to, exploiting an optical cable and optical interfaces such as within Passive Optical Networks (PONs) for example.

A "user" as used herein may refer to, but is not limited to, an individual or group of individuals. This includes, private individuals, employees of organizations and/or enterprises, members of community organizations, members of charity organizations, men, women, and children. In its broadest sense the user may further include, but not be limited to, mechanical systems, robotic systems, android systems, etc. that may be characterised by an ability to exploit one or more embodiments of the invention.

A "sensor" as used herein may refer to, but is not limited to, a transducer providing an electrical output generated in dependence upon a magnitude of a measure and selected from the group comprising, but is not limited to, environmental sensors, medical sensors, biological sensors, chemical sensors, ambient environment sensors, position sensors, motion sensors, thermal sensors, infrared sensors, visible sensors, RFID sensors, and medical testing and diagnosis devices.

A "portable electronic device" (PED) as used herein and throughout this disclosure, refers to a wireless device used for communications and other applications that requires a battery or other independent form of energy for power. This includes devices, but is not limited to, such as a cellular telephone, smartphone, personal digital assistant (PDA), portable computer, pager, portable multimedia player, portable gaming console, laptop computer, tablet computer, a wearable device, and an electronic reader.

A "fixed electronic device" (FED) as used herein and throughout this disclosure, refers to a wireless and/or wired device used for communications and other applications that requires connection to a fixed interface to obtain power. This includes, but is not limited to, a laptop computer, a personal computer, a computer server, a kiosk, a gaming console, a digital set-top box, an analog set-top box, an Internet enabled appliance, an Internet enabled television, and a multimedia player.

A "server" as used herein, and throughout this disclosure, refers to one or more physical computers co-located and/or geographically distributed running one or more services as a host to users of other computers, PEDs, FEDs, etc. to serve the client needs of these other users. This includes, but is not limited to, a database server, file server, mail server, print server, web server, gaming server, or virtual environment server.

An "application" (commonly referred to as an "app") as used herein may refer to, but is not limited to, a "software application," an element of a "software suite," a computer program designed to allow an individual to perform an activity, a computer program designed to allow an electronic device to perform an activity, and a computer program designed to communicate with local and/or remote electronic devices. An application thus differs from an operating system (which runs a computer), a utility (which performs maintenance or general-purpose chores), and a programming tools (with which computer programs are created). Generally, within the following description with respect to embodiments of the invention an application is generally presented in respect of software permanently and/or temporarily installed upon a PED and/or FED.

An "enterprise" as used herein may refer to, but is not limited to, a provider of a service and/or a product to a user, customer, or consumer. This includes, but is not limited to, a retail outlet, a store, a market, an online marketplace, a manufacturer, an online retailer, a charity, a utility, and a service provider. Such enterprises may be directly owned and controlled by a company or may be owned and operated by a franchisee under the direction and management of a franchiser.

A "service provider" as used herein may refer to, but is not limited to, a third-party provider of a service and/or a product to an enterprise and/or individual and/or group of individuals and/or a device comprising a microprocessor. This includes, but is not limited to, a retail outlet, a store, a market, an online marketplace, a manufacturer, an online retailer, a utility, an own brand provider, and a service provider wherein the service and/or product is at least one of marketed, sold, offered, and distributed by the enterprise solely or in addition to the service provider.

A "third party" or "third party provider" as used herein may refer to, but is not limited to, a so-called "arm's length" provider of a service and/or a product to an enterprise and/or individual and/or group of individuals and/or a device comprising a microprocessor wherein the consumer and/or customer engages the third party but the actual service and/or product that they are interested in and/or purchase and/or receive is provided through an enterprise and/or service provider.

A "user" as used herein may refer to, but is not limited to, an individual or group of individuals. This includes, but is not limited to, private individuals, employees of organizations and/or enterprises, members of community organizations, members of charity organizations, men, and women. In its broadest sense the user may further include, but not be limited to, software systems, mechanical systems, robotic systems, android systems, etc. that may be characterised by an ability to exploit one or more embodiments of the invention. A user may also be associated through one or more accounts and/or profiles with one or more of a service provider, third party provider, enterprise, social network, social media etc. via a dashboard, web service, website, software plug-in, software application, and graphical user interface.

"Biometric" information as used herein may refer to, but is not limited to, data relating to a user characterised by data relating to a subset of conditions including, but not limited to, their environment, medical condition, biological condition, physiological condition, chemical condition, ambient environment condition, position condition, neurological condition, drug condition, and one or more specific aspects of one or more of these said conditions. Accordingly, such biometric information may include, but not be limited, blood oxygenation, blood pressure, blood flow rate, heart rate, temperate, fluidic pH, viscosity, particulate content, solids content, altitude, vibration, motion, perspiration, EEG, ECG, energy level, etc. In addition, biometric information may include data relating to physiological characteristics related to the shape and/or condition of the body wherein examples may include, but are not limited to, fingerprint, facial geometry, baldness, DNA, hand geometry, odour, and scent. Biometric information may also include data relating to behavioral characteristics, including but not limited to, typing rhythm, gait, and voice.

"User information" as used herein may refer to, but is not limited to, user behavior information and/or user profile information. It may also include a user's biometric information, an estimation of the user's biometric information, or a projection/prediction of a user's biometric information derived from current and/or historical biometric information.

A "wearable device" or "wearable sensor" relates to miniature electronic devices that are worn by the user including those under, within, with or on top of clothing and are part of a broader general class of wearable technology which includes "wearable computers" which in contrast are directed to general or special purpose information technologies and media development. Such wearable devices and/or wearable sensors may include, but not be limited to, smartphones, smart watches, e-textiles, smart shirts, activity trackers, smart glasses, environmental sensors, medical sensors, biological sensors, physiological sensors, chemical sensors, ambient environment sensors, position sensors, neurological sensors, drug delivery systems, medical testing and diagnosis devices, and motion sensors.

"Electronic content" (also referred to as "content" or "digital content") as used herein may refer to, but is not limited to, any type of content that exists in the form of digital data as stored, transmitted, received and/or converted wherein one or more of these steps may be analog although generally these steps will be digital. Forms of digital content include, but are not limited to, information that is digitally broadcast, streamed, or contained in discrete files. Viewed narrowly, types of digital content include popular media types such as MP3, JPG, AVI, TIFF, AAC, TXT, RTF, HTML, XHTML, PDF, XLS, SVG, WMA, MP4, FLV, and PPT, for example, as well as others. Within a broader approach digital content mat include any type of digital information, e.g., digitally updated weather forecast, a GPS map, an eBook, a photograph, a video, a Vine™, a blog posting, a Facebook™ posting, a Twitter™ tweet, online TV, etc. The digital content may be any digital data that is at least one of generated, selected, created, modified, and transmitted in response to a user request, said request may be a query, a search, a trigger, an alarm, and a message for example.

A "profile" as used herein, and throughout this disclosure, refers to a computer and/or microprocessor readable data file comprising data relating to settings and/or limits of an adult device. Such profiles may be established by a manufacturer/supplier/provider of a device, service, etc. or they may be established by a user through a user interface for a device, a service, or a PED/FED in communication with a device, another device, a server, or a service provider etc.

A "computer file" (commonly known as a file) as used herein, and throughout this disclosure, refers to a computer resource for recording data discretely in a computer storage device, this data being electronic content. A file may be defined by one of different types of computer files, designed for different purposes. A file may be designed to store electronic content such as a written message, a video, a computer program, or a wide variety of other kinds of data. Some types of files can store several types of information at once. A file can be opened, read, modified, copied, and closed with one or more software applications an arbitrary number of times. Typically, files are organized in a file system which can be used on numerous different types of storage device exploiting different kinds of media which keeps track of where the files are located on the storage device(s) and enables user access. The format of a file is defined by its content since a file is solely a container for data, although, on some platforms the format is usually indicated by its filename extension, specifying the rules for how the bytes must be organized and interpreted meaningfully. For example, the bytes of a plain text file are associated with either ASCII or UTF-8 characters, while the bytes of image, video, and audio files are interpreted otherwise. Some file types also allocate a few bytes for metadata, which allows a file to carry some basic information about itself.

"Metadata" as used herein, and throughout this disclosure, refers to information stored as data that provides information about other data. Many distinct types of metadata exist, including but not limited to, descriptive metadata, structural metadata, administrative metadata, reference metadata and statistical metadata. Descriptive metadata may describe a resource for purposes such as discovery and identification and may include, but not be limited to, elements such as title, abstract, author, and keywords. Structural metadata relates to containers of data and indicates how compound objects are assembled and may include, but not be limited to, how pages are ordered to form chapters, and typically describes the types, versions, relationships, and other characteristics of digital materials. Administrative metadata may provide information employed in managing a resource and may include, but not be limited to, when and how it was created, file type, technical information, and who can access it. Reference metadata may describe the contents and quality of statistical data whereas statistical metadata may also describe processes that collect, process, or produce statistical data. Statistical metadata may also be referred to as process data.

An "artificial intelligence system" (referred to hereafter as artificial intelligence, AI) as used herein, and throughout disclosure, refers to machine intelligence or machine learning in contrast to natural intelligence. An AI may refer to analytical, human inspired, or humanized artificial intelligence. An AI may refer to the use of one or more machine learning algorithms and/or processes. An AI may employ one or more of an artificial network, decision trees, support vector machines, Bayesian networks, and genetic algorithms. An AI may employ a training model or federated learning.

"Machine Learning" (ML) or more specifically machine learning processes as used herein refers to, but is not limited, to programs, algorithms, or software tools, which allow a given device or program to learn to adapt its functionality based on information processed by it or by other independent processes. These learning processes are in practice, gathered from the result of said process which produce data and or algorithms that lend themselves to prediction. This prediction process allows ML-capable devices to behave according to guidelines initially established within its own programming but evolved as a result of the ML. A machine learning algorithm or machining learning process as employed by an AI may include, but not be limited to, supervised learning, unsupervised learning, cluster analysis, reinforcement learning, feature learning, sparse dictionary learning, anomaly detection, association rule learning, inductive logic programming.

"Polyester" as used herein and throughout this disclosure may refer to, but is not limited to, a category of polymers that contain the ester functional group in their main chain. This includes but is not limited to polyesters which are naturally occurring chemicals as well as synthetics through step-growth polymerization, for example. Polyesters may be biodegradable or not. Polyesters may be a thermoplastic or thermoset or resins cured by hardeners. Polyesters may be aliphatic, semi-aromatic or aromatic. Polyesters may include, but not be limited to, those exploiting polyglycolide, polylactic acid (PLA), polycaprolactone (PCL), polyhydroxyalkanoate (PHA), polyhydroxybutyrate (PHB), polyethylene adipate (PEA), polybutylene succinate (PBS), polyethylene terephthalate (PET), polybutylene terephthalate (PBT), polytrimethylene terephthalate (PTT), and polyethylene naphthalate (PEN).

A "thermoplastic" or "thermosoftening plastic" as used herein and throughout this disclosure, refers to a category of polymers that become pliable or moldable above a specific temperature and solidify upon cooling. Thermoplastics may include, but not be limited, polycarbonate (PC), polyether sulfone (PES), polyether ether ketone (PEEK), polyethylene (PE), polypropylene (PP), poly vinyl chloride (PVC), polytetrafluoroethylene (PTFE), polyimide (PI), polyphenylsulfone (PPSU), polychlorotrifluoroethene (PCTFE or PTFCE), florinated ethylene propylene (FEP), and perfluoroalkoxy alkane (PFA).

A "metal" as used herein and throughout this disclosure may refer to, but is not limited to, material that has good electrical and thermal conductivity. Such materials may be malleable and/or fusible and/or ductile. Metals may include, but not be limited to, aluminum, nickel, copper, cobalt, chromium, silver, gold, platinum, iron, zinc, titanium, and alloys thereof such as bronze, stainless steel, brass, and phosphor bronze.

An "aramid" as used herein, and throughout this disclosure, refers to an aromatic polyamide. Aramids are a class of materials fibers in which the chain molecules are highly oriented along the fiber axis, so the strength of the chemical bond can be exploited. Examples include but are not limited to fibers distributed under brand names such as Kevlar™, Technora™, Twaron™, Heracron™, Nomex™, Innegra S™ and Vectran™ as well as nylon and ultra-high molecular weight polyethylene.

A "silicone" as used herein and throughout this disclosure may refer to, but is not limited to, polymer that includes any inert, synthetic compound made up of repeating units of siloxane.

An "elastomeric" material or "elastomer" as used herein and throughout this disclosure may refer to, but is not limited to, material, generally a polymer, with viscoelasticity. Elastomers may include, but not be limited to, unsaturated rubbers such as polyisoprene, butyl rubber, ethylene propylene rubber, silicone rubber, fluorosilicone rubber, fluoroelastomers, perfluoroelastomers, and thermoplastic elastomers.

The term "flexible," as used herein, refers to the ability of a body that is capable of being bent or flexed. Something that is flexible can be, for example, resilient or malleable. The term "flexible," as used herein, refers to the ability of a body that has been subjected to an external force to return to its original size and/or shape once the external force has been removed or reduced to below a particular level.

The term "malleable," as used herein, refers to the ability of a body that has been subjected to an external force to deform and maintain, or substantially maintain, the deformed size and/or shape.

The term "elastic" as used herein, refers to or may describe or identify certain types of elastomer and/or stretchable fabrics or it may refer to the ability of a body to resist a distorting influence or stress and to return to its original size and shape when the stress is removed. Whilst solid objects will deform when sufficient force is applied a material is considered elastic and will return to its initial shape and size when the force is removed.

The term "resilient" as used herein, refers either to a material having the ability to absorb energy when it is deformed elastically, and release that energy upon unloading or to a material having the ability to resist deformation under pressure. Embodiments of the invention may employ, for example, a plastic inner ring and/or liner within which a portion of a user is inserted, e.g., a finger, wrist, etc. which supports limited deformation around which a hollow shaft motor may be employed to impart vibratory action discretely or in combination with one or more other actuators such as fluidic actuators and/or linear electrical actuators etc. The fluidic actuators may employ one or more elastic and/or elastomeric materials. Alternatively, the inner ring and/or liner may be elastic but having a higher young's modulus that another elastic material employed within a fluidic actuator for example.

A "scaffold" or "scaffolds" as used herein, and throughout this disclosure, refers to a structure that is used to hold up, interface with, or support another material or element(s). This includes, but is not limited to, such two-dimensional (2D) structures such as substrates and films, three-dimensional (3D) structures such as geometrical objects, non-geometrical objects, combinations of geometrical and non-geometrical objects, naturally occurring structural configurations, and manufactured structural configurations. A scaffold may be solid, hollow, and porous or a combination thereof. A scaffold may contain recesses, pores, openings, holes, vias, and channels or a combination thereof. A scaffold may be smooth, textured, have predetermined surface profiles and/or features. A scaffold may be intended to support one or more other materials, one or more films, a multilayer film, one type of particle, multiple types of particles etc. A scaffold may include, but not be limited to, a spine of a device and/or a framework, for example, which also supports a shell and/or a casing.

A "shell" as used herein, and throughout this disclosure, refers to a structure that is used to contain and/or surround at least partially and/or fully a number of elements within adult devices according to embodiments of the invention. A shell may include, but not limited to, a part or parts that are mounted to a scaffold or scaffolds that support elements within a device according to an embodiment of the invention.

A "casing" as used herein, and throughout this disclosure, refers to a structure surrounding a scaffold and/or shell. This includes structures typically formed from an elastomer and/or silicone to provide a desired combination of physical tactile surface properties to the device it forms part of and other properties including, but not limited to, hermeticity, liquid ingress barrier, solid particulate ingress barrier, surface sheen, and colour. A casing may include, but not limited to, a part or parts that are mounted to a scaffold or scaffolds and/or a casing or casings forming part of a device according to an embodiment of the invention.

FIG. 1 depicts an exemplary network environment within which embedded sensors can be employed according to and supporting embodiments of the invention may be deployed and operate. Accordingly, as depicted first and second user groups 100A and 100B respectively interface to a telecommunications Network 100. Within the representative telecommunication architecture, a Remote Central Exchange 180 communicates with the remainder of a telecommunication service providers network via the Network 100 which may include for example long-haul OC-48/OC-192 backbone elements, an OC-48 wide area network (WAN), a Passive Optical Network, and a Wireless Link. The Remote Central Exchange 180 is connected via the Network 100 to local, regional, and international exchanges (not shown for clarity) and therein through Network 100 to first and second wireless access points (AP) 195A and 195B respectively which provide Wi-Fi cells for first and second user groups 100A and 100B, respectively. Also connected to the Network 100 are first and second Wi-Fi nodes 110A and 110B, the latter of which being coupled to Network 100 via Router 105. Second Wi-Fi node 110B is associated with Government Body 160 within which are first and second user groups 100A and 100B. Second user group 100B may also be connected to the Network 100 via wired interfaces including, but not limited to, DSL, Dial-Up, DOCSIS, Ethernet, G.hn, ISDN, MoCA, PON, and Power line communication (PLC) which may or may not be routed through a router such as router 105.

Within the cell associated with first AP 110A the first group of users 100A may employ a variety of portable electronic devices (PEDs). Within the cell associated with second AP 110B are the second group of users 100B which may employ a variety of fixed electronic devices (FEDs).

Also connected to the Network 100 are first and second APs 195A and 195B respectively which provide, for example, cellular GSM (Global System for Mobile Communications) telephony services as well as 3G and 4G evolved services with enhanced data transport support. Second AP 195B provides coverage in the exemplary embodiment to first and second user groups 100A and 100B. Alternatively the first and second user groups 100A and 100B may be geographically disparate and access the Network 100 through multiple APs, not shown for clarity, distributed geographically by the network operator or operators. First AP 195A as show provides coverage to first user group 100A and Government Body 160, which comprises second user group 100B as well as first user group 100A. Accordingly, the first and second user groups 100A and 100B may according to their particular communications interfaces communicate to the Network 100 through one or more wireless communications standards such as, for example, IEEE 802.11, IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, and IMT-2000. It would be evident to one skilled in the art that many portable and fixed electronic devices may support multiple wireless protocols simultaneously, such that for example a user may employ GSM services such as telephony and SMS and Wi-Fi/WiMAX data transmission, VOIP and Internet access. Accordingly, portable electronic devices within first user group 100A may form associations either through standards such as IEEE 802.15 or Bluetooth as well in an ad-hoc manner.

Also connected to the Network 100 are Concrete Analysis Environment 165, State Body 170, and Building Analysis Environment 175 as well as first and second servers 190A and 190B which together with others not shown for clarity, may host according to embodiments of the inventions multiple services associated with one or more organizations, including but not limited to, a provider of the software operating system(s) and/or software application(s) associated with embeddable sensors, a provider of embeddable sensors, provider of one or more aspects of wired and/or wireless communications, provider of the electrical measurement devices, provider of mapping analysis software, provider of electrical measurement analysis software, global position system software, materials databases, building databases, regulatory databases, license databases, construction organizations, websites, and software applications for download to or access by FEDs, PEDs, embeddable sensors and electrical measurement systems. First and second Servers 190A and 190B may also host for example other Internet services such as a search engine, financial services, third party applications and other Internet based services.

Accordingly, it would be evident to one skilled in the art that embeddable sensors according to embodiments of the invention described in respect of FIGS. 3 to 25 may be connected to a communications network such as Network 100 either continuously or intermittently. It would be further evident that the measurement data from the embeddable sensors may be employed to provide information to a construction material manufacturer, construction companies, engineering companies, infrastructure owners, regulators, etc. This measurement data with or without additional processing may be employed for quality assurance, compliance to construction specifications, for the construction material manufacturer, construction companies, engineering companies, infrastructure owners, etc. as well as a result of activities triggered by, for example, the Government Body 160 and/or State Body 170 in order to address regulatory requirements, safety concerns etc. Accordingly, the engineers, workers and/or technicians who will be performing the measurements may be able to access Concrete Analysis Environment 165 to obtain construction material manufacturing data, deployment data, performance data, etc. and/or Building Analysis Environment 175 to obtain architect drawings, engineering data, design data, etc. relating to the concrete structure being assessed. Concrete Analysis Environment 165 and/or Building Analysis Environment 175 may be provided, for example, by a manufacturer of embeddable sensors, a service provider, a construction material manufacturer, a construction material company, or a third-party service provider.

FIG. 2 depicts an exemplary electronic device supporting communications to a network such as depicted in FIG. 1 and with embedded sensors according to and supporting embodiments of the invention. Within schematic 200 the Electronic Device 201 supporting Embeddable Sensor (EMBSEN) Systems, Applications and Platforms (SAPs) and EMBSEN-SAP features according to embodiments of the invention is connected. Electronic Device 201 may, for example, be a PED, a FED, or a wearable device and may include additional elements above and beyond those described and depicted. Also depicted in conjunction with the Electronic Device 201 are exemplary internal and/or external elements forming part of a simplified functional diagram of an Electronic Device 201 within an overall simplified schematic of a system supporting EMBSEN-SAP features according to embodiments of the invention which include includes an Access Point (AP) 206, such as a Wi-Fi AP for example, a Network Device 207, such as a communication server, streaming media server, and a router. The Network Device 207 may be coupled to the AP 206 via any combination of networks, wired, wireless and/or optical communication links. Also connected to the Network 100 are Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B, respectively.

As depicted the Electronic Device 201 may communicate directly with AP 206 as well as with SMARCKs 280, "SMARt roCKs" (namely sensors and/or embeddable sensors), wherein SMARCKs 280 may be embedded into construction materials at various points in their life cycle such as during their manufacture, deployment, and post-deployment. The inventors describing several SMARCK 280 concepts within U.S. Patent Publication No. 2017/0,284,996 entitled "Embedded Wireless Monitoring Sensors", U.S. Patent Publication No. 2017/0,108,456 entitled "Electrical Methods and Systems for Concrete Testing" and U.S. Patent Publication 2018/0,238,820 entitled "Methods and Systems Relating to Construction Material Assessment" as well as World Patent Application PCT/CA2020/050440 entitled "Embedded Sensor Devices and Methods" and World Patent Application PCT/CA2019/000057 entitled "Construction Material Assessment Method and Systems."

A SMARCK 280 may communicate as depicted (although other configurations not described are supported by embodiments of the invention) by one or more of:

- directly with Electronic Device 201;
- to Electronic Device 201 via a Wireless Booster/Repeater such as described below in respect of embodiments of the invention;
- to a Hub 285 which acquires data from SMARCKs 280 and pushes it to an endpoint, such a first Server 190A for example, via a Network Device 207 (which may be integrated with the Hub 285) through wired or wireless link(s);
- to an AP 206; and
- to a Network Device 207.

An Electronic Device 201 includes one or more Processors 210 and a Memory 212 coupled to Processor(s) 110. AP 206 also includes one or more Processors 211 and a Memory 213 coupled to Processor(s) 210. A non-exhaustive list of examples for any of Processors 210 and 211 includes a central processing unit (CPU), a digital signal processor (DSP), a reduced instruction set computer (RISC), a complex instruction set computer (CISC), a graphics processing unit (GPU) and the like. Furthermore, any of Processors 210 and 211 may be part of application specific integrated circuits (ASICs) or may be a part of application specific standard products (ASSPs). A non-exhaustive list of examples for Memories 212 and 213 includes any combination of the following semiconductor devices such as registers, latches, ROM, EEPROM, flash memory devices, non-volatile random access memory devices (NVRAM), SDRAM, DRAM, double data rate (DDR) memory devices, SRAM, universal serial bus (USB) removable memory, and the like.

Electronic Device 201 may include an audio input element 214, for example a microphone, and an Audio Output Element 216, for example, a speaker, coupled to any of Processor(s) 210. Electronic Device 201 may include an Optical Input Element 218, for example, a video camera or camera, and an Optical Output Element 220, for example an LCD display, coupled to any of Processor(s) 210. Electronic Device 201 may also include a Keyboard 215 and Touchpad 217 which may for example be a physical keyboard and touchpad allowing the user to enter content or select functions within one of more Applications 222. Alternatively, the Keyboard 215 and Touchpad 217 may be predetermined regions of a touch sensitive element forming part of the display within the Electronic Device 201. The one or more Applications 222 that are typically stored in Memory 212 are executable by any combination of Processor(s) 210. Electronic Device 201 also includes Accelerometer 260 providing three-dimensional motion input to the Processor(s) 210 and GPS 262 which provides geographical location information to Processor(s) 210.

Electronic Device 201 includes a Protocol Stack 224 and AP 206 includes an AP Stack 225. Within Protocol Stack 224 is shown an IEEE 802.11 protocol stack but alternatively may exploit other protocol stacks such as an Internet Engineering Task Force (IETF) multimedia protocol stack for example or another protocol stack. Likewise, AP Stack 225 exploits a protocol stack but is not expanded for clarity. Elements of Protocol Stack 224 and AP Stack 225 may be implemented in any combination of software, firmware and/or hardware. Protocol Stack 224 includes an IEEE 802.11-compatible PHY module that is coupled to one or more Tx/Rx & Antenna Circuits 228A and an IEEE 802.11-compatible MAC module which is coupled to an IEEE 802.2-compatible LLC module. Protocol Stack 224 also includes modules for Network Layer IP, a transport layer User Datagram Protocol (UDP), a transport layer Transmission Control Protocol (TCP), a session layer Real Time Transport Protocol (RTP), a Session Announcement Protocol (SAP), a Session Initiation Protocol (SIP) and a Real Time Streaming Protocol (RTSP). Protocol Stack 224 includes a presentation layer Call Control and Media Negotiation module 250, one or more audio codecs and one or more video codecs. Applications 222 may be able to create maintain and/or terminate communication sessions with the Network Device 207 by way of AP 206 and therein via the Network 100 to one or more of Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B respectively.

Typically, Applications 222 may activate any of the SAP, SIP, RTSP, and Call Control & Media Negotiation 250 modules for that purpose. Typically, information may propagate from the SAP, SIP, RTSP, Call Control & Media Negotiation 250 to the PHY module via the TCP module, IP module, LLC module and MAC module. It would be apparent to one skilled in the art that elements of the Electronic Device 201 may also be implemented within the AP 206 including but not limited to one or more elements of the Protocol Stack 224, including for example an IEEE 802.11-compatible PHY module, an IEEE 802.11-compatible MAC module, and an IEEE 802.2-compatible LLC module. The AP 206 may additionally include a network layer IP module, a transport layer User Datagram Protocol (UDP) module and a transport layer Transmission Control Protocol (TCP) module as well as a session layer Real Time Transport Protocol (RTP) module, a Session Announcement Protocol (SAP) module, a Session Initiation Protocol (SIP) module and a Real Time Streaming Protocol (RTSP) module, and a call control & media negotiation module. Portable electronic devices (PEDs) and fixed electronic devices (FEDs) represented by Electronic Device 201 may include one or more additional wireless or wired interfaces in addition to or in replacement of the depicted IEEE 802.11 interface which may be selected from the group comprising IEEE 802.15, IEEE 802.16, IEEE 802.20, UMTS, GSM 850, GSM 900, GSM 1800, GSM 1900, GPRS, ITU-R 5.138, ITU-R 5.150, ITU-R 5.280, IMT-1010, DSL, Dial-Up, DOCSIS, Ethernet, G.hn, ISDN, MoCA, PON, and Power line communication (PLC).

The Front End Tx/Rx & Antenna 228A wirelessly connects the Electronic Device 201 with the AP Antenna 228B on Access Point 206, wherein the Electronic Device 201 may support, for example, a national wireless standard such as GSM together with one or more local and/or personal area wireless protocols such as IEEE 802.11 a/b/g Wi-Fi, IEEE 802.16 WiMAX, and IEEE 802.15 Bluetooth for example. Accordingly, it would be evident to one skilled in the art that the Electronic Device 201 may accordingly download original software and/or revisions for a variety of functions. In some embodiments of the invention the functions may not be implemented within the original as sold Electronic Device 201 and are only activated through a software/firmware revision and/or upgrade either discretely or in combination with a subscription or subscription upgrade for example. Accordingly, as will become evident in respect of the description below the Electronic Device 201 may provide a user with access to one or more EMBSEN-SAPs including, but not limited to, software installed upon the Electronic Device 201 or software installed upon one or more remote systems such as those associated with Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B respectively.

Accordingly, within the following description a remote system/server may form part or all of the Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B respectively. Within the following description a local client device may be Electronic Device 201 such as a PED, FED or Wearable Device and may be associated with one or more of the Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B respectively. Similarly, a storage system/server within the following descriptions may form part of or be associated within Social Media Networks (SOCNETS) 290; Government Body 160, Concrete Analysis Environment 165, State Body 170, Building Analysis Environment 175; first and second remote systems 270A and 270B respectively; first and second websites 275A and 275B respectively; first and second 3rd party service providers 275C and 275D respectively; and first and second Servers 190A and 190B respectively.

Figure 3:
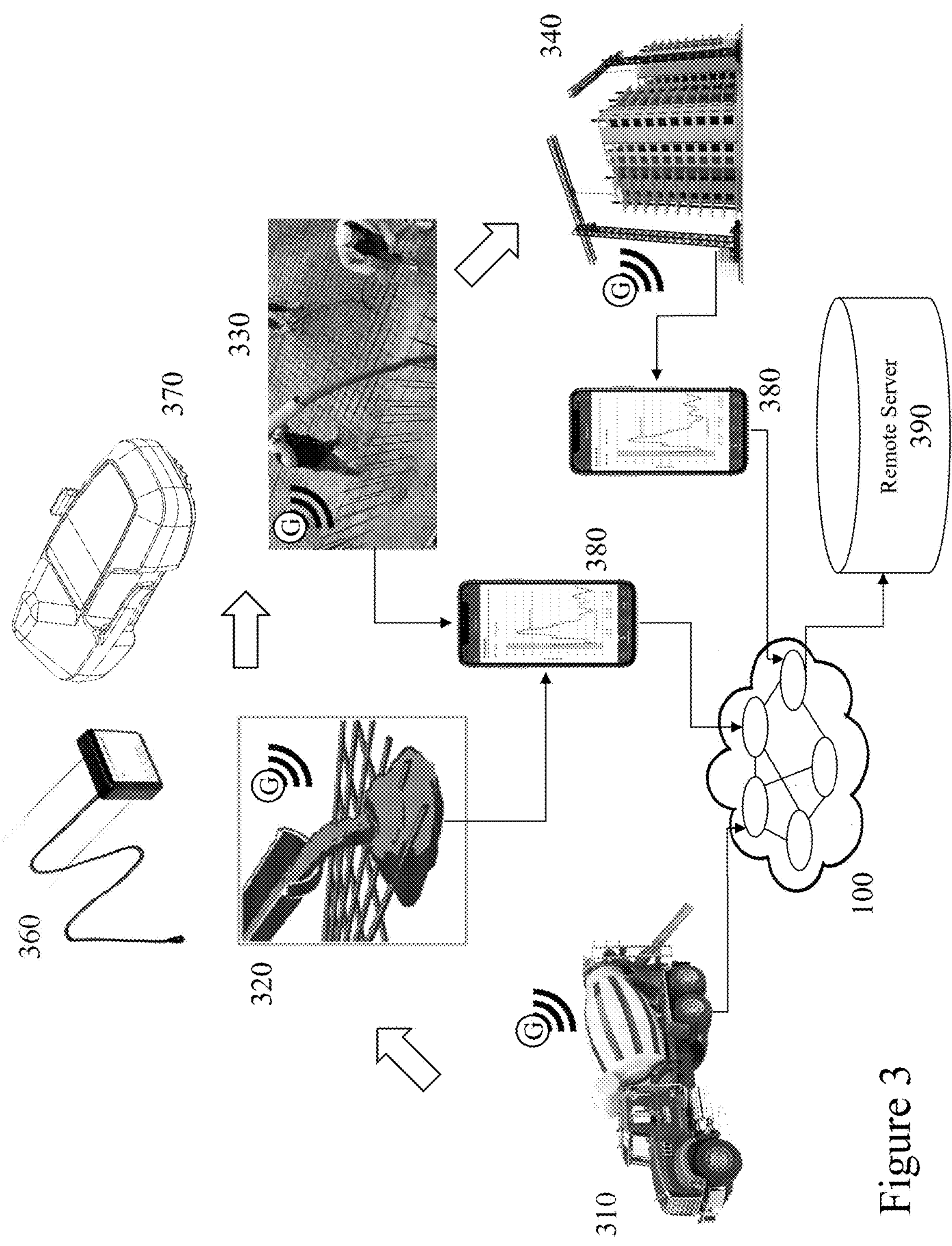
FIG. 3 depicts an embedded sensor methodology for data logging concrete properties from initial mix through pouring, curing, and subsequently according to an embodiment of the invention.
Figure 5:
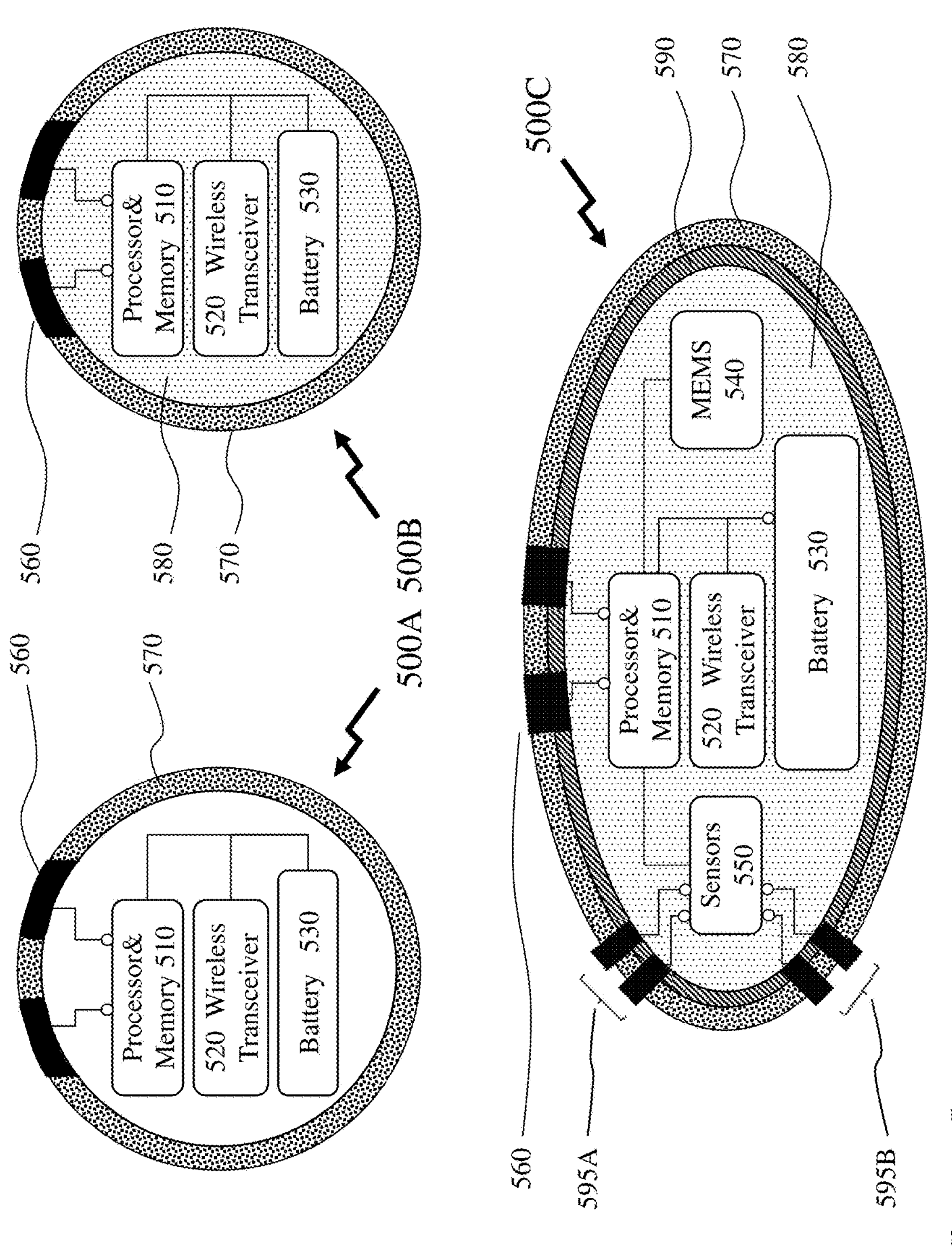
FIG. 5 depicts exemplary embeddable sensors according to embodiments of the invention.

FIG. 3 depicts an embedded sensor methodology for data logging concrete properties from initial mix through pouring, curing, and subsequently according to embodiments of the invention. As such SMARCKs, such as first to third SMARCKs 500A to 500C in FIG. 5, depicted in first configuration 360 and second configuration 370 in FIG. 2, may be added to a construction material batch, e.g., concrete which is loaded onto a concrete truck at the batching plant, within an embodiment of the invention. It is therefore possible to "tag," i.e., load into, the SMARCK information relevant to the mix as well as delivery data etc. This information as well as other measurements made by the SMARCKs during the transportation, delivery, deployment, etc. can be accessed by a wireless interface by an end user. According to the design of the SMARCK the lifetime of the SMARCK may be short, e.g., a few days or weeks, moderate, e.g., a few months, or long, e.g., years.

As such the tagging of the SMARCKs may include, but not be limited to, information such as batch identity, truck identity, date, time, location, batch mix parameters, etc. but also importantly information such as the maturity calibration curves for the mix established by the manufacturer. Accordingly, depending upon the degree of complexity embedded into the SMARCK such data may be either retrieved for remote storage and subsequent use or it may be part of the SMARCKs processing of electrical measurement data such that calibration data of the construction material is already factored into the data provided by the SMARCKs. Accordingly, the SMARCKs, such as first configuration 360 and second configuration 370 may be added to the construction material, e.g., concrete, at the batching point 310 either tagged already or tagged during loading. Subsequently upon delivery and pouring 320 the SMARCKs may be read for information regarding the delivery process etc.

Once poured the SMARCKs may be read for curing information 330 and then subsequently, depending upon the battery—power consumption etc., periodically read for lifetime data 340 of the concrete. In each instance the acquired data may be acquired wirelessly and stored on a user's PED or it may then be pushed to a Network 100 and therein to one or more Remote Servers 390. For devices wireless interrogating the SMARCKs these may be executing a software application which presents to the user concrete parameter data either as provided from the SMARCK(s) directly using the calibration curves stored within or upon the device using calibration curve data stored within the SMARCK but not processed by it, stored within the device, or retrieved from the data stored upon the Remote Server 390.

As depicted first configuration 260 is enabled when an electrical circuit is completed via the flying leads. In second configuration 270 the sensor may be enabled through a wireless signal, a vibration exceeding a threshold, via an electrical circuit being completed upon removal of a sensor cable which incorporates a magnetic element within the sensor head removed from a housing within the second configuration 270 SMARCK, increase in humidity beyond a threshold, decrease in light, etc. Accordingly, the embodiments of the invention support tagging the sensors and embedding the maturity calibration curves in the sensor. These curves may for example be mix-specific and depending on the temperature history of the concrete can be used to estimate the strength of the construction material, e.g., concrete. By embedding them within the sensors and the sensors employing this data the construction material manufacturer does not need to release commercially sensitive information such as their proprietary mix and calibration curves.

Based upon the combination of SMARCKs within the construction material and their wireless interrogation and mobile/cloud-based software applications other technical enhancements may be implemented, including for example:

- Weather forecast API, such that the ambient temperature prediction in conjunction with current construction material data can be used to predict/project the strength identifying quality problems earlier;
- Automatic detection of construction material pouring time, e.g., from electrical connection once the concrete is poured or change in the pressure, humidity, light etc.;

Tagging the sensor using NFC with smartphone;

Data integrity and management on remote servers;

Data analytics and/or artificial intelligence on data analysis as the SMARCK manufacturer may acquire data from a large number of job sites allowing additional analytics, reporting, alarms etc.;

A SMARCK manufacturer may establish so-called "big data" on construction material properties and construction material curing cycles/processes across a large number of job sites, geographic regions, time frames etc. allowing them to provide feedback from their server-based processes to the end user;

Push notifications, such as for example the formwork company is notified when it is time to remove the formwork based upon actual concrete curing data; and Heat optimization wherein for example closed loop feedback of the temperature history and strength development can be employed to optimize heating employed in cold climates to ensure the concrete slabs gain sufficient strength within a specific period.

In addition to measuring, for example, temperature, DC electrical conductivity, and AC electrical conductivity it would be evident that additional parameters as discussed and described supra in respect of embodiments of the invention may be measured and monitored, including, but not limited to, concrete moisture content, concrete internal relative humidity, concrete pH, concrete mixture consistency, concrete workability (slump), concrete air content, hydraulic pressure, segregation, cracking, penetration of external ions into concrete, dispersion of fibers, and dispersion of chemical additives and supplementary cementitious materials.

Figure 4:
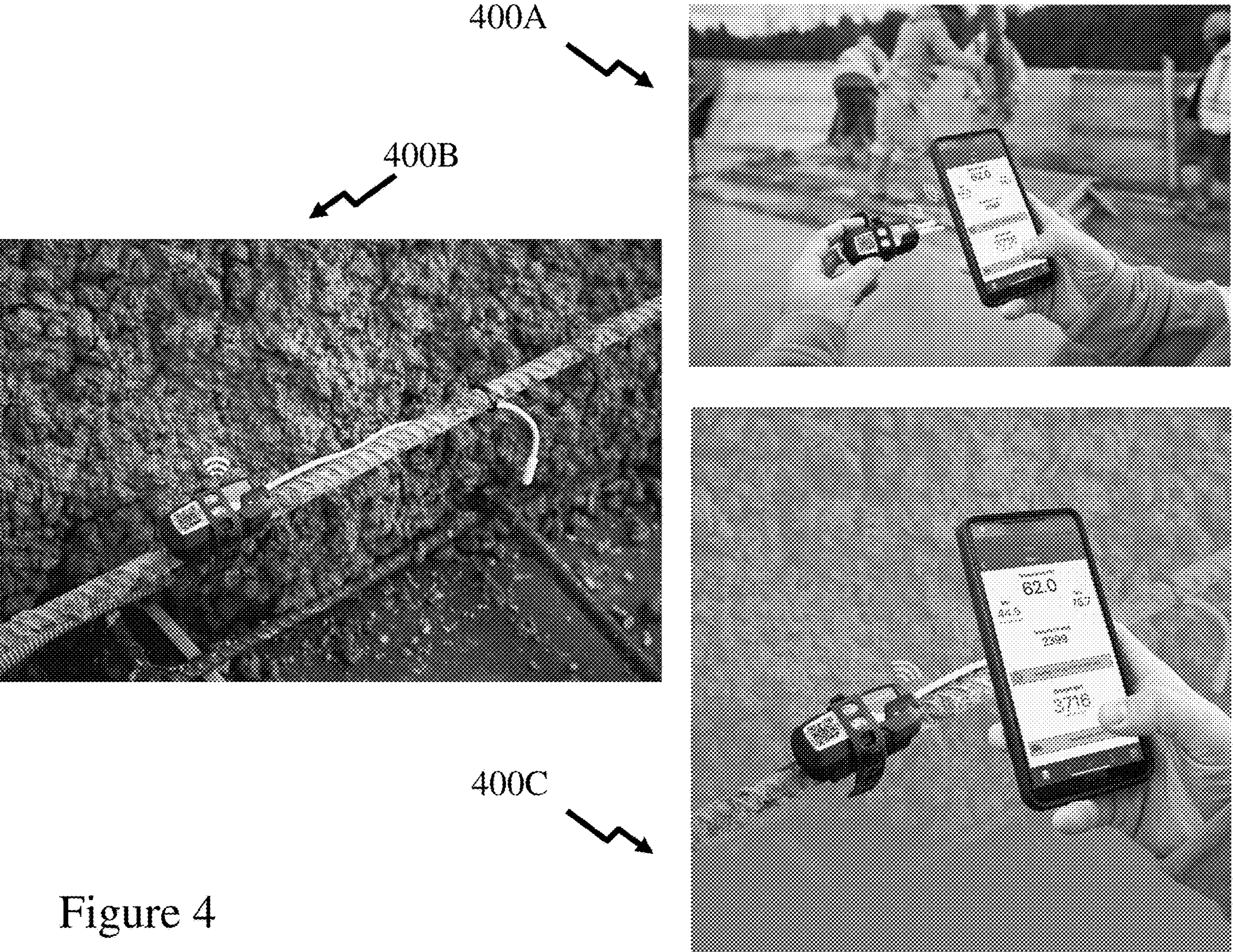
FIG. 4 depicts a sensor according to the embodiment of the invention prior to deployment, in deployed state and being read in deployed state.

FIG. 4 depicts a sensor according to the embodiment of the invention prior to deployment, in deployed state and being read in deployed state in first to third views 400A to 400C, respectively. Referring to first view 400A a user is depicted wirelessly communicating from a smartphone, although other PEDs may be employed. Initially, the user may acquire an image of the barcode on the sensor establishing the unique identity of the sensor such that their PED can establish communications to that sensor discretely even in the presence of multiple sensors within wireless range of the PED (or FED within other embodiments of the invention). Once wireless communications are established with the sensor the user's PED may transfer information to the sensor and/or acquire information from the sensor. In these instances, the sensor detects wireless communications and awakes from a sleep state. Within other embodiments of the invention a sensor element, e.g., temperature sensor, may be stored within an opening within the sensor wherein removal of the sensor element from the opening within the sensor triggers the sensor to awake as removal from its initial shipped state with the sensor element deployed within the opening within the sensor body would indicate imminent deployment.

Accordingly, once data has been acquired from and/or provided to the sensor it is deployed and concrete pouring begins. As depicted in second view 400B the sensor is attached to a rebar with a strap and a sensor cable which terminates at the distal end from the sensor with a sensor head comprising a sensor element, is also tied to the rebar for part of its length according to how the sensor head will be deployed, e.g., how far below the rebar. As depicted in third view 400C the sensor can be subsequently wirelessly communicated with to retrieve sensor data, material characteristics, etc. even when buried in the wet concrete. Second and third views 400B and 400C showing only partial concrete pouring to allow the rebar and sensor to be visible.

Now referring to FIG. 5 there are depicted first to third SMARCKs 500A to 500C according to embodiments of the invention. Referring to first SMARCK 500A contacts 560 are formed within outer Shell 570 defining an interior within which are disposed a processor with associated memory 510 (hereinafter, processor). The processor 510 being coupled to a Wireless Transceiver 520 and a Battery 530. Accordingly, electrical conductivity (for example) between the contacts 560 may be monitored (e.g., arising from water within a concrete mix), processed with the processor 510, stored and then subsequently transmitted via Wireless Transceiver 520 when a link is established to a portable electronic device (PED) such as smartphone, tablet PC, or dedicated device. The Shell 570 may be formed from a variety of materials, including but not limited to, metals (from which the contacts are isolated by insulating rings etc.), ceramics (e.g. alumina, zirconia, etc.), composites (e.g. fiber reinforced polymer, ceramic matrix composites, concrete, glass-reinforced plastic) and plastics (e.g. short-fiber thermoplastics, long-fiber thermoplastics, thermosetting plastics, filled plastics, synthetic rubber, elastomer, etc.).

Second SMARCK 500B depicts essentially the same construction as SMARCK 500A except that the interior of the shell is now filled with a Filler 580. Second filler material 580 may be a resilient Filler 580 surrounded by a soft Shell 570 such as synthetic rubber or elastomer, for example, or alternatively the Filler 580 may be semi-resilient in combination with a resilient Shell 570. Such semi-resilient fillers 580 may include thermosetting resins, catalyzed resins, cured silicone gels, etc. used in conjunction with a Shell 570 formed from a plastic or rubber, for example.

Third SMARCK 500C exploits the same Filler 580 with Shell 570 but now an intermediate Casing 590 is disposed between the outer Shell 570 and the inner Filler 580. For example, Casing 590 may be an impermeable membrane, e.g., Gore-Tex™, that limits moisture ingress to the SMARCK 500C but allows air or gas permeability. Further, SMARCK 500C now comprises in addition to the processor 510, Wireless Transceiver 520, and Battery 530 additional sensors 560 which are coupled to first and second SENsor INTerfaces (SENINTs) 590A and 590B which together with contacts 560 provide external sensing data to the processor 510. Further a microelectromechanical system (MEMS) 540 within the SMARCK 500C provides data to the processor 510 wherein the MEMS 540 may comprise, for example, an accelerometer such as a one-dimensional (1D), two-dimensional (2D) or three-dimensional (3D) accelerometer providing data relating to motion, shock, etc. Within different embodiments of the invention some SENINTs may have direct exposure to the external environment whereas others may be indirect or via a barrier material etc. or have a characteristic that varies in response to an external environmental aspect. Sensors may include, but are not limited to, temperature, electrical resistance, pressure, light, acceleration (e.g. MEMS accelerometer), vibration (e.g. MEMS sensor), humidity (e.g. capacitive sensor barriered with a vapour barrier to prevent direct fluid contact), pH (e.g. ion sensitive field effect transistor—ISFET pH sensor), ion content (to detect externally penetrating chemicals or materials), chloride content, microphone or acoustic sensor (to detect crack propagation), gas sensor (e.g. nitrogen, oxygen to detect air within cracks propagating to the surface of the concrete), corrosion detectors, visible optical sensors, ultraviolet optical sensors, and infrared optical sensors. More advanced sensors may provide dedicated hardware, functionality, and software to enable more advanced techniques such as nuclear magnetic resonance, electrochemical, X-ray diffraction, optical spectrometry, thermogravimetric analysis, a half cell, etc. as well as corrosion resistance, etc.

Figures 6A, 6B:
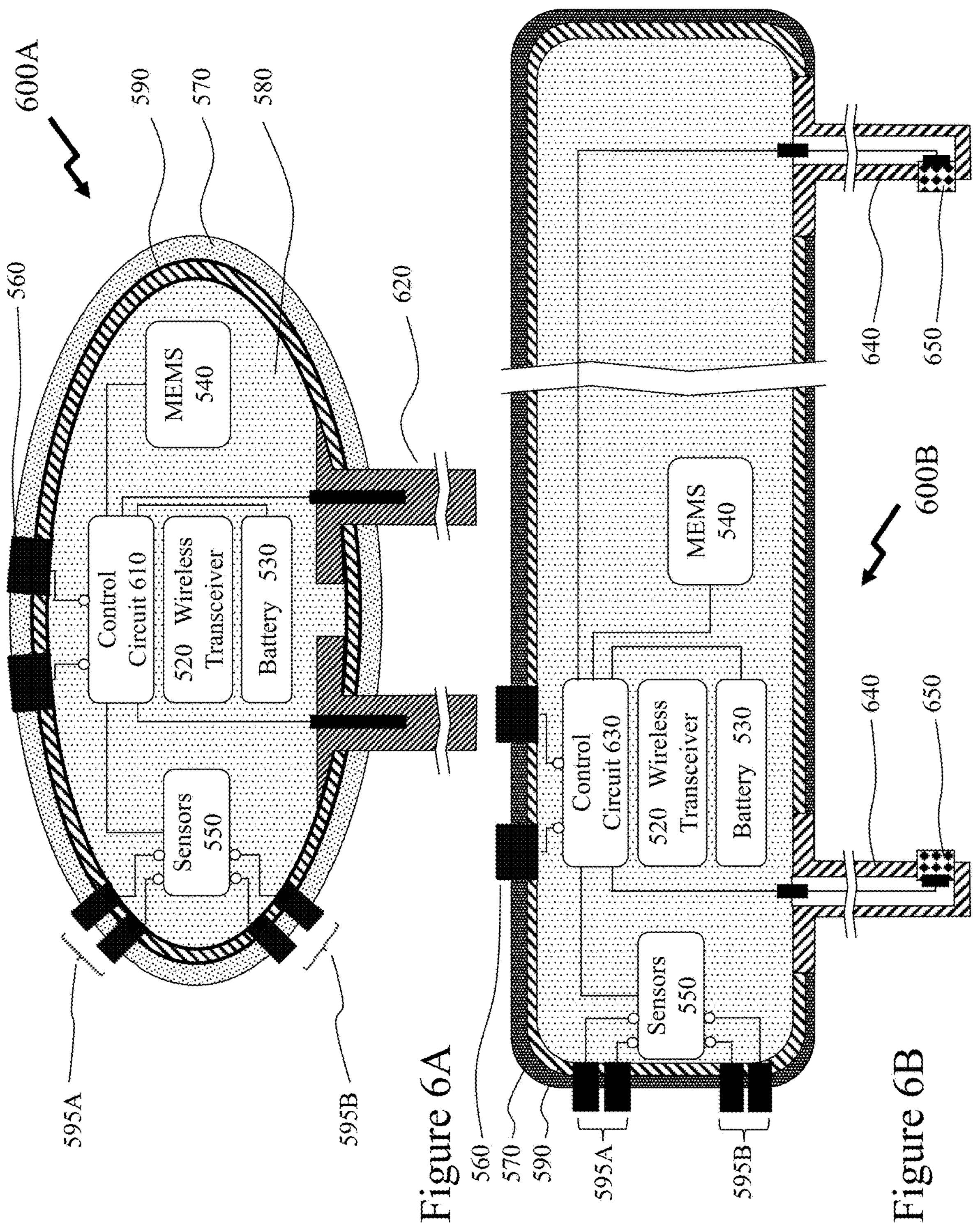
FIGS. 6A and 6B depict exemplary embedded sensor concepts according to embodiments of the invention for providing time domain to establish water content within concrete.

Now referring to FIGS. 6A and 6B there are depicted exemplary embeddable SMARCK sensor concepts according to embodiments of the invention for providing time domain to establish water content within concrete. Accordingly, referring initially to FIG. 6A SMARCK 600A incorporates a time domain reflectometry-based water content sensor. As such SMARCK 600A comprises contacts 560 formed within an outer Shell 570 defining an interior within which is an intermediate Casing 590 wherein the interior is filled within Filler 580. Disposed within the SMARCK 600A are control circuit 610, Wireless Transceiver 520, Battery 530, MEMS 540, and Sensors 550 which are coupled to first and second SENsor INTerfaces (SENINTs) 595A and 595B. The Control Circuit 610 coupled to the Probes 620 comprises, typically, in addition to the pulse generator and timing circuit for the time domain reflectometry measurement, a microprocessor and a memory. Accordingly, pulses applied to the Probe(s) 620 lead to a measurement of the effective dielectric constant and through calibration data the water content of the construction material the SMARCK 600A is embedded within. Whilst SMARCK 600 depicts a pair of probes 620 it would be evident that within other embodiments of the invention the SMARCK may have a single probe or multiple probes.

Referring to FIG. 6B there is depicted a SMARCK 600B incorporating a pulse based water content sensor comprising probes 640 and Antennae 650. As such SMARCK 600B comprises Contacts 560 formed within an outer Shell 570 defining an interior within which is an intermediate Casing 590 wherein the interior is filled within Filler 580. Disposed within the SMARCK 600A are Control Circuit 630, Wireless Transceiver 520, Battery 530, MEMS 540, and Sensors 550 which are coupled to first and second SENsor INTerfaces (SENINTs) 595A and 595B. The Control Circuit 630 coupled to the Probes 640 comprises, typically, in addition to the microwave/RF generator and timing circuit for the pulse based measurements, a microprocessor and a memory. Accordingly, pulses applied to one of the Probes 640 and therein its Antenna 650 are transmitted and coupled to the other Antenna 650. Accordingly, the resulting time domain measurement yields the effective dielectric constant of the construction material and through calibration data the water content of the construction material the SMARCK 600B is embedded within is established.

The Control Circuits 610 and 630 may comprise, for example, a microprocessor or controller, a pulse generator for generating the electrical pulse/signal, a microwave/RF switch, a pulse detection circuit for detecting the returned electrical pulse/signal, and a timing circuit to determine the timing between the generation of the electrical pulse/signal and receipt of the returned electrical pulse/signal.

Figures 7A, 7B, 7C, 7D:
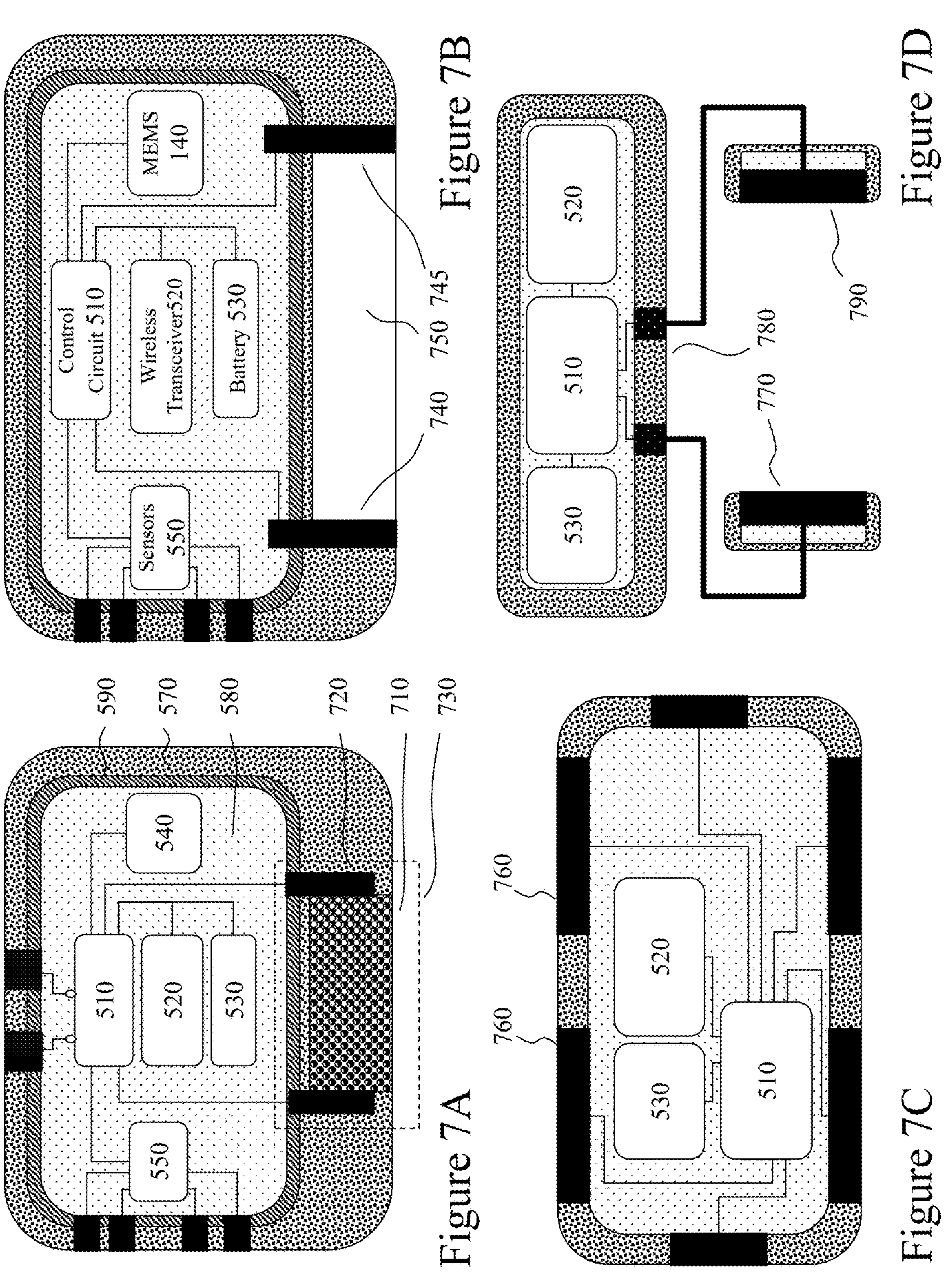
FIGS. 7A to 7D depict exemplary embedded sensor concepts according to embodiments of the invention.

Referring to FIGS. 7A to 7D there are depicted exemplary embeddable SMARCK sensor concepts according to embodiments of the invention. Referring to FIG. 7A there is depicted an exemplary SMARCK design comprising a Control Circuit 510, Wireless Transceiver 520, Battery 530, MEMS 540, and Sensors 550 which are coupled to first and second SENsor INTerfaces (SENINTs) 595A and 595B. The Control Circuit 510 is also coupled to Contacts 560 and a Resistivity Sensor 730 comprising a porous Material 710 and resistivity Contacts 720. The porous material 710 is exposed to the external environment such that when embedded within the construction material the porous Material 710 can reach equilibrium with the solution portion of the construction material. Accordingly, the Control Circuit 510 can establish resistivity measurements for the resistivity Sensor 730. As depicted the SMARCK comprises an intermediate Casing 590 which encapsulates the sensor Filler 580, e.g., a foam, air, etc. and is surrounded by an Outer Shell 570. As depicted the porous material 710 is entirely external to the intermediate Casing 590 and only resistivity Contacts 720 extend through it for the resistivity Sensor 730 although other Contacts 560 and first and second SENINTs 595A and 595B also do.

Optionally, a SMARCK comprising a porous Sensor 730 may be stored such that the porous material is sealed prior to use such as by the use of a peel-off cover or sealing the SMARCK within a bag discretely or in combination with a material such as a desiccant or solution of predetermined and known composition. Optionally, a solution may be added to the porous Material 710 prior to deployment, e.g., deionized water.

Referring to FIGS. 7B to 7D respectively there are depicted exemplary SMARCK designs according to embodiments of the invention. Within FIG. 7B the SMARCK comprises the Control Circuit 510, Wireless Transceiver 520, Battery 530, MEMS 540, and Sensors 550 which are coupled to first and second SENsor INTerfaces (SENINTs) 595A and 595B. The Control Circuit 510 is also coupled to microwave Emitter 740 and microwave Receiver 745 which are disposed at opposite ends of a Cavity 750 formed in the external surface of the SMARCK. Accordingly, when the SMARCK of FIG. 7B is embedded into a material the material fills the Cavity 750 such that microwave/RF signals emitted by the microwave Emitter 740 are coupled to the microwave receiver 5045 through the material filling the cavity. Accordingly, variations in the microwave properties of the material filling the Cavity 750 result in variations in the transmission delay and/or attenuation in the microwave/RF signals received by the microwave Receiver 745. Accordingly, these variations can be converted by the Control Circuit 510 directly or by a remote device to which the data is transmitted via the Wireless Transceiver 520.

Now referring to FIG. 7C there is depicted a SMARCK according to an embodiment of the invention comprising a Battery 530, Wireless Transceiver 520, and Control Circuit 510 which is connected to the Battery 530 and Wireless Transceiver 520 together with multiple microwave Transducers 760. Within an embodiment of the invention each microwave Transducer 760 may comprise a microwave transmitter and a microwave receiver wherein each SMARCK may be established through the Control Circuit 510 to transmit microwave/RF signals in a first mode and receive microwave/RF signals in a second mode. Accordingly, the SMARCK design depicted in FIG. 7C may alternate between these modes according to a predetermined schedule stored within a memory such that the SMARCK alternately transmits and receives. With another SMARCK within the material operating according to a second predetermined schedule then one SMARCK may be receiving whilst another SMARCK is transmitting and transmitting when the other SMARCK is receiving. Optionally, within other embodiments of the invention a subset of the microwave Transducers 760 may be microwave transmitters whilst another subset of the microwave transducers 760 may be microwave receivers.

Accordingly, multiple SMARCKs according to the design depicted in FIG. 7C may be disposed within a material then these may upon initial deployment establish initial microwave/signal properties such as received signal level amplitudes and timing of signals etc. transmitted by a subset of the SMARCKs to the other SMARCKs. Subsequently, variations of properties derived from subsequently transmitted/received microwave/RF signals can be employed to establish variations within the material within which the SMARCKs are deployed. Accordingly, in contrast to the SMARCK depicted in FIG. 7B the distance between microwave transmitter and microwave receiver is not limited to the dimensions of the SMARCK design but rather the distance between the SMARCKs within the material. Accordingly, each SMARCK may transmit a different microwave/RF signal, for example, upon a different frequency or encoded differently such that a SMARCK receiving multiple microwave/RF signals can determine which SMARCK they were transmitted by and thereby differentiate between signals from other SMARCKs.

Alternatively, referring to FIG. 7D an alternative SMARCK design, SMARCK 780, employs a Control Circuit 510 which is coupled to a Battery 530 and Wireless Transceiver 520 as well as a first microwave Module 770 and a second microwave module 790. For example, the first microwave Module 770 may be a transmitter and the second microwave Module 790 a receiver. Alternatively, the first microwave Module 770 and second microwave Module 790 may each comprise a microwave transceiver. Accordingly, microwave measurements may be established in dependence upon the microwave signals transmitted from a microwave module, such as the first microwave Module 770, to another microwave module, such as the second microwave Module 790 or vice-versa. In contrast to the SMARCK in FIG. 7B the distance between microwave transmitter and microwave receiver is not limited to the dimensions of the SMARCK but rather the distance between the first microwave Module 770 and second microwave Module 790 within the material. Accordingly, this separation is determined by the positioning of the first microwave Module 770 and second microwave Module 790 and/or the lengths of the cables connecting the first microwave Module 770 and second microwave Module 790 to the first device 780.

Within an alternate configuration of SMARCKs according to embodiments of the invention as described and depicted with respect to FIGS. 7B to 7D respectively microwave transmitter/receiver/transceiver elements may be replaced with acoustic (ultrasonic) elements allowing a SMARCK to perform acoustic (ultrasonic) based air content determination of the construction material. Examples of transducer elements for such acoustic (ultrasonic) based material characterisation SMARCKs may include, but are not limited to, electromagnetic acoustic transducer (EMAT), piezoelectric transducers such as those exploiting polyvinylidene fluoride (PVDF), loudspeakers such as piezoelectric and electrostatic for example, and microphones such as piezoelectric, fiber optic, and capacitance based for example. Optionally a SMARCK may contain one, two or multiple transducer elements acting as acoustic transmitter, acoustic receiver or as both acoustic transmitter and acoustic receiver. Optionally, the outer surface of the SMARCK may be the acoustic transducer. Optionally, a SMARCK may contain acoustic (ultrasonic) and microwave based measurements.

Figure 8:
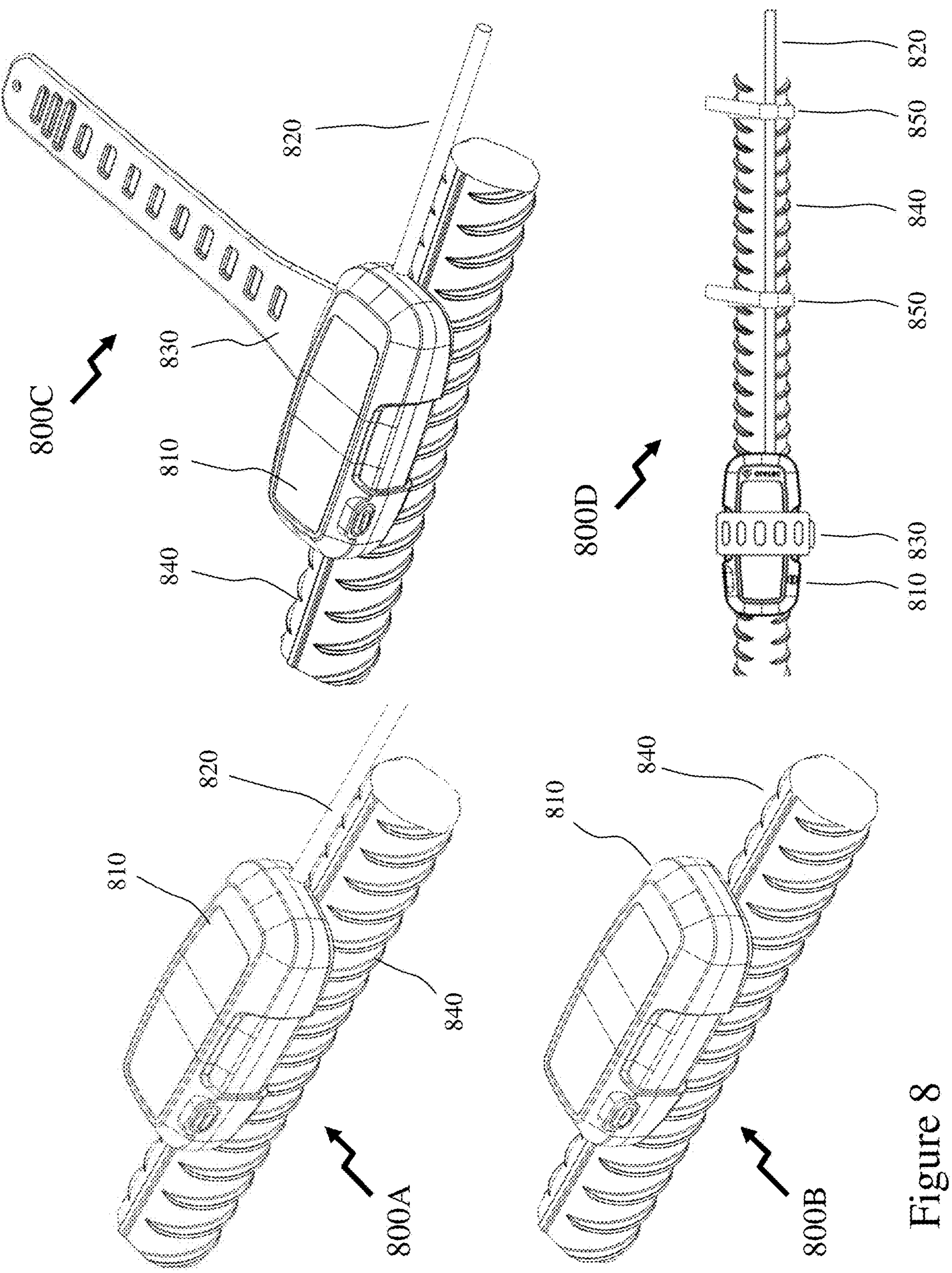
FIG. 8 depict sensors according to an embodiment of the invention.

Now referring to FIG. 8 there are depicted exemplary first to fourth SMARCKs 800A to 800D deployed with respect to rebar within concrete although it would be evident that SMARCKs may be attached to other elements within a construction project or be deployed free without physical retention to an element of the construction project. Accordingly, first SMARCK 800A which comprises a sensor Body 810 and a sensor Cable 820 but does not incorporate an integrated strap forming part of the SMARCK. The sensor Body 810 may incorporate on a lower surface a geometry designed to conform to the outer surface of a structural element, such as Rebar 840, and/or features for improving grip/friction between the sensor Body 810 and the structural element, e.g., Rebar 840. The sensor Cable 820 couples a remote sensor to the sensor Body 810 and to electronics within the sensor Body 810. The sensor Body 810 may incorporate one or more other sensors as well as other sensor Cables 820. Referring to second SMARCK 800B no external cable(s) are depicted where the sensor Body 810 is now self-contained with the one or more sensors integrated within it. As depicted first and second SMARCKs 800A and 800B may be attached to the structural element, e.g., Rebar 840, via a strap, cable tie, etc. which have not been depicted for clarity.

In contrast SMARCK 800C in FIG. 8 now includes an integral Strap 830 in conjunction with the Body 810 and sensor Cable 820. Hence, the SMARCK 800C may be attached to a structural element such as Rebar 840 using the integral Strap 830. The holes within the Strap 830 engaging a projection, not depicted for clarity, on the Body 810. In a similar manner as that described with respect to SMARCK 800A the surface of the Strap 830 which engages against the Rebar 840 may have additional features to improve retention of the SMARCK 800C in position so that it does not rotate on the Rebar 840 for example. Then as depicted with fourth SMARCK 800D where the strap has been wrapped around the Rebar 830 and Body 810 the sensor Cable 820 may be retained in position along the Rebar 840 with second Straps 850, for example elastomeric wraps, cable ties etc.

Figures 9A, 9B:
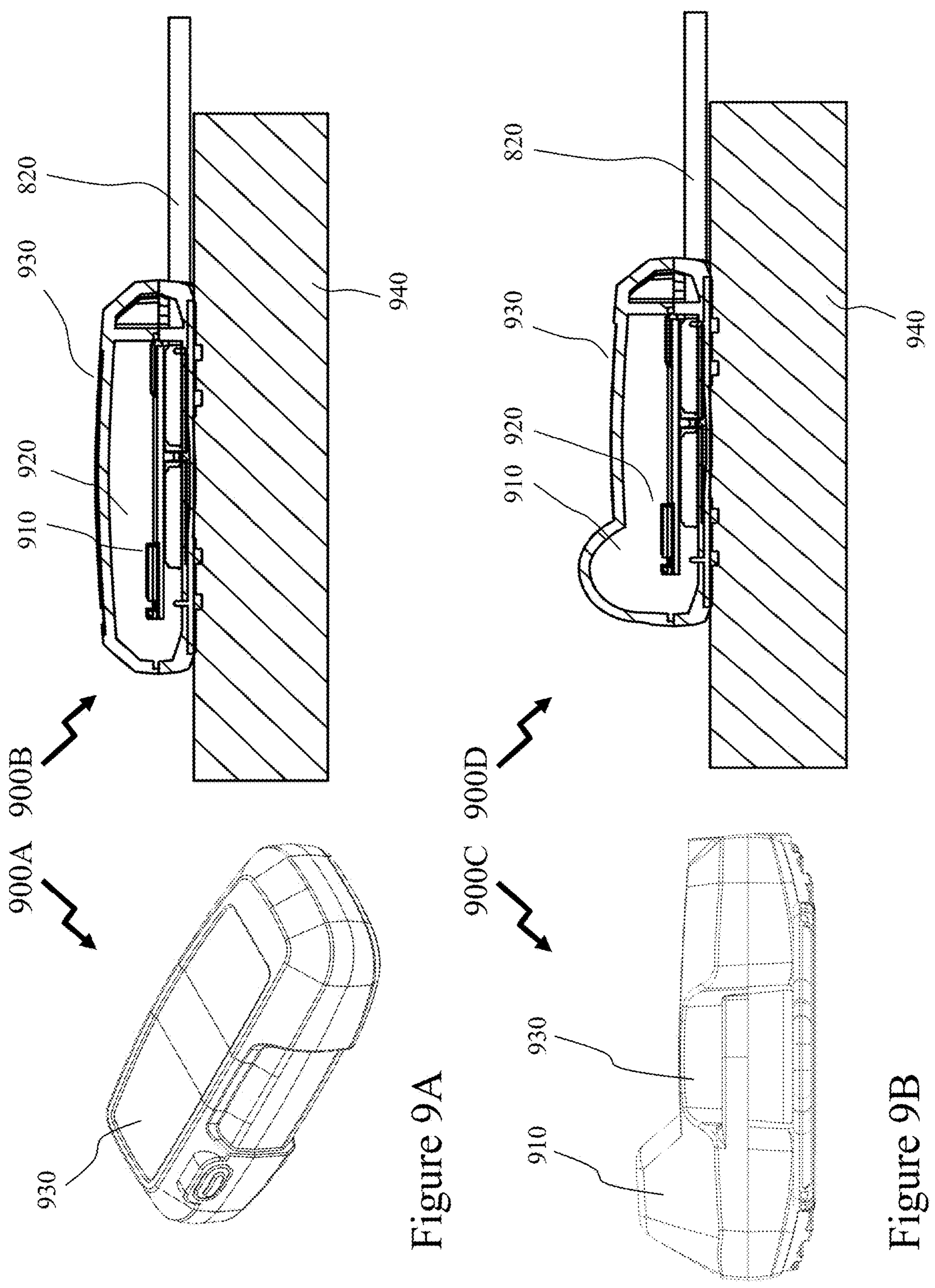
FIGS. 9A and 9B depict exemplary sensors according to embodiments of the invention.

Now referring to FIGS. 9A and 9B there depicted exemplary SMARCKs according to embodiments of the invention. Within embodiments of the invention a SMARCK may incorporate a wireless transmitter or wireless transceiver which employs a wireless antenna. Accordingly, when a SMARCK according to such an embodiment of the invention is embedded within a material or structure then the closer the wireless antenna is to the surface of the material or structure then either the stronger the wireless signal(s) transmitted and/or received from another device external to the material or SMARCK or the deeper within the material or structure the SMARCK according to an embodiment of the invention can be embedded.

Referring to FIG. 9A there are depicted first and second images 900A and 900B respectively of a SMARCK sensor according to an embodiment of the invention. First image 900A being a perspective image and second image 900B being a cross-sectional view. Accordingly, within second image 900B there is depicted the sensor Body 930 with Antenna 910 with a Volume 920 between the Antenna 910 and Body 930. The Volume 920 may, for example, be filled with air, an inert fluid, or a filler.

In contrast referring to FIG. 9B there are depicted third and fourth images 900C and 900D respectively of a SMARCK according to an embodiment of the invention wherein the upper surface of the SMARCK (as referenced to towards the surface of a material the SMARCK is embedded within) includes a dome or protrusion. This allows a wireless antenna forming part of the SMARCK to either be positioned higher above a rebar or element of a structure etc. when the SMARCK is attached on the rebar or element of the structure etc. or for the wireless signals to radiate through an increased distance of air, inert fluid, filler etc. before passing through the Body 930 into the surrounding material. The inventors have also established that through appropriate design of the dome or protrusion that the amplitude of the wireless signals in the near-field can be increased thereby affecting the far-field propagation. Further, as outlined below the inventors have also established antenna designs which address use of such SMARCKs within a material such as concrete wherein the time dependent dielectric constant of the intervening material between the SMARCK antenna and external air varies as a function of curing/time.

Gateways

Whilst a short range wireless technology/protocol such as Bluetooth provides for wireless communications between embedded or embeddable sensors and a PED such as a user's smartphone there are several challenges and implementation barriers which exist limiting the generalised deployment of embeddable sensors within construction materials. These challenges/implementation barriers include:

- a strict requirement for shallow sensor embedment depths (e.g., typically less than 5 cm (approximately 2") in order to allow a reliable communication between the sensor and the PED;
- the limited communication range between the sensor and the PED of typically 6 metres (approximately 20 feet);
- the required availability of personnel on site to connect to the sensor and collect data;
- the requirement for frequent, perhaps manual, connection to the embedded sensors in order to retrieve and share data.

For example, the first issue requires the placement of the sensor upon a rebar, such as depicted in FIG. 4, which will be at a defined depth from the surface once embedded within the construction material. However, placement of the temperature sensor at a deeper depth requires the use of a cable connecting a remote sensor head to the embeddable sensor. This can lead to other issues if the sensor head moves during pouring of the construction material or is damaged during handling etc. The other issues also require that deployments of the embeddable sensors are in accessible locations where site personnel are or can be frequently available and can connect to and retrieve necessary sensor data. This is particularly important in the initial hours and days as the opportunities for reworking become more limited and expensive as time progresses with the curing construction material.

Accordingly, these challenges/implementation barriers become increasingly time consuming and expensive for large projects with tens, hundreds and potentially thousands of sensors.

Accordingly, it would be beneficial to provide embedded sensors in a wider range of application scenarios including, but not limited to:

- large structures where shallow embedment depths and close proximity to sensors may not be feasible;
- sites where access to sensor location proximity following concrete pouring is dangerous or not allowed;
- sites with extremely large concrete pours where connecting to tens of sensors every day or every few hours is extremely inconvenient and time consuming; and
- sites in remote areas where a continuous availability of site personnel with knowledge of sensor data may not be possible such as road projects.

These cases, which cover a wide range of structures, typically do not allow a utilization of sensor technology that uses a short range communications technology such as Bluetooth, for example, for communication. In order to overcome these barriers for wider utilization the inventors have established an embeddable sensor which acts in combination with a local gateway allowing communications at very long distances, up to 200 meters (approximately 660 feet) between sensor and gateway, and depths reaching up to 30 cm (approximately 12 inches) in concrete. Whilst a tradeoff between communication range and depth exists the coverage is significantly larger than with a short range wireless technology such as Bluetooth allowing a large number of sensors to be associated with a gateway. The gateway provides automatic connection to and data retrieval from the embedded sensors; fully autonomously without the need for manual user interaction. Potentially hundreds of sensors can be associated with a single gateway. The gateway is also intended to communicate and send the retrieved data, with a wired or wireless protocol to a remote storage, e.g. a cloud platform; wherein the pushed data to the remote storage means that the user does not need to be within the sensor's range, or on the job-site at all, to extract the sensor data and/or data relating to the construction material established in dependence upon processing of the sensor data. A user can access the remote stored data through a cloud platform and dashboard within a web browser as well as through dedicated software and/or software application installed on their PED, FED, or wearable device.

Within an embodiment of the invention the sensors and gateway exploit a low-power wide-area network (LPWAN) protocol employing spread spectrum modulation techniques derived from chirp spread spectrum (CSS) technology. One such protocol being LoRaWAN™ (LOng RAnge WAN) although other protocols employing spread spectrum techniques for long range/low power (or ultra-low power) communications. One such example being, Spark Microsystems of Montreal with Ultra-Wideband (UWB) spread spectrum transceivers with ultra-low power consumption. Such protocols being beneficial in applications where data rate is not critical and relatively small amounts of data are transferred since they can offer link budgets in excess of 150 dB.

However, even with the adoption of a protocol such as LoRaWAN™ there are issues when considering low power embedded sensors which cannot be recharged but may be expected to operate for weeks, months, even years. Accordingly, the inventors have established several context-specific methods and systems in order to allow the implementation of such a protocol within embedded sensors.

An initial method established by the inventors relates to updating the embedded sensor. It would be evident that the availability of a gateway associated with a plurality of embedded sensors locally deployed which is accessible continuously not only allows for the continuous or near-continuous transfer and back-up of materials properties/data acquired by the embedded sensors to a central cloud data storage system, but that it also allows the user, or the sensor manufacturer, to perform over-the-air updates of the sensor whenever desired.

As evident from the inventors previous disclosures of embedded sensors, e.g. SMARCKs, within U.S. Patent Publication No. 2017/0,284,996 entitled "Embedded Wireless Monitoring Sensors", U.S. Patent Publication No. 2017/0,108,456 entitled "Electrical Methods and Systems for Concrete Testing" and U.S. Patent Publication 2018/0,238,820 entitled "Methods and Systems Relating to Construction Material Assessment" as well as World Patent Application PCT/CA2020/050440 entitled "Embedded Sensor Devices and Methods" and World Patent Application PCT/CA2019/000057 entitled "Construction Material Assessment Method and Systems" that the SMARCKs may store acquired data by sensors relating to the construction material the SMARCK is embedded within, store data relating to the batch of construction material the SMARCK is embedded within, time and location information, as well as algorithms for the processing of acquired sensor data to values of one or more material properties of the construction material the SMARK is embedded within.

Accordingly, an update to be pushed to a SMARCK may comprise for example, but not be limited to, one or more of:

- data relating to the batch of construction material the SMARCK is embedded within;
- an adjustment to an algorithm for the processing of acquired sensor data to a value or values of one or more material properties of the construction material the SMARK is embedded within; and
- the addition of algorithm for the processing of acquired sensor data to a value or values of one or more material properties of the construction material the SMARK is embedded within.

However, an update to be pushed to a SMARCK may also comprise, but not be limited to, one or more of:

- an adjustment in a periodicity of measurement;
- an adjustment to a mode of measurement;
- addition of a mode of measurement;
- a firmware update.

Within embodiments of the invention these updates may be pushed to all SMARCKS deployed, pushed to each SMARCK as it is added to a database of deployed SMARCKs, or pushed to a specific subset of the SMARCKS deployed.

The specific subset may be established, for example, as those relating to a specific construction material, a specific batch of construction material, a specific type or composition of construction material, a specific project, a specific type of structure being formed with the construction material (e.g., high rise tower blocks, bridges, pilings etc.), a specific contractor, and a specific manufacturer of a construction material.

The specific subset may be established, for example, as those SMARCKS performing a specific measurement at a specific time, e.g., all those SMARCKs that have been monitoring for 1 week, 1 month etc.

The specific subset may be established, for example, based upon the measurements obtained and/or processed results from the measurements obtained. For example, a sensor may be measuring temperature at several points within the sensor and the update could adjust to stop one, etc.

The specific subset may be established, for example, based upon a change in deployment scenario. For example, SMARCKS may have been deployed for curing/strength data relating to an element of infrastructure but a new requirement for extended monitoring is now established such that the lifetime of the SMARCK must shift from a month, for example, to 5 years but it is now encased in concrete. Alternatively, SMARCKs with temperature and conductivity sensors may have been deployed within a batch of material scheduled for use within a dry land based environment so only temperature monitoring firmware was loaded but the batch was redirected to a wet river based environment with additional additives added to the batch en-route such that now the SMARCKs should monitor conductivity.

The specific subset may be established, for example, based upon the measurements obtained and/or processed results from the measurements obtained indicating that the SMARCK may require further interrogation and/or troubleshooting.

Whilst in some scenarios these updates may be pushed to some SMARCKs via short range wireless protocols such a methodology is time consuming and the user would be obliged to be within the vicinity of the SMARCKs for prolonged periods of time which is inconvenient. However, within other scenarios access to the SMARCKs post deployment is not feasible using the short range wireless protocols whereas alternate wireless protocols such as LoRaWAN™ support extended range and/or extended SMARCK depth.

Figure 10:
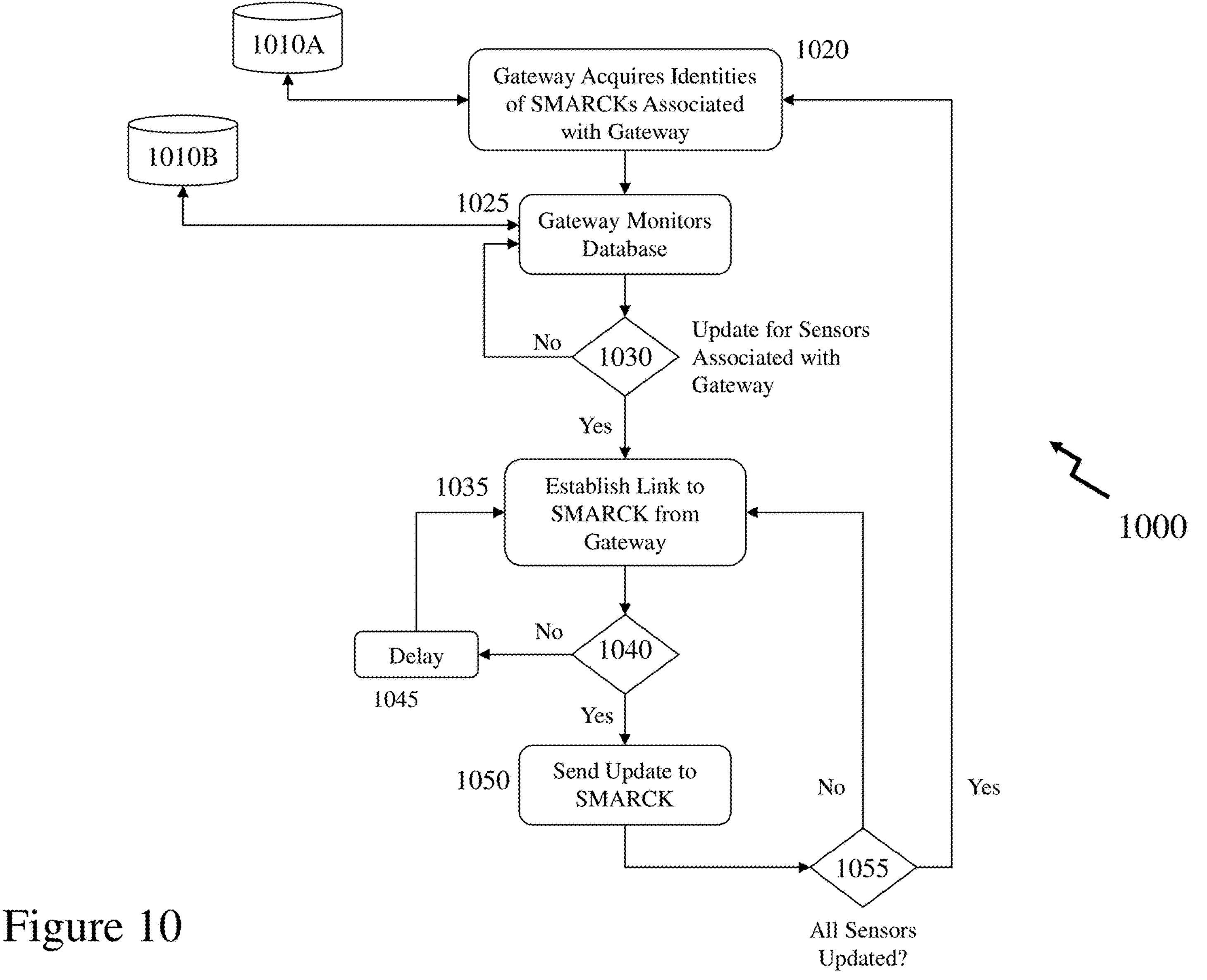
FIG. 10 depicts an exemplary flow chart according to an embodiment of the invention for adding new sensors to a gateway independent of a user having to configure the gateway initially or subsequently for the addition of a sensor and pushing updates to the sensors.

FIG. 10 depicts an exemplary flow chart of a Process 1000 according to an embodiment of the invention for adding new sensors to a gateway independent of a user having to configure the gateway initially or subsequently for the addition of a sensor and pushing updates to the sensors. Accordingly, as depicted Process 1000 comprises first to eighth steps 1020 to 1055, respectively. These comprising:

- First step 1020 wherein the gateway acquires the identities of SMARCKs which are associated with the gateway from a first Database 1010A;
- Second step 1025 wherein the gateway monitors a second Database 1010B for updates to any of the SMARCKs associated with it as established by the data retrieved within first step 1010A;
- Third step 1030 wherein a determination is made as to whether the SMARCKs associated with the gateway have an update to be pushed to them wherein upon a negative determination the Process 1000 loops back to second step 1025 otherwise it proceeds to fourth step 1035;
- Fourth step 1035 wherein the gateway seeks to establish a link with a SMARCK within the SMARCKs associated with the gateway;
- Fifth step 1040 wherein a determination is made as to whether the gateway has formed links to the SMARCKs or not, wherein if not the process proceeds back to fourth step 1035 via sixth step 1045 otherwise it proceeds to seventh step 1050;
- Sixth step 1045 wherein the gateway enters a delay before trying to establish the link to the SMARCK again;
- Seventh step 1050 wherein the gateway sends the update to the SMARCK and then proceeds to eighth step 1055; and
- Eighth step 1055 wherein Process 1000 determines if the gateway has sent updates to all SMARCKs requiring updates or not, wherein upon a positive determination it proceeds to first step 1020 otherwise it proceeds to fourth step 1035 and progresses with the next SMARCK.

It would be evident that the loop including sixth step 1045 with the delay may include a counter, total timer of attempting to establish a link, or another mechanism to stop the loop executing endlessly absent a link to the SMARCK being established. Accordingly, Process 1000 establishes via a first database 1010A which SMARCKs are associated with the gateway and via a second database 1010B which SMARCK (s) require updates being pushed to them. It would be evident that sixth step 1050 may include an additional step of retrieving the update for the SMARCK from a third database, not shown. In this manner each SMARCK may be updated with a specific update specific to it and/or an update for a number of SMARCKs of which it is one.

A standard protocol such as LoRaWAN may require regular periodic communications or continuous communications between the gateway and a SMARCK. However, with embedded sensors where low power consumption is required as the initial battery capacity is all there is it would be desirable to exploit an extended periodicity of communications between the SMARCK and the gateway, e.g., data is sent every 15 minutes rather than as acquired for example.

However, in cases where the gateway may not be in the vicinity of the SMARCK, communicating with the gateway at the regular intervals (e.g. every 15 minutes, perhaps more frequently) may not be desirable since such a mode of communication will lead to a degradation of the battery performance of the SMARCK which is irreversible and could lead to the SMARCK losing data or ceasing to acquire data prior to an intended duration of its data acquisition. Under these scenarios, it may be desirable to convert the sensor back to another wireless protocol, e.g., Bluetooth; thereby allowing use to be made of this lower power consumption protocol.

Figure 11A:
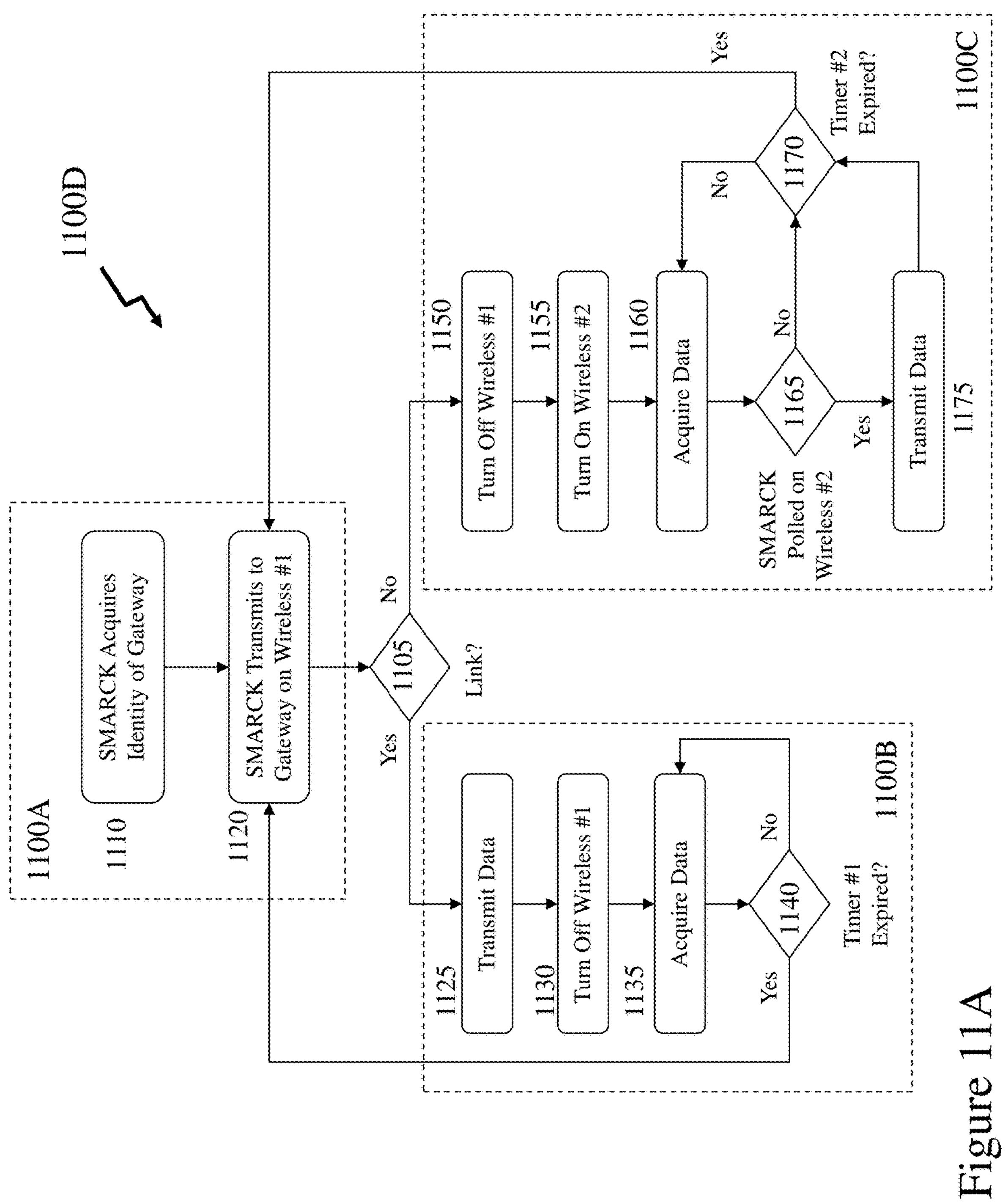
FIGS. 11A and 11B depict exemplary flow charts according to an embodiment of the invention for managing power consumption of an embedded sensors wireless interface according to a status of its link with a gateway.

Accordingly, referring to FIG. 11A there is depicted an exemplary flow chart Process 1100D according to an embodiment of the invention for managing power consumption of an embedded sensors wireless interface according to a status of its link with a gateway. As depicted Process 1100D comprises first to third Sub-Flows 1100A to 1100C respectively with Decision Step 1105. Accordingly, considering first Sub-Flow 1100A this comprises first and second steps 1110 and 1120 wherein:

- First step 1110 wherein a SMARCK acquires the identity of a gateway it is to authenticate with (or has previously authenticated with); and
- Second step 1120 wherein the SMARCK transmits to the gateway to establish a link.

Accordingly, first Sub-Flow 1100A may be initiated when a SMARCK is initially activated wherein the SMARCK acquires the gateway identity during an initial communication from the gateway to associate with the SMARCK and the SMARCK authenticates with the gateway. Alternatively, first Sub-Flow is only second step 1120 once the sensor is authenticated with the gateway. In Decision Step 1105 a decision is made as to whether the SMARCK has established a link with the gateway wherein a positive decision leads to Process 1000 proceeds to second Sub-Flow 1000B otherwise it proceeds to third Sub-Flow 1100C.

Second Sub-Flow 1000B comprises third to sixth steps 1125 to 1140 respectively; wherein

- Third step 1125 wherein the SMARCK transmits data to the gateway, e.g., all acquired data and/or processed data since the last transmission;
- Fourth step 1130 wherein the SMARCK turns off the wireless transceiver (Wireless #1) employed to communicate with the gateway (in order to save power, wherein it is inherent in second step 1120 that the SMARCK has turned on the wireless transceiver (Wireless #1);
- Fifth step 1135 wherein the SMARCK progresses to continue acquire data as per its current programming;
- Sixth step 1140 wherein the SMARCK determines whether a first timer, Timer #1, has expired wherein upon a positive determination the second Sub-Flow 1100B returns to second step 1120 in first Sub-Flow 1100A otherwise it loops back to fifth step 1135.

It would be evident that within embodiments of the invention the SMARCK may continue to acquire data whilst it is transmitting previously acquired data to the gateway. Wireless #1 may be a LPWAN wireless transceiver such as LoRaWAN™, a UWB wireless transceiver, or another wireless transceiver.

Third Sub-Flow 1000C comprises seventh to twelfth steps 1150 to 1175 respectively, wherein:

- Seventh step 1150 wherein the SMARCK turns off the wireless transceiver (Wireless #1) employed to communicate with the gateway (in order to save power, wherein it is inherent in second step 1120 that the SMARCK has turned on the wireless transceiver (Wireless #1);
- Eighth step 1155 wherein the SMARCK turns on another wireless transceiver (Wireless #2);
- Ninth step 1160 wherein the SMARCK progresses to continue acquire data as per its current programming;
- Tenth step 1165 wherein the SMARCK determines whether it has been polled on the other wireless channel associated with the other wireless transceiver (Wireless #2) or not where a positive determination results in the third Sub-Flow 1100C proceeding to twelfth step 1175 otherwise it proceeds to eleventh step 1170;
- Eleventh step 1170 wherein the SMARCK determines whether a second timer, Timer #2, has expired wherein upon a positive determination the third Sub-Flow 1100C returns to second step 1120 in first Sub-Flow 1100A otherwise it loops back to tenth step 1165 and continues acquiring data; and
- Twelfth step 1175 wherein the SMARCK transmits the data upon the other channel associated with the other wireless transceiver (Wireless #2) to the device which polled it.

Accordingly, under a standard mode of operating where the gateway and SMARCK can establish a link then Process 1100D loops through first Sub-Flow 1100A and second Sub-Flow 1100B where Timer #1 may be, for example, 15 minutes. If a link cannot be established then Process 1100D loops through third Sub-Flow 1100C. Timer #2 may, for example, be for example a multiple of Timer #1, e.g., 60 minutes, or it may be unrelated to Timer #1. Third sub-flow 1100C allows data to be locally extracted in the event of a failure of communications to the gateway, e.g., in a time sensitive step of a construction sequence such as determining predicted concrete strength for a batch of poured concrete within the initial 12 hours after pouring.

Within the embodiments of the invention the processes are described with respect to establishing a link between the gateway and a SMARCK. However, within other embodiments of the invention a link may be only considered established if upon transmitting data to the gateway the SMARCK receives a confirmation that the data was received at the gateway or from the remote storage. Within embodiments of the invention with devices with limited memory purging of transmitted data may be limited to only that data for which a positive confirmation that the data has been received by the remote storage system is received.

In order to detect if the gateway is within the vicinity of the SMARCK an authorization is periodically requested between the SMARCK and gateway, which is at a lower rate than the normal data transfer rate. For example, LoRaWAN™ sets this re-authorization at periods between 3 and 12 hours. Accordingly, the inventors have established a process wherein if this authorization is not successful for several subsequent authorization attempts, the SMARCK may revert to a mode where no data is being transferred to the gateway at the normal periodicity, e.g., 15-minute interval, and only authorization requests are performed at their defined periodicity, e.g., every 3 hours. Once the authorization is successful, the gateway is known to be within the sensor vicinity and therefore the protocol reverts back to the normal mode. At this point the stored data between the last successful authorization and the re-authorization is transferred from the SMARCK to the gateway and therein to the remote storage. However, if during this period of time the data is required access to the SMARCK may be via the other wireless protocol, e.g., Bluetooth, allowing critical time sensitive data to be retrieved and/or decisions made.

Figure 11B:
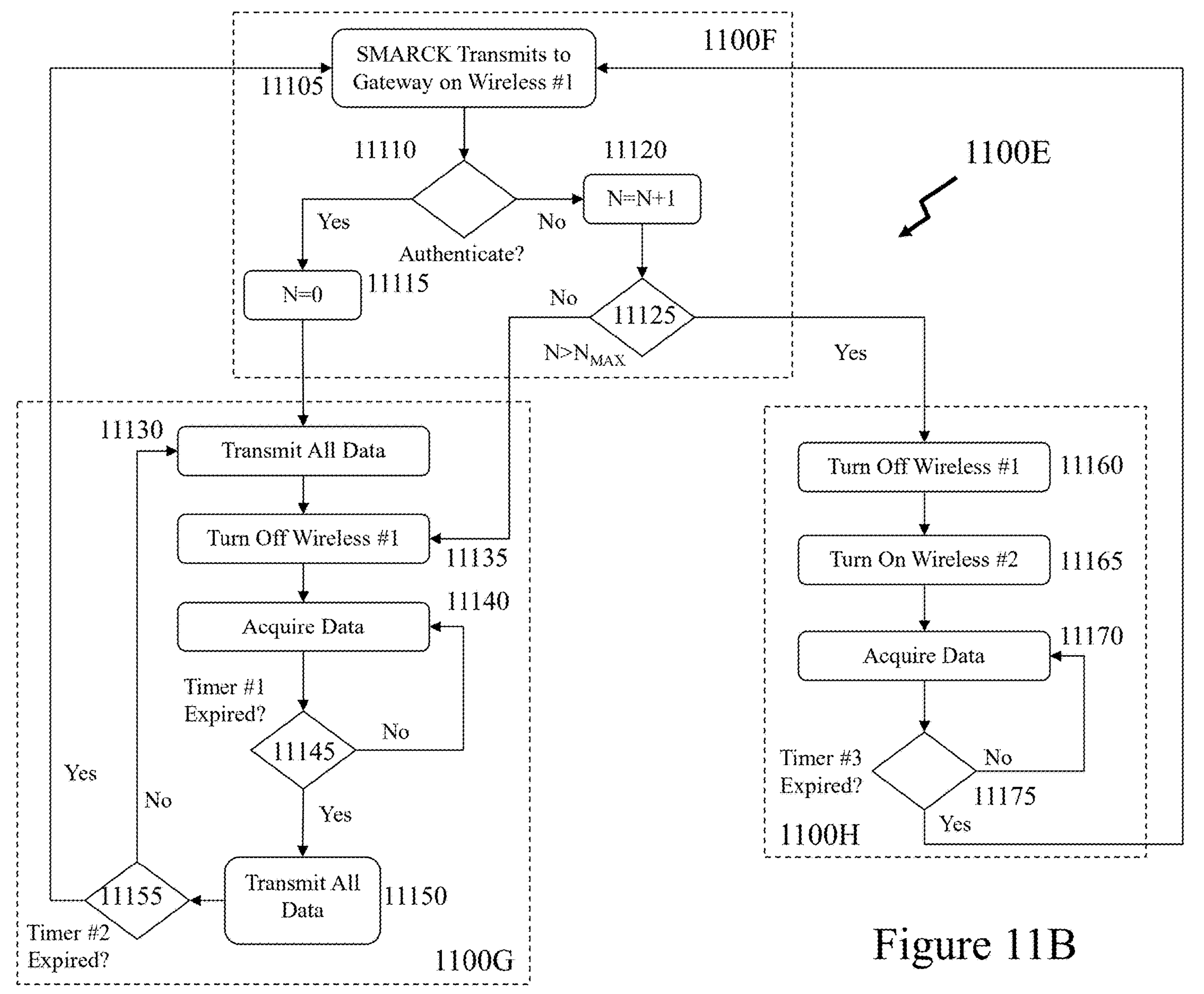

Now referring to FIG. 11B there is depicted an exemplary flow chart Process 1100E according to an embodiment of the invention for managing power consumption of an embedded sensors wireless interface according to a status of its link with a gateway. As depicted Process 1100E comprises first to third Sub-Flows 1100F to 1100H, respectively. Accordingly, considering first Sub-Flow 1100F this comprises first to fifth steps 11105 to 11125 wherein:

- First step 11105 wherein the SMARCK transmits to the gateway to establish authentication;
- Second step 11110 wherein a determination is made as to whether authentication was made or not wherein upon a positive determination the Process 1100E proceeds to third step 11115 otherwise Process 1100E proceeds to fourth step 11120;
- Third step 11115 wherein a counter N, is set to zero (N=0);
- Fourth step 11120 wherein the counter N is incremented; and
- Fifth step 11125 where a determination is made as to whether the counter N has exceeded a threshold, i.e., $N>N_{MAX}$, wherein upon a positive determination the Process 1100E proceeds to third Sub-Flow 1100H and upon a negative determination it proceeds to seventh step 11135 in second Sub-Flow 1100G.

Accordingly, in first Sub-Flow 1100F successful authentication results in the Process 1100E proceeding to second Sub-Flow 1100G. Failure for the authentication results in the Process 1100E determining whether a maximum number of unsuccessful authentications has been reached or not wherein, if so, the Process 1100E proceeds to third Sub-Flow 1100H otherwise the process loops through part of second Sub-Flow 1100G.

Accordingly, Second Sub-Flow 1100G comprises sixth to eleventh steps 11130 to 11150 respectively, which comprise:

- Sixth step 11130 wherein the gateway has been authenticated and the SMARCK transmits the data to the gateway;
- Seventh step 11135 wherein the SMARCK turns off the wireless transceiver (Wireless #1) employed to communicate with the gateway (in order to save power, wherein it is inherent in first step 11105 that the SMARCK has turned on the wireless transceiver (Wireless #1);
- Eighth step 11140 wherein the SMARCK progresses to continue acquire data as per its current programming;
- Ninth step 11145 wherein the SMARCK determines whether a first timer, Timer #1, has expired wherein upon a positive determination the second Sub-Flow 1100G proceeds to tenth step 11150 otherwise it loops back to eighth step 11140;
- Tenth step 11150 wherein the SMARCK transmits all data acquired within the duration of Time #1 before proceeding to eleventh step 11155; and
- Eleventh step 11155 wherein the SMARCK determines whether a first timer, Timer #2, has expired wherein upon a positive determination the second Sub-Flow 1100G proceeds to first step 11105 in first Sub-Flow 1100F otherwise it loops back to sixth step 11130.

Third Sub-Flow 1100H comprises twelfth to fifteenth steps 11155 to 11170 respectively, which comprise:

- Twelfth step 11160 wherein the SMARCK turns off the wireless transceiver (Wireless #1) employed to communicate with the gateway (in order to save power, wherein it is inherent in second step 11105 that the SMARCK has turned on the wireless transceiver (Wireless #1);
- Thirteenth step 11165 wherein the SMARCK turns on another wireless transceiver (Wireless #2) in case it is polled during this period of time that is not communicating with the gateway;
- Fourteenth step 11170 wherein the SMARCK progresses to continue acquire data as per its current programming; and
- Fifteenth step 11175 wherein a determination is made as to whether a third timer has expired or not wherein if a positive determination is made then Process 1100E looks back to first step 11105 to seek re-establishing communications with the gateway otherwise it loops back to thirteenth step 11170 and continues acquiring data.

Accordingly, consider the scenario where Time #1 is 15 minutes, Timer #2 is 3 hours, Timer #3 is 7 days and $N_{MAX}=3$. Accordingly, if, successful gateway authentication is achieved in first Sub-Flow 1100F then N=0 and the process proceeds in second Sub-Flow 1100G to acquire and transmit data every time Timer #1 expires, e.g., every 15 minutes. When Timer #2 expires, e.g., at 3 hours, then Process 1100E loops back to first Sub-Flow 1100F and seeks re-authentication. If authentication fails then N is set to N=1 and Process 1100E proceeds to loop through second Sub-Flow 1100G and continues to do so until either re-authentication is achieved, in which case N is reset to zero, or re-authentication attempts have failed four times in which case N=4 and $N>N_{MAX}$ wherein Process 1100E proceeds to third Sub-Flow 1100H until Timer #3 expires, e/g/ 7 days. Accordingly, whilst authentication continues data is sent to the gateway every 15 minutes, as set by Timer #1, with re-authentication every 3 hours, as set by Timer #2. Failure to re-authenticate within 24 hours results in the SMARCK going into a lower power mode wherein the wireless interface to the gateway is turned off, data is continuously acquired, and the SMARCK waits till Timer #3 expires to subsequently re-seek authentication, e.g., after 1 week.

It would be evident that the data being acquired may be flagged as transmitted to the gateway but absent a confirmation that the gateway was subsequently re-authenticated it is not flagged as sent. Accordingly, authentication subsequent to transmitting data by the SMARCK results in the flag being set to send. If re-authentication fails then the flag on the transmitted data is not set to send and once communications with the gateway are re-established the SMARCK may re-send all data flagged as transmitted but not sent until the gateway SMARK connection is subsequently re-authenticated such that it is now flagged sent.

Within embodiments of the invention Timer #1, Timer #2 in Process 1100D in FIG. 11A and/or Timer #1, Timer #2, and Timer #3 within Process 1100E in FIG. 11B may be constant.

Within other embodiments of the invention one or both of Timer #1, Timer #2 in Process 1100D in FIG. 11A and/or one or more of Timer #1, Timer #2 and Timer #3 within Process 1100E in FIG. 11B may be variable as a function of time since the SMARCK initially activated wherein the values of one or both of Timer #1, Timer #2 in Process 1100D in FIG. 11A and/or one or more of Timer #1, Timer #2 and Timer #3 within Process 1100E in FIG. 11B are defined for each time period of a plurality of time periods since initial activation of the self-contained device wherein each time period has a predetermined length of time. Accordingly, considering Process 1100E Timer #1 is an array Timer1 {1, . . . N}, Timer

#2 is an array Timer2{1, . . . N} and Timer #3 us an array Timer3 {1, . . . N} where N is the number of predetermined time periods. Accordingly, authentication and transmission of data may occur at a high rate during an initial period of time, e.g., a week after pouring concrete, at a moderate rate during a second period of time, e.g., the next 3 months as the concrete cures, and then at a low rate during a third period of time, from 3 months onward.

Accordingly:

a timer relating to authentication or transmission of data is determined in dependence upon a period of the plurality of time periods;

a first time period of the plurality of time periods is from initial activation of the SMARCK and has a first predetermined length of time where the timer has a first value;

each subsequent time period of the plurality of time periods is from the end of a preceding time period of the plurality of time periods; and each subsequent time period of the plurality of time periods has a predetermined length of time and the timer has a predetermined value established in dependence upon to current time period of the plurality of time periods currently active.

Within other embodiments of the invention one or both of Timer #1, Timer #2 in Process 1100D in FIG. 11A and/or one or more of Timer #1, Timer #2 and Timer #3 within Process 1100E in FIG. 11B may be variable as a function of a stage in the lifecycle of the SMARCK initially activated wherein the values of one or both of Timer #1, Timer #2 in Process 1100D in FIG. 11A and/or one or more of Timer #1, Timer #2 and Timer #3 within Process 1100E in FIG. 11B are defined for each period of a plurality of periods since initial activation of the self-contained device wherein each period is defined as continuing until a predetermined condition or characteristic of an environment the SMARCK is embedded within it met. Accordingly, considering Process 1100E Timer #1 is an array Timer1{1, . . . M}, Timer #2 is an array Timer2{1, . . . M} and Timer #3 us an array Timer3 {1, . . . M} where M is the number of periods. Accordingly, authentication and transmission of data may occur at a first rate during an initial period, e.g. after the SMARCK determines it activated until it determines a subsequent condition or characteristic (e.g. a pouring time for concrete the SMARCK is embedded within) wherein the authentication and transmission of data may occur at a second rate until a subsequent characteristic/condition is met, e.g. the concrete has cured to a predetermined strength, wherein the authentication and transmission of data may occur at a third rate.

Accordingly, within a first time period of the plurality of time periods is from initial activation of the self-contained device;

each subsequent time period of the plurality of time periods begins when a predetermined condition with respect to a generated characteristic of the environment; and a timer relating to authentication or transmission of data is determined in dependence upon a current time period of the plurality of time periods.

Optionally, within Process Flow 1100E the SMARCK may increase its transmission power/gain after several unsuccessful authorization events.

Figure 12:
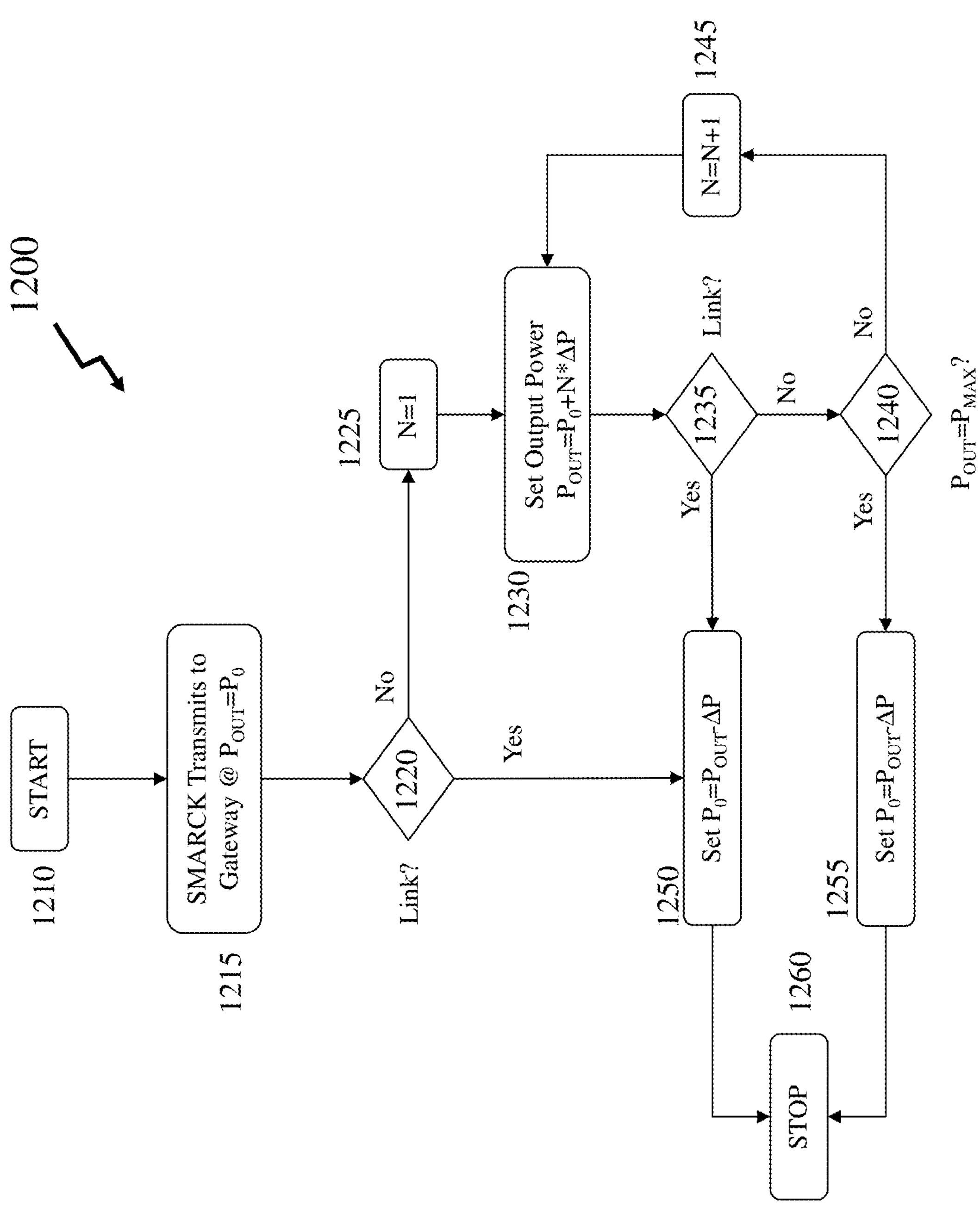
FIG. 12 depicts an exemplary flow chart according to an embodiment of the invention for managing power consumption of an embedded sensors wireless interface with respect to a link with a gateway.

Within other embodiments of the invention a SMARCK may dynamically seek to employ the lowest transmitter power for communicating with the gateway. Referring to FIG. 12 there is depicted an exemplary flow chart, Process 1200, according to an embodiment of the invention for managing power consumption of an embedded sensors wireless interface with respect to a link with a gateway. As depicted Process 1200 comprises first to eleventh steps 1210 to 1260 respectively, wherein these comprise:

First step 1210 wherein the process starts;

Second step 1215 wherein the SMARCK transmits to the gateway with an initial $P_{OUT}=P_0$;

Third step 1220 wherein a determination is made as to whether the link to the gateway was established or not wherein a positive determination results in Process 1200 proceeding to ninth step 1250 otherwise it proceeds to fourth step 1225;

Fourth step 1225 wherein a counter, N, is set, N=1;

Fifth step 1230 wherein the SMARCK sets the output power to $P_{OUT}=P_0+N*\Delta P$;

Sixth step 1235 wherein the SMARCK seeks to re-establish the link and a determination is made as to whether the link to the gateway was established or not wherein a positive determination results in Process 1200 proceeding to ninth step 1250 otherwise it proceeds to seventh step 1240;

Seventh step 1240 wherein a determination is made as to whether a maximum output power has been reached, i.e., $P_{OUT}=P_{MAX}$, wherein if the determination is positive Process 1200 proceeds to eleventh step 1255 otherwise it proceeds to eighth step 1245;

Eighth step 1245 wherein the counter, N, is incremented such that N=N=1;

Ninth step 1250 wherein the stored output power for the next link establishment is set, $P_{OUT}=P_0-\Delta P$ (i.e., it is reduced automatically to start the next link establishment process at a lower power setting which as described below with a SMARCK embedded within a material such as wet concrete which subsequently cures);

Tenth step 1255 wherein the stored output power for the next link establishment is set, $P_{OUT}=P_{MAX}-\Delta P$; and Eleventh step 1260 wherein the process stops.

Accordingly, where links are established with multiple authentications the output power of the SMARCK is automatically lowered to the minimum necessary to establish the link.

With some prior art gateways, such as LoRa gateways operating according to the LoRaWAN™ protocol for example, a user is required to add identifiers of devices/sensors expected to communicate to a gateway (for security among other reasons) to a central database with which the gateway communicates. Accordingly, this requires the user to add the SMARCK identifier with a first software application to those associated with the gateway and then add the SMARCK with a second software application to associate the SMARCK to a database of SMARCKs such that the raw data transmitted via the gateway to a remote storage can be accessed and/or data derived in dependence of the raw data be retrieved and/or push notifications to other users relating to the construction material the SMARCK is embedded within can be retrieved.

Accordingly, to simplify this process for users, especially those on construction sites, the inventors have established within a mobile software application for "tagging" the sensors wherein the SMARCK communicates to the mobile application an identifier (or a flag is set) that denotes that the SMARCK sensor has a communication module supporting the wireless protocol to the gateway, e.g. a LoRa module (having a wireless interface operating to the LoRaWAN™ standard). In this mode tagging is performed using wireless communications between the SMARCK and a PED although within other embodiments of the invention this data may be encoded within a barcode or other visual machine readable format. When the initial tagging is completed with this mobile application and the data transmitted to a central database the identifier (or set flag) triggers a further process to associate the SMARCK with the nearest gateway thereby allowing the gateway to authenticate the SMARCK without the user having to go through this process of adding the sensor to the gateway with another software application. Accordingly, through a single process step performed with the SMARCK sensor-mobile and sensor-gateway communications are authenticated at once. Optionally, the mobile application may automatically determine the nearest gateway through communications to the gateway or detecting its wireless presence. Alternatively, the geolocation of the SMARCK when tagged may be stored within the central database and employed by the central database or a gateway application to determine the SMARCK should be associated with the gateway and authenticated.

Optionally, rather than going through a remote database (associated with registering the SMARCK for remote data storage etc.) or centralized database (associated with the gateway) this association may also be performed directly through wireless links due to the presence of the mobile device—SMARCK—gateway within close proximity, e.g., via Bluetooth. Alternatively, this could be done using the cellular communication capabilities available for both the mobile device and the gateway.

Figure 13:
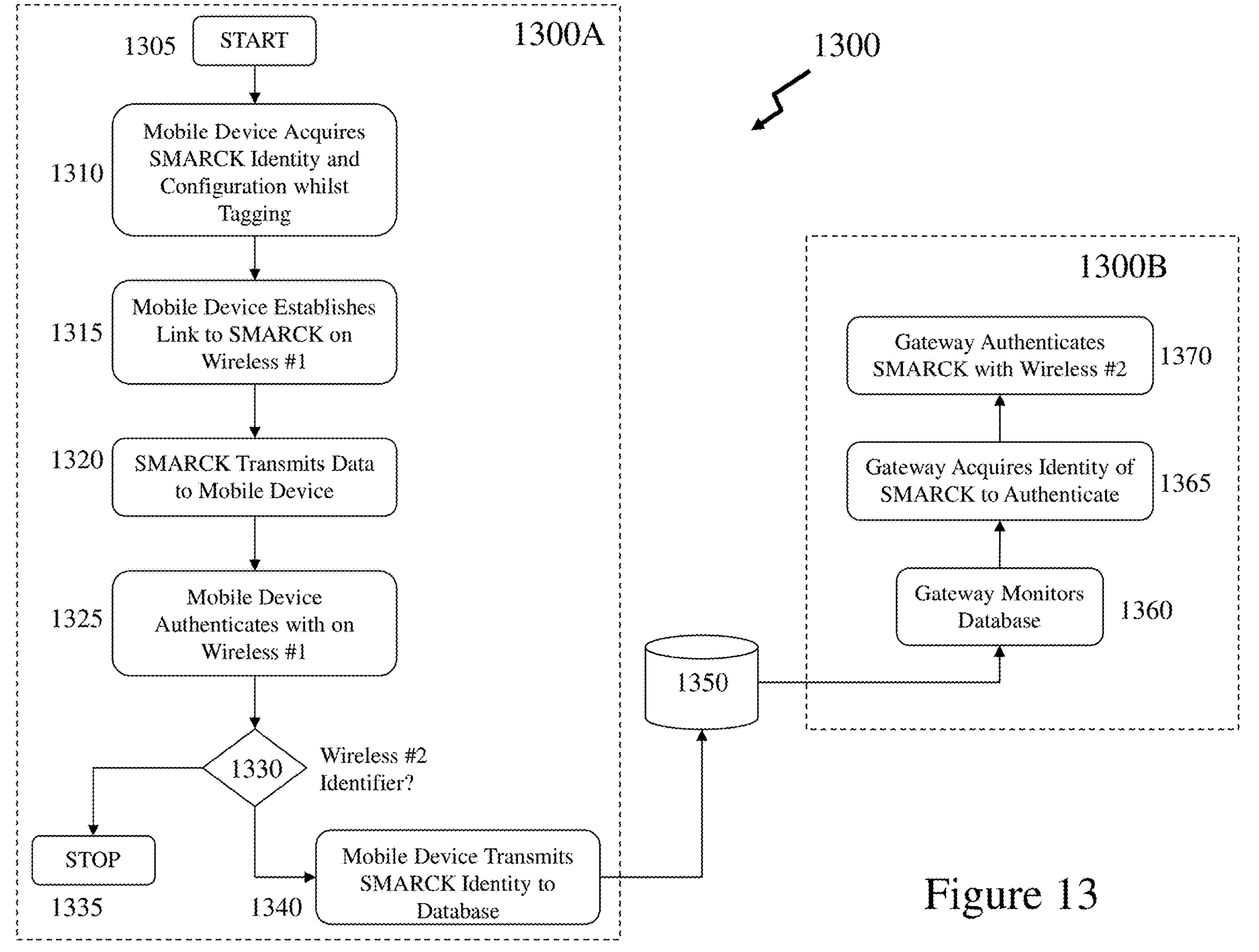
FIG. 13 depicts an exemplary flow chart according to an embodiment of the invention for adding a new sensor to a gateway independent of a user having to configure the gateway.

Referring to FIG. 13 there is depicted an exemplary flow chart, Process 1300, according to an embodiment of the invention for adding a new sensor to a gateway independent of a user having to configure the gateway. As depicted Process 1300 comprises first and second Sub-Flows 1300A and 1300B respectively which each communicate with Remote Storage 1350.

As depicted first Sub-Flow 1300A comprises first to eighth steps 1305 to 1340 respectively, which comprise:

- First step 1305 wherein the process starts;
- Second step 1310 wherein the mobile device acquires the configuration and identity of the SMARK as part of tagging the SMARCK, e.g., by scanning a bar code upon the device;
- Third step 1315 wherein the mobile device establishes a link with the SMARCK upon a first wireless protocol, Wireless #1;
- Fourth step 1320 wherein the SMARCK transmits data to the mobile device;
- Fifth step 1325 wherein the SMARCK authenticates with the mobile device;
- Sixth step 1330 wherein a determination is made as to whether the SMARCK supports a second wireless protocol, e.g., Wireless #2, for communicating with a local gateway wherein upon a positive determination the process proceeds to eighth step 1340 otherwise it proceeds to seventh step 1335;
- Seventh step 1335 wherein Process Flow 1300 stops; and
- Eighth step 1340 wherein the mobile device transmits the SMARCK identity to a remote database, this being a database associated with the gateway.

Second Sub-Flow 1300B comprises ninth to eleventh steps 1360 to 1370 respectively, these comprising:

- Ninth step 1360 wherein the gateway monitors the database for entries associated with it;
- Tenth step 1365 wherein the gateway acquires the identity of the SMARCK which has been entered into its database within the remote database; and
- Eleventh step 1370 wherein the gateway authenticates with the SMARCK upon wireless #2.

Optionally, the configuration of the SMARCK may be established once the mobile device establishes a wireless link upon Wireless #1 with the SMARCK.

Optionally, the SMARCK may not support Wireless #1 (e.g., Bluetooth) and only support Wireless #2 (e.g., LoRa) wherein the process may be a variant such that if no Wireless #1 capability is supported by the SMARCK the Process 1300 bypasses third to seventh steps 1315 to 1335 and proceeds to eighth step 1340 directly.

Antenna

Figure 14:
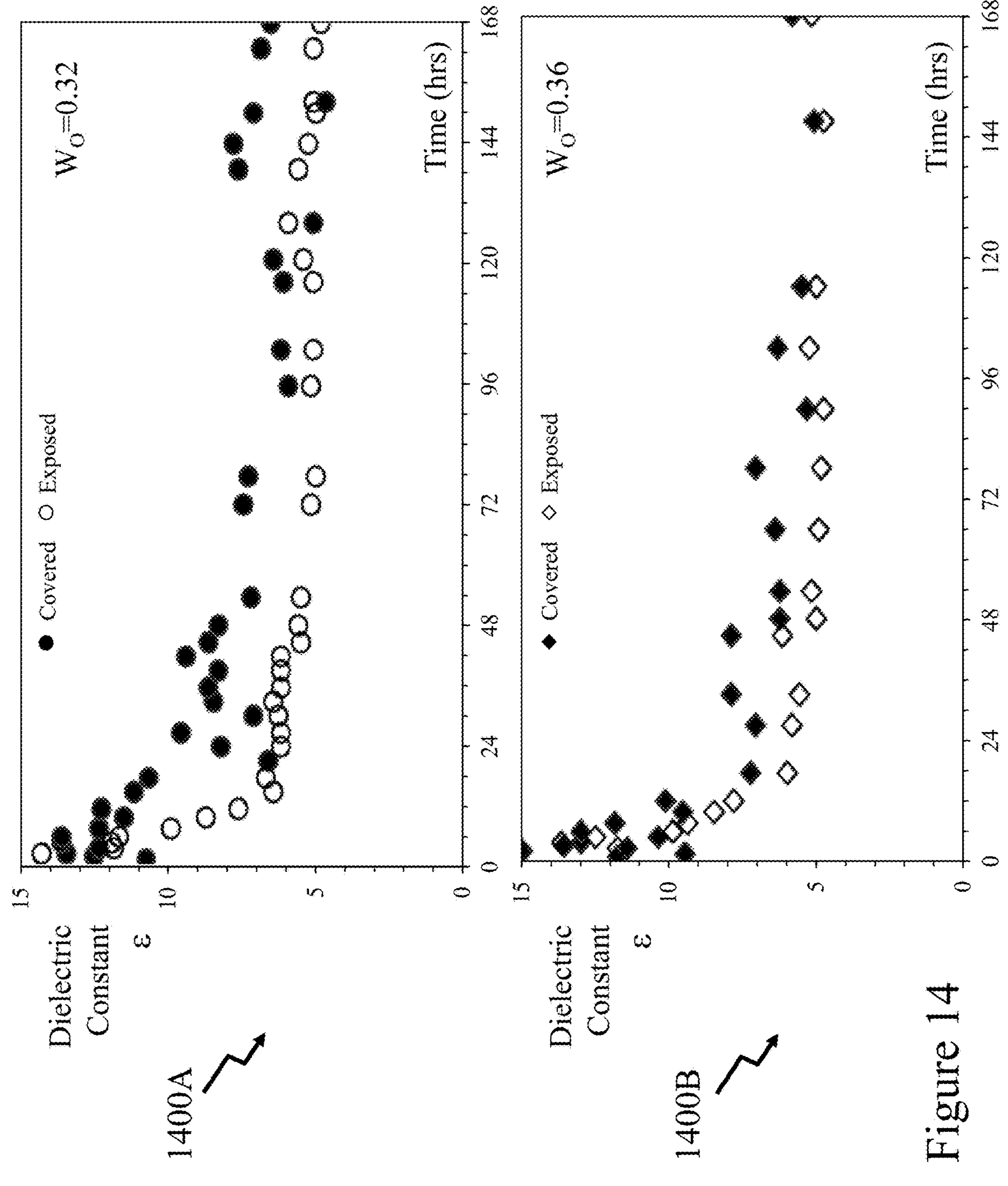
FIG. 14 depicts dielectric constant versus time for concrete in covered and exposed state from pouring showing the rapid change in dielectric constant versus time during an initial phase when data acquisition from an embedded sensor is likely to be made at a high frequency.

For the vast majority of wireless antennas designed, the surrounding medium's electromagnetic properties (dielectric constant and conductivity) are known, fixed, and therefore can be designed for. However, where the antenna is part of a SMARCK which is intended to monitor the early stages of a construction material, e.g., curing concrete, then this situation does not occur. Rather the electromagnetic properties of the surround medium to the SMARK (e.g., wet curing concrete) change rather rapidly and significantly within an important but short period of interest (e.g., first 7 days) where the relative permittivity typically changes from a range of 20-60 (unitless) to a range of 5-15 (unitless). Referring to FIG. 14 there are depicted experimental measurements of the relative permittivity of concrete for water to cement ratios (Wo) of 0.32 and 0.36 respectively in first and second graphs 1400A and 1400B respectively (after "Preliminary Non-Destructive Assessment of Moisture Content, Hydration and Dielectric Properties of Portland Cement Concrete" Thesis by Ivan Lezama, December 2005). Even here, the relative dielectric constant has already dropped to below 15 within the first hour and close to 5 within 24 hours. For reference the relative dielectric constants of air, hydrates (concrete), and water are reported to be 1, 5-8, and 81, respectively.

Figure 15:
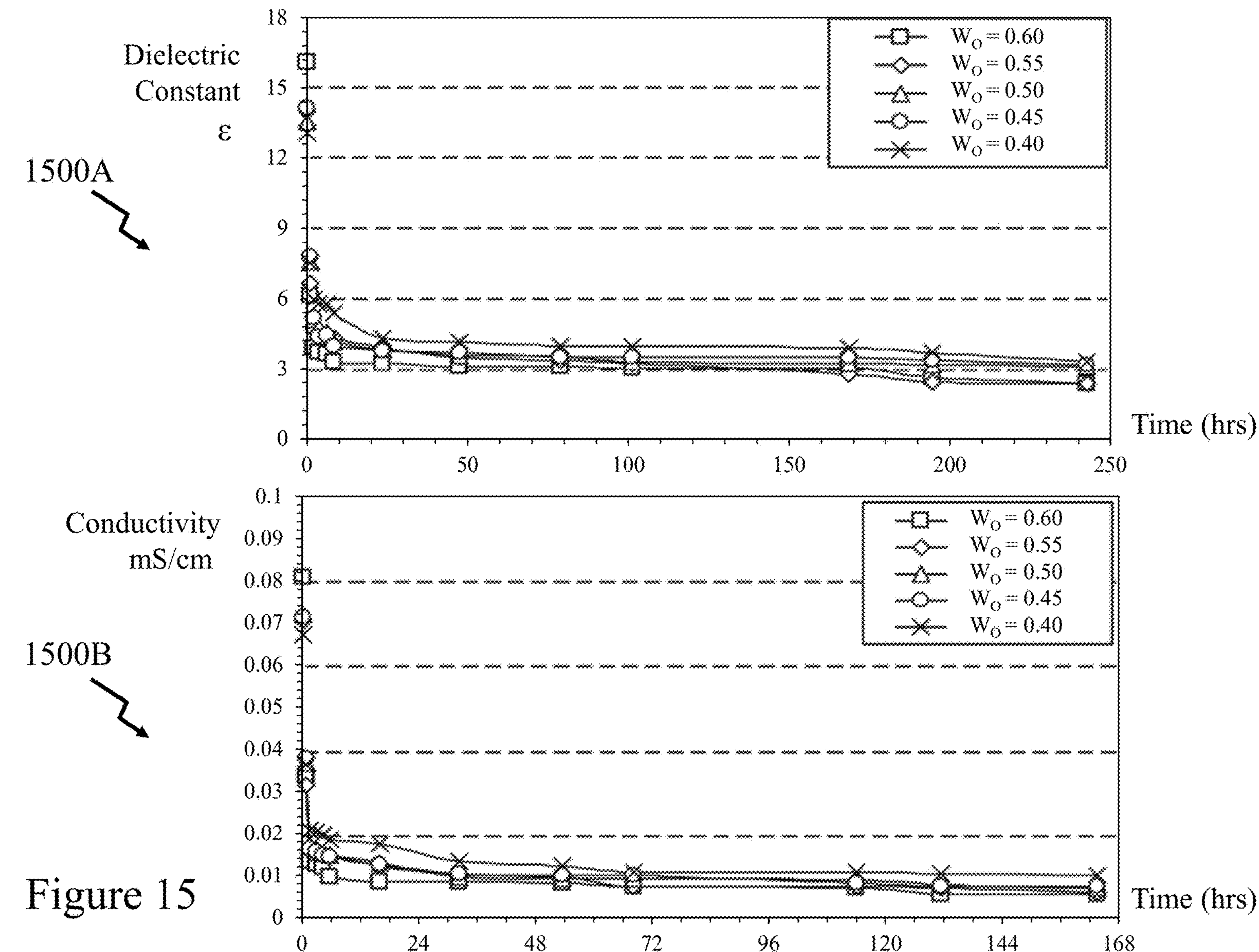
FIG. 15 depicts dielectric constant and conductivity versus time for concrete in covered and exposed state from pouring showing the rapid change in dielectric constant versus time during an initial phase when data acquisition from an embedded sensor is likely to be made at a high frequency.
Figure 16:
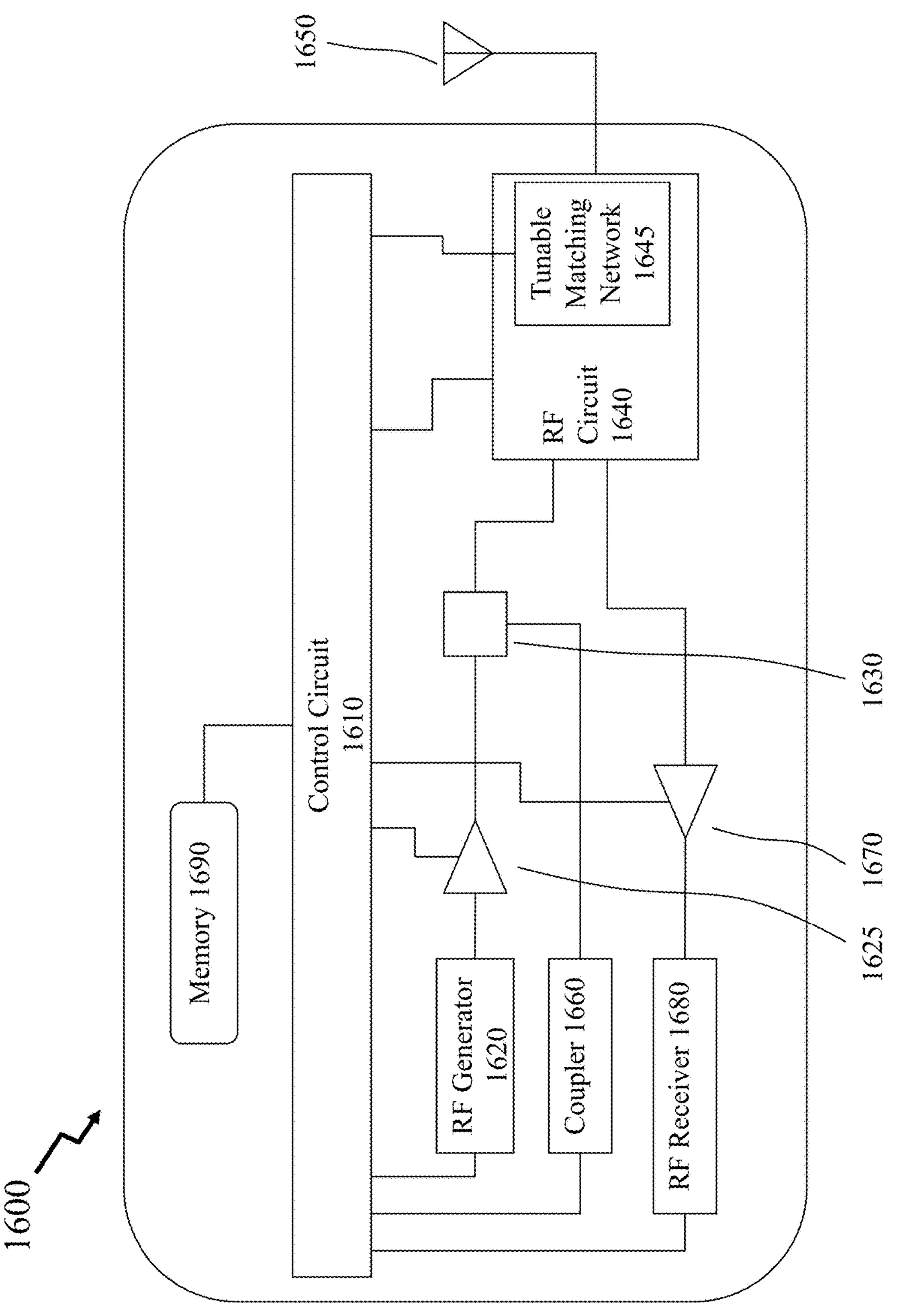
FIG. 16 depicts schematically an RF transceiver according to an embodiment of the invention exploiting adaptive tuning of the antenna based upon stored database data and/or measured data relating to the construction material the sensor is embedded within.

A similar instance arises with conductivity where it changes from a range of an initially high value (e.g., 0.65 mS/cm) to a low value (e.g., 0.01 mS/cm). FIG. 15 depicts first graph 1500A for relative dielectric constant whilst second graph 1500B depicts conductivity for concrete mixtures with Wo ranging from 0.40 to 0.60 (after "Characterization of Electromagnetic Properties for Durability Performance and Saturation in Hardened Cement Mortar" by Kwon et al., NDT&E International 43 (2010), pp. 86-95).

Accordingly, it would be evident that this introduces major challenges in the process of designing antennas tuned/optimized for their surrounding medium. Further, the exact properties of the concrete will vary based upon the concrete mixture employed and where a sensor may be deployed in a range of construction materials, e.g., concrete, plaster, sand etc. then the parameters of the surrounding medium may not be known until actual deployment.

Accordingly, the inventors have established a novel design method wherein the optimization/tuning parameter for the antenna design is not for the performance of a specific material but the parameter is a factor of the derivative of the performance with respect to the medium's electromagnetic properties. Accordingly, several antennas have been designed using this method showing different performances and showing that the specific absorption rate (SAR) can be used to predict the degradation of performance of the antennas for a wide range of medium properties.

The inventors have also established an alternative method wherein the tuning of the antenna is dynamically adjusted according to the surrounding medium. Accordingly, referring to FIG. 16 there is depicted schematically an RF Transceiver 1600 according to an embodiment of the invention forming part of a SMARCK according to embodiments of the invention exploiting adaptive tuning of the antenna based upon stored database data and/or measured data relating to the construction material the SMARCK is embedded within.

Accordingly, RF Transceiver 1600 comprises:

- Control Circuit 1610 which provides for overall control of the RF Transceiver 1600 as well as data to the transmitted to the RF Generator 1620 and receiving data from the RF Receiver 1680;
- RF Generator 1620 which receives data to be transmitted, encodes it, and provides it to Power Amplifier 1625 before it is coupled via Coupler 1660 to RF Circuit 1640 couples the output from the Coupler 1660 to the Antenna 1650 via Tunable Matching Network 1645;
- RF Receiver 1680 which receives RF signals from the low noise amplifier (LNA) 1670 and decodes them as data for the Control Circuit 1610 where the LNA 1670 is coupled to the Antenna 1650 via Tunable Matching Network 1645 and RF Circuit 1640.

RF Circuit 1640 may be a circulator such that microwave signals coupled from the RF Generator 1620 are coupled to the Antenna 1650 and received RF signals from the Antenna 1650 are coupled to the RF Receiver 1680. Alternatively, RF Circuit may comprise transmit/receive switches that selectively couple the RF Signal Generator 1620 and RF Receiver 1380 to the Antenna 1650 according to a predetermined timing sequence defined by the wireless protocol supported by RF Transceiver 1600.

The Tunable Matching Network 1645 provides for dynamic adjustment of the microwave circuit coupled to the Antenna 1650 allowing it to compensate for changes/variations in the external dielectric environment which manifest themselves as a poor match for the antenna. The Tunable Matching Network 1645 may be controlled via Control Circuit 1610 in dependence upon data stored within Transceiver Memory 1690 and/or by measurements of the transmitter side matching through signals reflected from the Antenna through the RF Circuit 1640 back to Coupler 1630 which are coupled to Reflected RF Signal Receiver 1660. Accordingly, via Reflected RF Signal Receiver 1660 the Control Circuit 1610 can determine the mismatch of the RF Transceiver 1600 to the Antenna 1650 and provide adjustments to the Tunable Matching Network 1645.

Alternatively, the Control Circuit 1610 may provide adjustments to the Tunable Matching Network 1645 in dependence upon the data within the Transceiver Memory 1690 which comprises data for setting the Tunable Matching Network 1645. This data may be time dependent data defining the electrical properties of a surrounding material, e.g., concrete, allowing composition and/or batch specific data to be loaded into the Transceiver Memory 1690 of the SMARCK of which RF Transceiver 1600 forms part.

Alternatively, it may be calibration data for the electrical properties of a surrounding material, e.g., concrete, allowing conversion of data acquired by the SMARCK from another sensor or sensors (e.g., temperature sensor) to be employed to define the current electrical properties of the surround material. Accordingly, the real time variations in the material may be monitored and employed to adjust the Tunable Matching Network 1645 rather than a previously determined time dependence of the material.

As noted above in respect of FIG. 14 the dielectric constant of concrete varies substantially during the period that the concrete cures. However, the final dielectric constant is still between 3 and 5. As noted, antennas are typically designed for air, a dielectric constant of unity. Accordingly, the inventors established a custom antenna design aimed at reducing the impact of the surrounding medium on the antenna. Within FIGS. 21 to 24 this custom antenna design performance is depicted relative to a standard commercial antenna.

Figure 21:
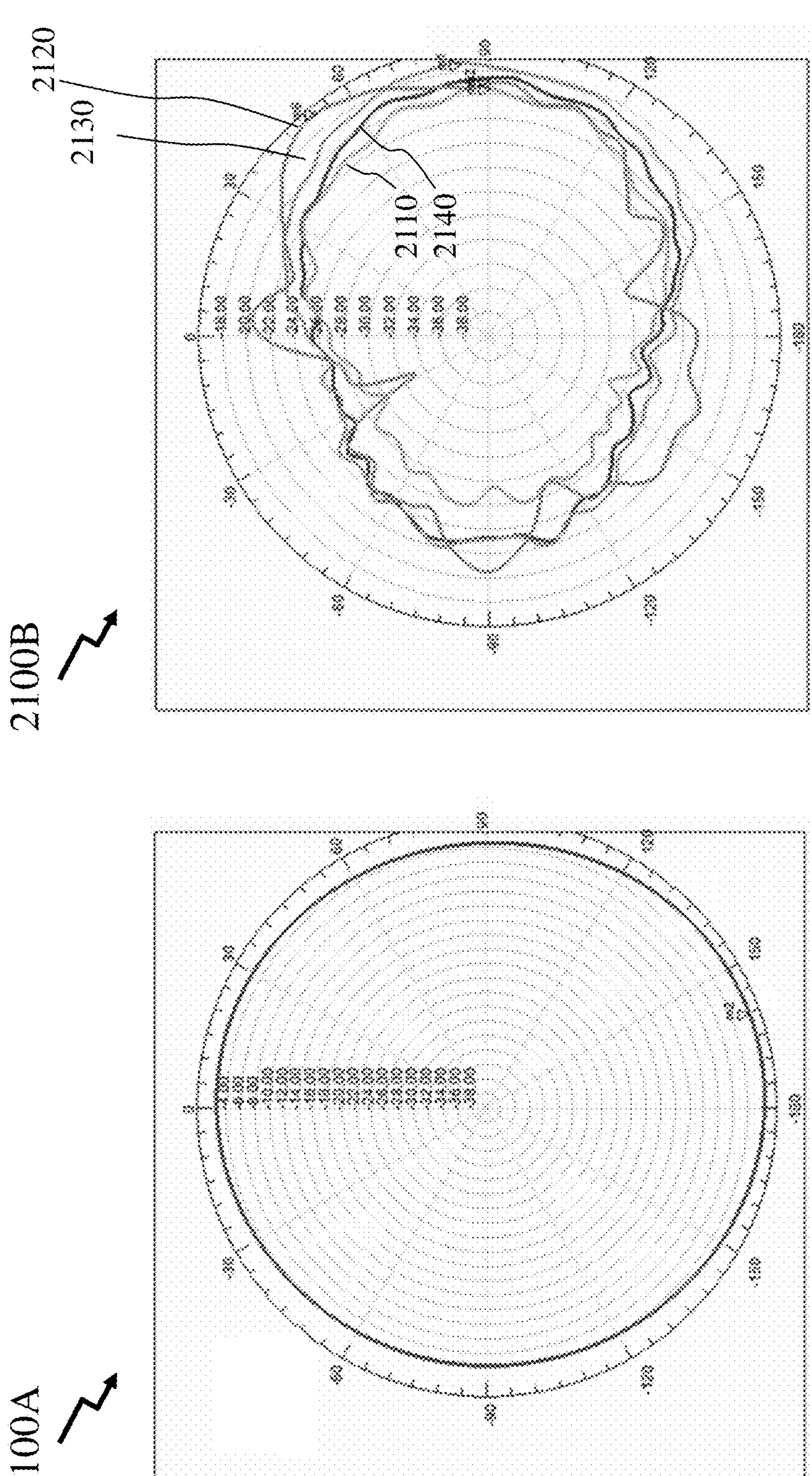
FIG. 21 depicts radiation patterns for a commercial antennae within embedded sensors according to embodiments of the invention in air and as a function of battery thickness.

Referring initially to FIG. 21 there are depicted first and second radiation patterns 2100A and 2100B for a commercial antennae within embedded sensors according to embodiments of the invention in air, first radiation pattern 2100A, and as a function of battery thickness, second image 2100B. As expected in first radiation pattern 2100A the radiation pattern of a standard commercial antenna is radially uniform in air as depicted in first radiation pattern 2100A at approximately an average of −3 dB with standard deviation 0.85 dB and peak −1.46 dB. However, when the antenna is mounted onto a battery within the enclosure of an embedded sensor according to an embodiment of the invention then the antenna pattern changes substantially as depicted in first to fourth curves 2110 to 2140 respectively in second radiation pattern 2100B where this performance is summarized in Table 2.

TABLE 1

Performance of Commercial Antenna in Sensor Housing with Battery Thickness

| | Battery Thickness | | | |
|---|---|---|---|---|
| | 4.5 mm | 6.3 mm | 6.7 mm | 7.9 mm |
| Curve | 2110 | 2120 | 2130 | 2140 |
| Average (dB) | −24.95 | −22.65 | −22.39 | −23.23 |
| STD (dB_ | 3.10 | 3.21 | 2.90 | 2.66 |
| Peak (dB) | −18.7 | −16.9 | −17.2 | −19.4 |

Accordingly, the battery thickness has a significant impact on the antenna performance within a compact sensor wherein the antenna is disposed in proximity to the battery.

Figure 22:
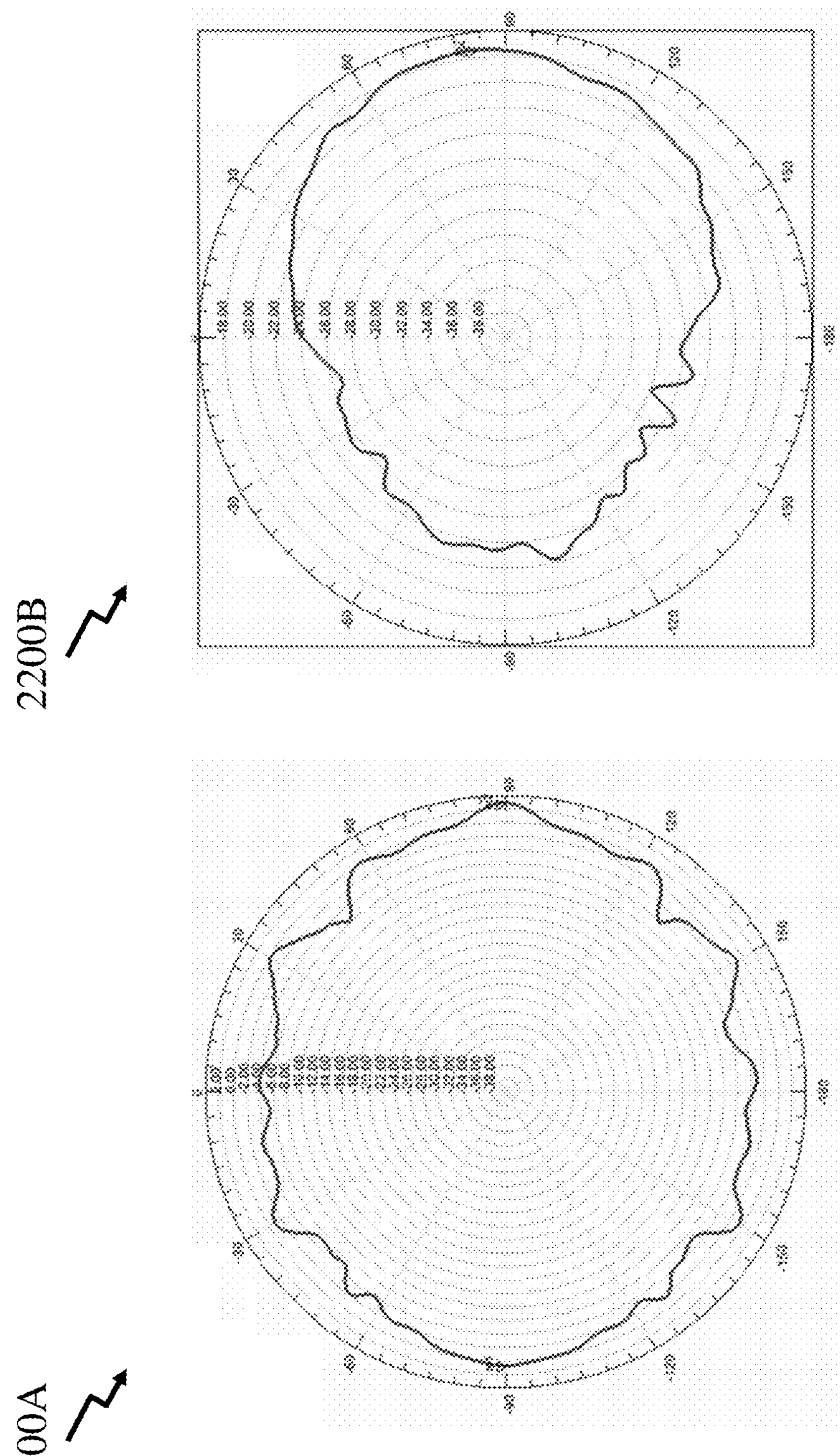
FIG. 22 depicts radiation patterns for a commercial antennae within embedded sensors according to embodiments of the invention disposed upon rebar without surrounding concrete and embedded in concrete without a rebar.

Referring to FIG. 22 there are depicted first and second radiation patterns 2200A and 2200B respectively for a commercial antennae within embedded sensors according to embodiments of the invention disposed upon rebar without surrounding concrete and embedded in concrete without a rebar. First radiation pattern 2200A depicts the commercial antenna disposed within an embedded sensor disposed upon a rebar without concrete wherein the average is now −2.40 dB with standard deviation 2.12 dB and peak +2.96 dB. Accordingly, the presence of the metal rebar results in a reduction of the radiation at 0° and 180° but an increase at −90° and 90°. In contrast, second radiation pattern 2200B depicts the commercial antenna disposed within an embedded sensor which is itself disposed concrete without a rebar. Now the radiation pattern is substantially asymmetric as in the instance with the battery in second radiation pattern 2100B. The average is now −22.70 dB with a standard deviation of 3.01 dB and peak −17.39 dB.

Accordingly, the inventors established a custom antenna for use within embedded sensors. Accordingly, FIG. 23 depicts first and second radiation patterns 2300A and 2300B for a custom antennae within embedded sensors according to embodiments of the invention in air and as a function of enclosure thickness, respectively. Referring to first radiation pattern 2300A the antenna pattern is now radially asymmetric being higher at −90° than at 90°. The importance of this will become evident below in respect of performance of the antenna within concrete.

Second radiation pattern 2300B depicts the radiation pattern of the custom antenna at different battery thicknesses in first to fifth curves 2310 to 2350 respectively where this performance is summarized in Table 2. Accordingly, comparing these

TABLE 2

Performance of Custom Antenna in Sensor Housing with Battery Thickness

| | Battery Thickness | | | | |
|---|---|---|---|---|---|
| | 1 mm | 2 mm | 4 mm | 5 mm | 7 mm |
| Curve | 2310 | 2320 | 2330 | 2340 | 2350 |
| Average (dB) | −22.75 | −21.56 | −20.62 | −20.32 | −20.37 |
| STD (dB) | 2.83 | 2.74 | 1.98 | 1.67 | 1.31 |
| Peak (dB) | −19.6 | −18.1 | −17.6 | −18.0 | −18.7 |

Figure 24:
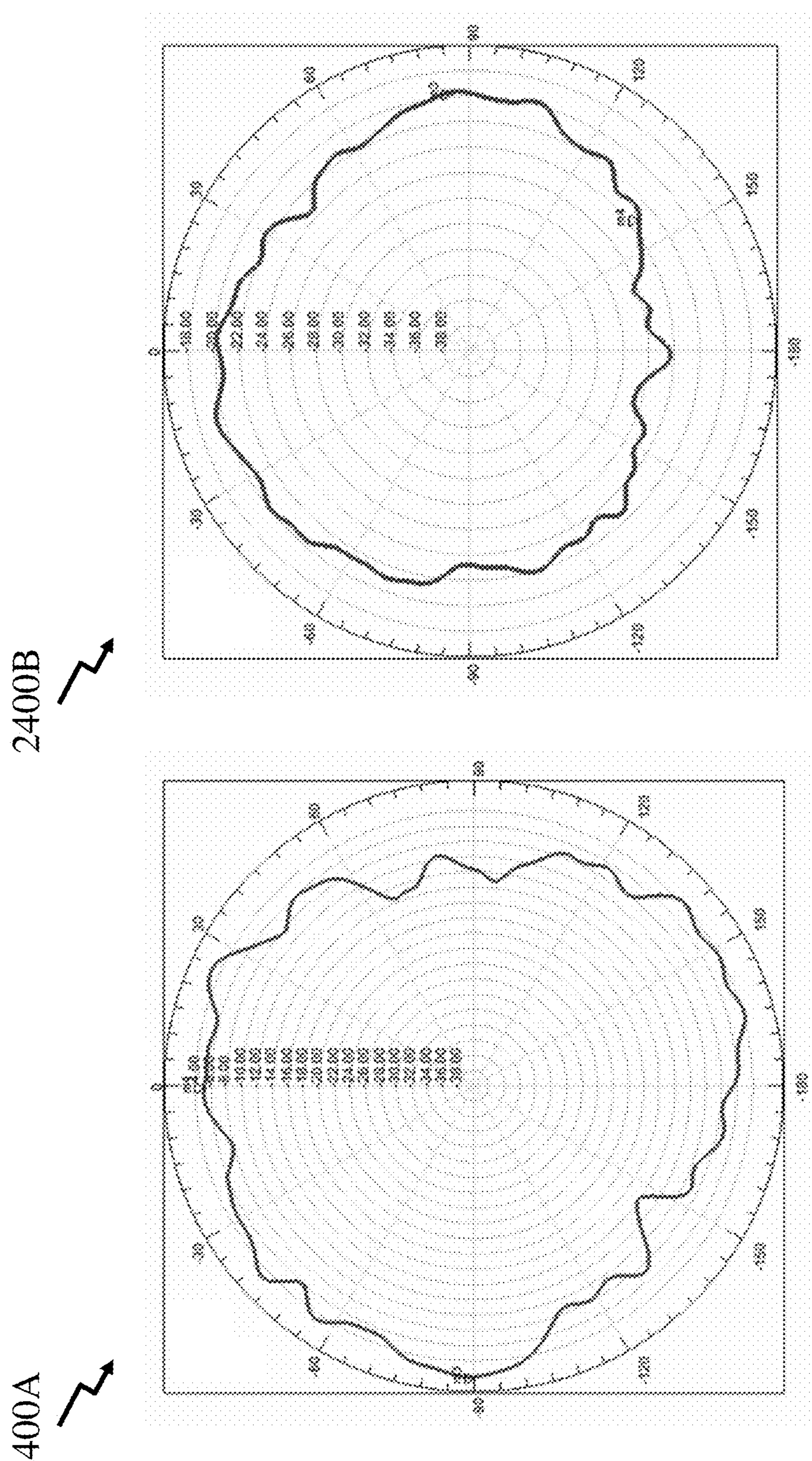
FIG. 24 depicts radiation patterns for a custom antennae within embedded sensors according to embodiments of the invention disposed upon rebar without surrounding concrete and embedded in concrete without a rebar.

Now referring to FIG. 24 there are depicted first and second radiation patterns 2400A and 2400B respectively for a custom antennae within embedded sensors according to embodiments of the invention disposed upon rebar without surrounding concrete and embedded in concrete without a rebar.

First radiation pattern 2400A depicts the custom antenna disposed within an embedded sensor disposed upon a rebar without concrete wherein the average is now −6.80 dB with standard deviation 2.90 dB and peak −1.91 dB. In contrast, second radiation pattern 2500B depicts the commercial antenna disposed within an embedded sensor which is itself disposed concrete without a rebar. Now the radiation pattern is substantially symmetric as in the instance with the battery in second radiation pattern 2300B. The average is now −22.25 dB with a standard deviation of 1.9 dB 1 and peak −19.42 dB.

Figure 25:
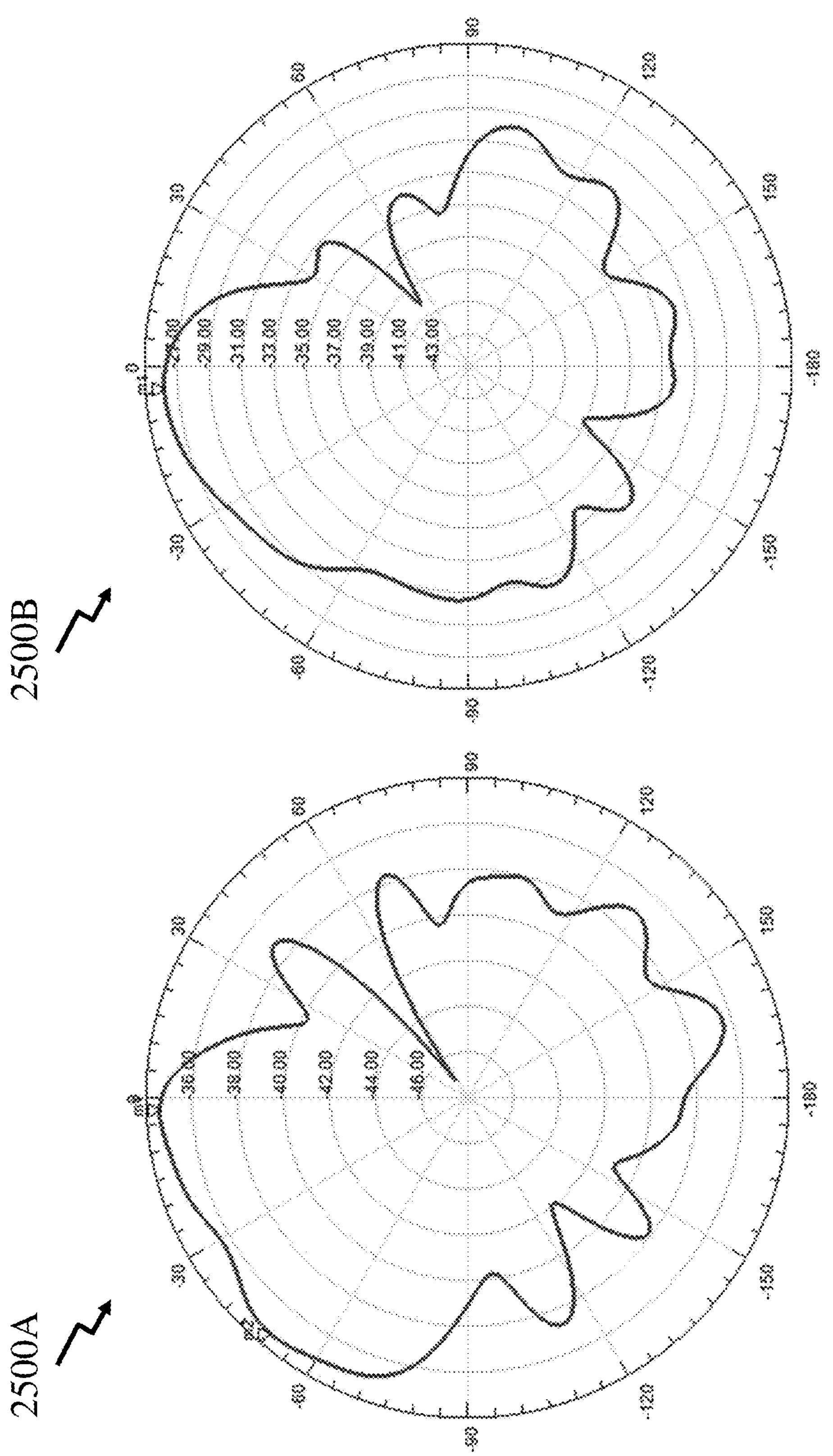
FIG. 25 depicts radiation patterns for commercial and custom antenna within embedded sensors according to embodiments of the invention as deployed in a typical configuration with rebar and concrete.

However, referring to FIG. 25 there are depicted first and second radiation patterns 2500A and 2500B for the commercial and custom antennae respectively within embedded sensors according to embodiments of the invention as deployed in a typical configuration with rebar and concrete. Accordingly, as evident in first radiation pattern 2500A the commercial antenna with the effects of battery, housing, rebar, and concrete has a very irregular radiation pattern with peaks at approximately 0° and −45° of approximately −34.5 dB and a minimum at 60° substantially below −46 dB. Accordingly, communications between the antenna within embedded sensor and the user's PED or FED would be highly directionally sensitive due to both this angular sensitivity of the antenna pattern but also other effects such as orientation of the embedded sensor relative to the horizontal etc.

In contrast, the second radiation pattern 2500B for the custom antenna whilst having an irregular radiation pattern has a peak at approximately −5° of approximately −26 dB and a minimum at approximately 55° of approximately −40 dB. Accordingly, the performance of the antenna is substantially improved both for reception and transmission.

Wireless Repeater/Booster

As noted above an issue with using the 2.45 GHz Bluetooth technology (as well as other communication protocols) for construction material embedding is the absorption characteristics of the material, especially when containing high water concentrations, e.g., wet concrete for example. Accordingly, material such as wet concrete mean that embedded sensor devices have limited communication ranges when fully embedded within the concrete. However, whilst an alternate wireless methodology such as a low-power wide-area network (LPWAN) protocol employing spread spectrum modulation techniques derived from chirp spread spectrum (CSS) technology (e.g., LoRaWAN) may resolve this there may still be instances where wireless connectivity to the SMARCK via a communication protocol such as 2.4 GHz Bluetooth is required. For example, gateway failure, no gateway implemented, etc.

Accordingly, the inventors have established a repeater/booster to extend the range of communications between a mobile device, e.g., a user's smartphone, and the sensor device (SMARCK). This is achieved using a node with an antenna gain that is higher than end-user wireless devices leading to a better sensitivity and a better link budget. Since user centric mobile devices, such as smart phones, are expected to be within direct contact with the human body, strict Specific Absorption Rate (SAR) and RF exposure limits apply for these devices. This thereby defines the maximum emitted power of the mobile device.

However, with a repeater/booster, an enclosure can be included surrounding the high-gain antenna of the mobile device to exempt it from strict limits thereby allowing for a better sensitivity for the booster to other devices, e.g., SMARCKs. However, it would be evident that the booster may if attached to the mobile device require enabling/disabling to ensure that the strict legal requirements on SAR/RF exposure etc. are met.

For example, Canadian Standard RSS-102 (Radio Frequency (RF) Exposure Compliance for Radiocommunication Apparatus" requires, for the frequency of 2.45 GHz e.g., Bluetooth) at a separation distance of ≤5 mm (approximately 0.2") from the human body, that the exemption limit on output power be 4 mW (6 dBm). This is further relaxed to 52 mW (17 dBm) if the separation distance is extended to 20 cm (approximately 8 inches) with other higher values allowed as a function of higher separation distances achieved.

Accordingly, this allows us to design nodes with a much higher gain by forcing an enclosure as a separator from RF exposure and the human body. This allows the user to view/connect to sensors at locations where the mobile device alone cannot discover these sensors.

Figures 17, 18:
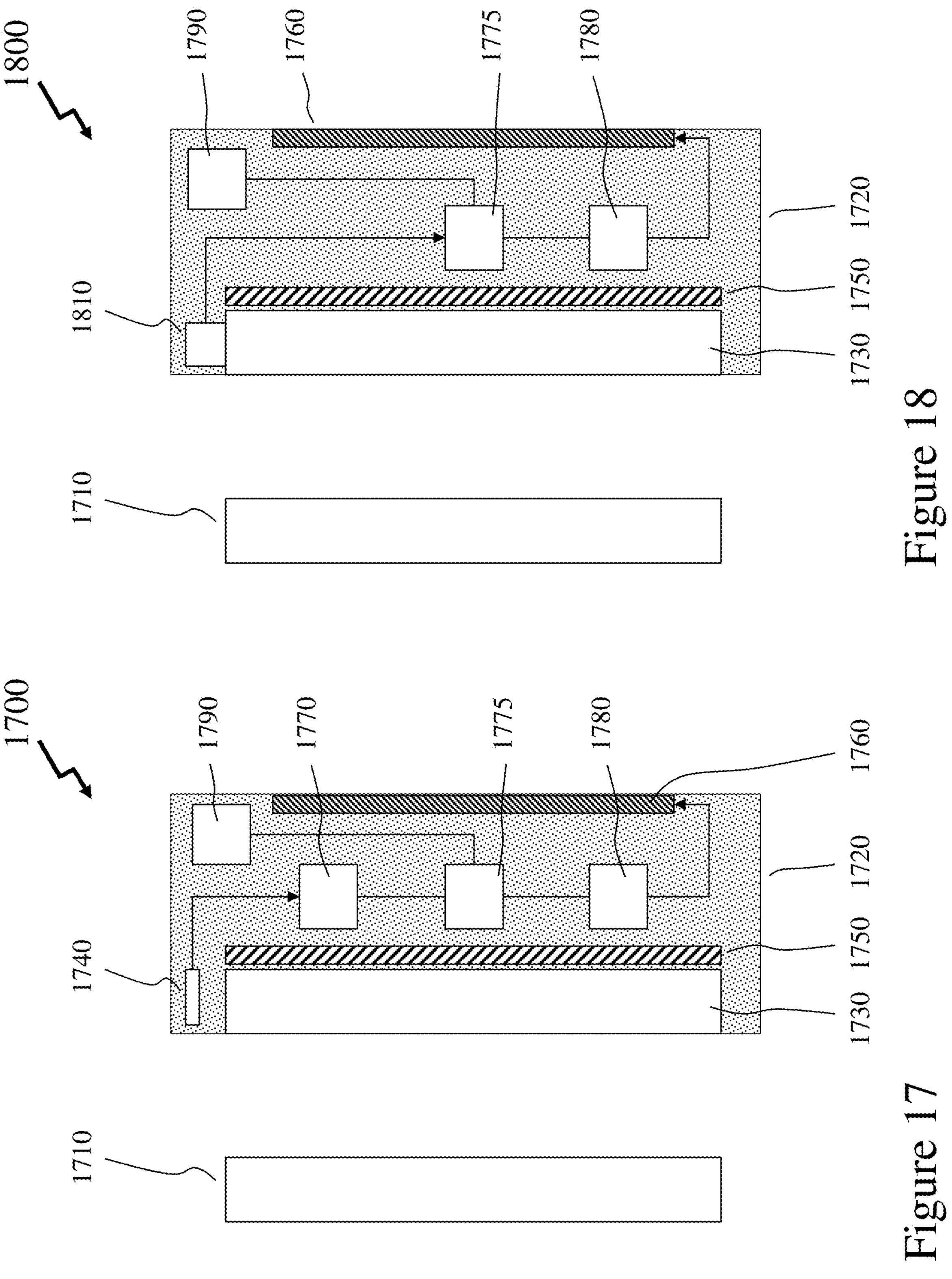
FIG. 17 depicts a booster/repeater assembly according to an embodiment of the invention for use in conjunction with a PED.
FIG. 18 depicts a booster/repeater assembly according to an embodiment of the invention for use in conjunction with a PED.

Referring to FIG. 17 there is depicted a booster/repeater Assembly 1700 according to an embodiment of the invention for use in conjunction with a PED 1710. As depicted the Assembly 1700 comprises an Opening 1730 within a Booster Casing 1720 within which the PED 1710 fits. Disposed within the Booster Casing 1720 are:

First Antenna 1740;
First RF Transceiver 1700;
Controller 1775;
Second RF Transceiver 1780;
RF Shield 1750;
Second Antenna 1760; and
Booster Sensor 1790.

Accordingly, considering a transmit path wireless signals are received by the first Antenna 1740 from the PED 1710 within the Opening 1730 of the Assembly 1700. These are coupled to the Controller 1775 via the first RF Transceiver 1770 wherein the Controller 1775 generates control/data for the second RF Transceiver 1780 which generates the RF signals coupled to the second Antenna 1760 for transmission. The receive path from an external SMARCK being the reverse. RF Shield 1750 provides a high absorption block/reflector for RF signals in either direction. Accordingly, second Antenna 1760 may be designed for a different radiation pattern to that of first Antenna 1740 and the antenna within the PED 1710. As the presumption is the user will be carrying the PED 1710 and viewing a display upon the PED 1710 to perform actions with respect to a software application as they walk or stand then the antenna radiation pattern does not need to be omnidirectional unlike the antenna of the PED 1710. Equally, the first Antenna 1740 may be a low gain highly directional antenna.

Optionally, Sensor 1790 may be employed to control aspects of the Assembly 1710. For example, assuming that the primary use of the PED 1710 within the Assembly 1700 with the higher power output of the second RF Transceiver 1780/second Antenna 1760 is being held away from the user. Optionally Sensor 1790 may be a tilt or orientation sensor which may disable the PED 1710 within the Assembly 1700 with the higher power output of the second if the Assembly 1700 is orientated at higher than a predetermined angle relative to the ground, e.g., indicative of the PED 1710 being brought to the user's head for use as a phone for example or orientated in predetermined orientations. Such an angle may be 75°, 60°, 45° for example although other angles may be set. Optionally, Sensor 1790 may be a range finder which turns off or reduces the output power of the second RF Transceiver 1780 if an object is less than a predetermined distance, i.e., the user's body. Such a predetermined distance may be 30 cm (1 foot) for example although other distances may be employed. Optionally, Sensor 1790 may be an accelerometer employed to determine the orientation of the Assembly 1700 such that the second RF Transceiver 1780 is only turned on when the Assembly 1700 determines it is orientated with the second Antenna 1760 towards the ground. Optionally, Sensor 1790 may comprise two or more of these sensors as well as other sensors. Accordingly, the Second RF Transceiver 1780 may operate at higher powers than those regulated for the PED 1710 as it is disabled when the Assembly 1800 is close to the user or orientated such that the expectation is it is in proximity of the user.

Referring to FIG. 18 there is depicted a booster/repeater Assembly 1800 according to an embodiment of the invention for use in conjunction with a PED. In structure Assembly 1800 is similar to Assembly 1700 in FIG. 17 except that rather than first Antenna 1740 the Assembly 1800 comprises a Connector 1810 which interfaces with a connector upon the PED 1710, e.g., a USB-C interface for example, such that data is transmitted to/from the Assembly 1800 according to a wired protocol. Assembly 1800 may therefore also employ sensors within PED 1710 as well as other features of the PED 1710 such as a camera for example. Optionally, the connection of the Connector 1810 to the PED 1710 may result in a software application in execution upon the PED 1710 identifying the Assembly 1800 as a booster/repeater wherein the software application disables wireless interfaces of the PED 1710 whilst it is attached to the Assembly 1800 where subsequent detachment of the Assembly 1800 is detected re-enabling the wireless interfaces. Optionally, the disabling/enabling may be with respect to one or more short range wireless interfaces such as Bluetooth, for example, whilst leaving other wireless interfaces, such as GSM for example, enabled.

Optionally, these boosters/repeaters may be designed for deployment at a site, e.g., a construction site, wherein sensors adjust the output of the booster/repeater in dependence upon tracking the presence/absence/distance of an individual relative to the booster/repeater. Accordingly, Assembly 1700 without the Opening 1730 would function in this manner supporting transmission/receipt of wireless signals to/from a PED with an omnidirectional first Antenna 1740 and therein transmission/receipt of wireless signals to/from the embedded SMARCKs.

Accordingly, such boosters/repeaters may be disposed at spans of 20 meters, 40 meters, etc. (65 feet, 130 feet etc.) as opposed to connecting to the actual sensors at a distance of less than 10 meters (approximately 32 feet) when embedded within the concrete. Furthermore, since these boosters are custom made for this use-case, the board layout and antenna layout can be optimized for these situations (e.g., the antennas could be designed without the limitations imposed by smart phone size, ease of portability as user carries the booster/repeater) and could undergo specific RF exposure testing to ensure the compliance of the higher antenna gains used.

Such stand-alone boosters/repeaters may also be used to save data on an embedded memory, transfer data to the cloud database periodically using another wireless protocol, e.g. Long-Term Evolution (LTE) cellular, transfer data to end-user PEDs, transfer data to enabled gateways (e.g. Bluetooth Low Energy (BLE) gateways, LoRa gateways and cellular gateways), transfer data to other boosters in a mesh network setup spanning hundreds of meters and other data transfer setups that may be achievable with this range increase.

Whilst the embodiments of the invention have been described and depicted with respect to Bluetooth it would be evident that the embodiments of the invention are not limited to Bluetooth or BLE communications and may be employed with other communication protocols. Furthermore, a booster may be used in other configurations to convert data from one protocol to another, allowing significant gains in range. For instance, the booster could be used to communicate to the sensor in one protocol, e.g., BLE4, BLE5, LoRa, Sigfox, Zigbee, LTE, etc. and then communicate to a gateway, PED, or a handheld device in one of BLE4, BLE5, LoRa, Sigfox, Zigbee, LTE, etc. where the two modes of communication can be different.

Figure 19A:
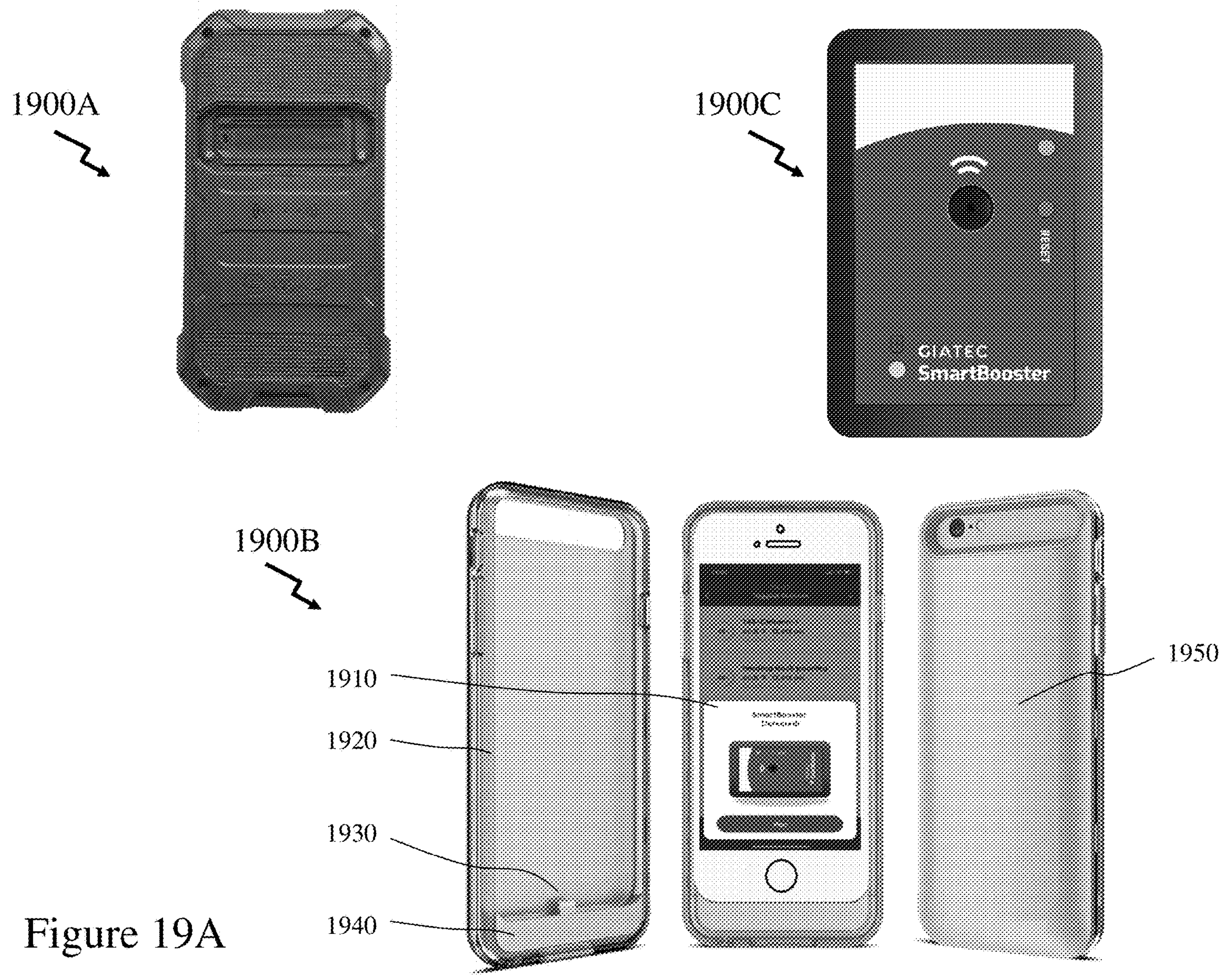
FIG. 19A depicts exemplary embodiments booster/repeater assemblies according to embodiments of the invention.

Now referring to FIG. 19A there are depicted first to third Boosters 1900A to 1900C respectively depicting exemplary embodiments of booster/repeater assemblies. First and second Boosters 1900A and 1900B being in the form of smartphone cases according to embodiments of the invention whilst third Booster 1900C is a standalone booster/repeater according to an embodiment of the invention. First Booster 1900A is a ruggedized case for a smartphone wherein the case integrates additional elements such as those depicted in booster/repeater Assembly 1700 in FIG. 17 and booster/repeater Assembly 1800 in FIG. 18. Such a first Booster 1900A may be attached to the smartphone such as depicted in second Booster 1900B wherein a Connector 1930 within the Case 1920 attaches to the Smartphone 1910. The additional electronics as described and depicted within booster/repeater Assembly 1700 in FIG. 17 and booster/repeater Assembly 1800 in FIG. 18 being integrated within the Case 1920 within Housing 1940 whilst second Antenna 1760 is disposed within the Shell 1950 of the second Booster 1900.

Alternatively, within other embodiments of the invention the third Booster 1900C is a standalone booster/repeater incorporating the electronics described and depicted within booster/repeater Assembly 1700 in FIG. 17 and booster/repeater Assembly 1800 in FIG. 18. However, third Booster 1900C may also include additional electronics to communicate with the smartphones or other PEDs upon another wireless protocol to that the third Booster 1900C employs to communicate with the gateway(s) or other boosters.

Now referring to FIG. 19B there is depicted first Image 1900D there is depicted an exemplary embodiment of a Booster/Repeater 1600 according to embodiments of the invention being worn by a user. The Booster/Repeater 1600 being the design of third Booster 1900C. As described within this specification a software application may be in execution upon a PED (or other electronic device) which has a wireless interface active wherein the software application automatically detects the presence of a Booster/Repeater 1600 or other booster/repeater assembly according to embodiments of the invention. This triggers a pop-up 1970 as depicted within the graphical user interface (GUI) depicted within second Image 1900E wherein the user can elect to pair the PED to the booster/repeater.

A Booster/Repeater 1600 may support a replaceable battery, rechargeable battery via a standard electrical connector interface etc. As described above the Booster/Repeater 1600 may be paired through a process wherein a button on the Booster/Repeater 1600, e.g. the power button, is held for a predetermined period of time wherein a visual indication of the pairing being triggered is provided to the user (e.g. a light flashing on the Booster/Repeater 1600), wherein the software application automatically detects the Booster/Repeater 1600 seeking to pair wherein the user taps the displayed "PAIR" function, follows the software application prompts, e.g. scan QR code on the Booster/Repeater 1600, wherein a the Booster/Repeater 1600 indicator changes to present the user with a confirmation on the Booster/Repeater 1600 as well as within the software application. Once paired the Booster/Repeater 1600 can be unpaired. Optionally, the Booster/Repeater 1600 may be paired with multiple PEDs as well as multiple sensors. Optionally, the Booster/Repeater 1600 enters a sleep mode when a paired PED is not performing any actions to write or acquire data from sensors within range of the Booster/Repeater 1600. Accordingly, a PED may be paired concurrently with multiple Booster/Repeaters 1600.

Figure 19C:
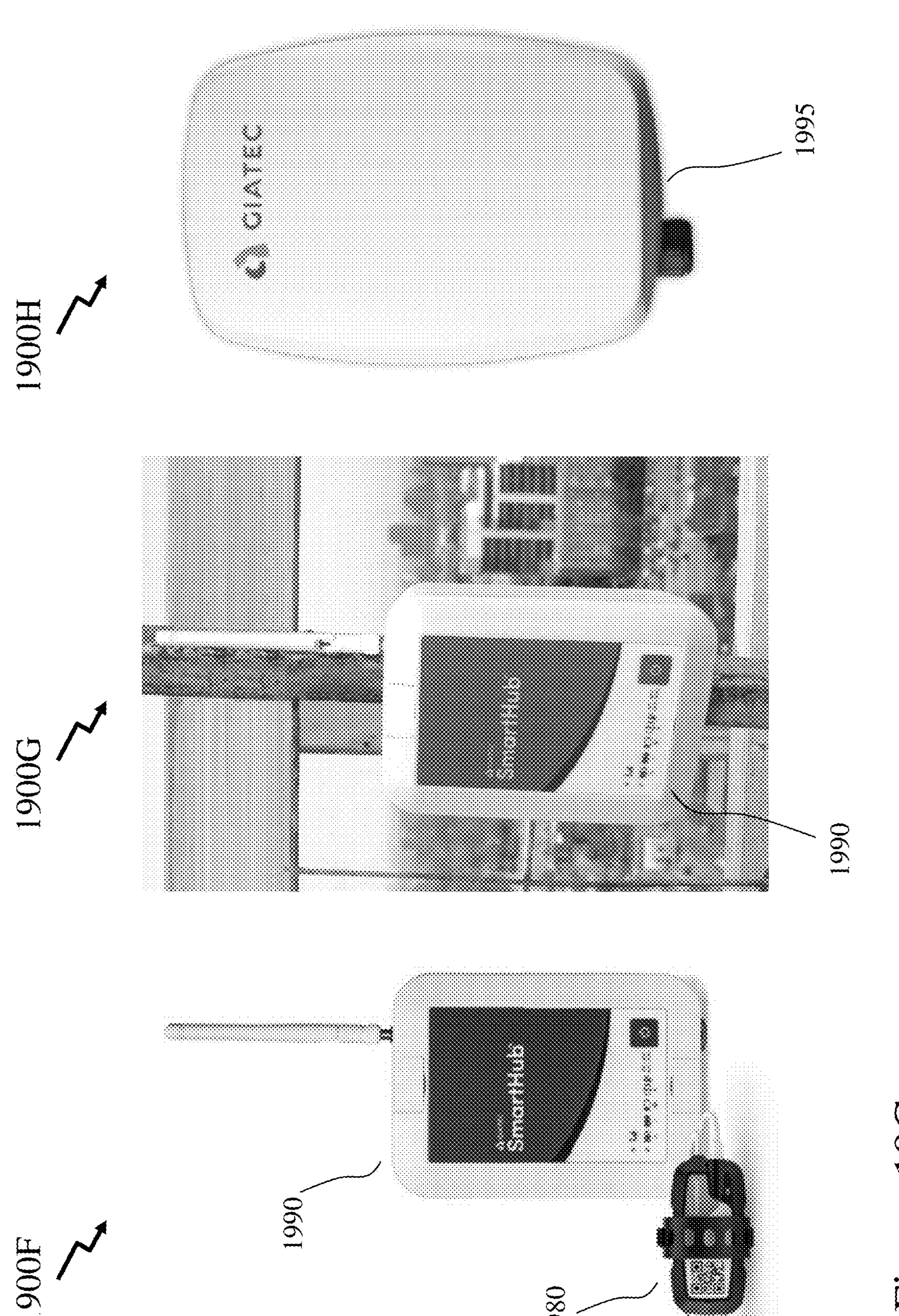
FIG. 19C depicts an exemplary gateway according to an embodiment of the invention.

Now referring to FIG. 19C there are depicted first to third Images 1900F to 1900H respectively with respect to an exemplary gateway (hub) according to an embodiment of the invention. In first Image 1900F a first Hub 1990 is depicted with an Embeddable Sensor 1980, e.g., a Giatec™ SmartRock™. The first Hub 1990 is depicted attached to a post of a construction site in second Image 1900G. An alternative second Hub 1995 is depicted in third Image 1900H (or alternatively this is the rear of first Hub 1990) without user accessible buttons, indicators, etc. Optionally, the Hub 1990 may support different wireless interfaces in different models or concurrently within a single model in order to provide different wireless connectivity ranges to sensors. For example, a first Hub 1900 may support a short range wireless interface providing a connectivity radius around the Hub 1900 of approximately 18 metres (approximately 60 feet) whilst a second Hub 1995 may support a long range wireless interface such as described above which provides for a radius of connectivity of approximately 300 meters (approximately 1000 feet). The first Hub 1900/1995 with short range wireless interface may, for example, be battery powered and/or connected to an external electrical power supply via a power converter (e.g. 110V 60 Hz AC mains to 12V DC). Exemplary dimensions of first Hub 1900/1995 may be 110 mm×150 mm×40 mm (approximately 4.3"×5.9"×1.6"). The second Hub 1995 with long range wireless interface may, for example, only support direct connection to a mains power supply (e.g. 110V 60 Hz mains) and have exemplary dimensions of 265×165×100 mm (approximately 10.4"×6.5"×3.9").

First Hub 1900 may allow a user to access and display real-time sensor data (for example (temperature, strength, temperature differentials, minimum-maximum values etc. in tabular and/or graphical formats) for those sensors connected to first Hub 1990. Second Hub 1995 provides data to an application upon a PED or other electronic device as well as pushing the acquired data from the sensors connected to the second Hub 1995 to remote storage (e.g. cloud based storage).

Optionally, each of the first Hub 1990 and second Hub 1995, in addition to automatically collecting sensor data and uploading it to the remote storage and therein a dashboard presented to a user upon an electronic device accessing the stored data, may also generate direct push notifications to electronic addresses associated with the first Hub 1990 and/or second Hub 1995 either directly or via a download from the remote storage such that once synchronized with electronic devices through a software application these electronic devices receive the push notifications directly. Such notifications may be configured as part of default settings of the Hub or they may be custom configured via a software application and communicated to the Hub either via a paired electronic device or via a download to a communications network to which the Hub is connected to provide the acquired data to the remote storage. These may relate, for example, to specified temperature thresholds and/or strength thresholds.

Further, the Hub allows for data to be collected continuously and/or periodically in hard to reach or hazardous locations.

Referring to FIG. 20 there are depicted first and second exemplary screenshots 2000A and 2000B of a software application for tagging and associating a booster/repeater assembly with a smartphone, for example, according to an embodiment of the invention. In first screenshot 2000A the user is employing the software application to capture the identity of the Booster, e.g., third Booster 1900C in FIG. 19, by capturing an image of a label comprising data in a machine readable format. Once captured and processed the smartphone, for example, decodes the data and establishes a wireless link (pairing) with the Booster. The machine readable format may include the identity of the booster so that the smartphone may communicate with it as the Booster may not broadcast its identity so that only devices, e.g., the smartphone, with its identity may associate with it. Once processed the software application displays second screenshot 2000B to the user indicating that the Booster has been detected and providing the user with the option to pair to the Booster.

Specific details are given in the above description to provide a thorough understanding of the embodiments. However, it is understood that the embodiments may be practiced without these specific details. For example, circuits may be shown in block diagrams in order not to obscure the embodiments in unnecessary detail. In other instances, well-known circuits, processes, algorithms, structures, and techniques may be shown without unnecessary detail in order to avoid obscuring the embodiments.

Implementation of the techniques, blocks, steps, and means described above may be done in various ways. For example, these techniques, blocks, steps, and means may be implemented in hardware, software, or a combination thereof. For a hardware implementation, the processing units may be implemented within one or more application specific integrated circuits (ASICs), digital signal processors (DSPs), digital signal processing devices (DSPDs), programmable logic devices (PLDs), field programmable gate arrays (FPGAs), processors, controllers, micro-controllers, microprocessors, other electronic units designed to perform the functions described above and/or a combination thereof.

Also, it is noted that the embodiments may be described as a process which is depicted as a flowchart, a flow diagram, a data flow diagram, a structure diagram, or a block diagram. Although a flowchart may describe the operations as a sequential process, many of the operations can be performed in parallel or concurrently. In addition, the order of the operations may be rearranged. A process is terminated when its operations are completed, but could have additional steps not included in the figure. A process may correspond to a method, a function, a procedure, a subroutine, a subprogram, etc. When a process corresponds to a function, its termination corresponds to a return of the function to the calling function or the main function.

Furthermore, embodiments may be implemented by hardware, software, scripting languages, firmware, middleware, microcode, hardware description languages and/or any combination thereof. When implemented in software, firmware, middleware, scripting language and/or microcode, the program code or code segments to perform the necessary tasks may be stored in a machine readable medium, such as a storage medium. A code segment or machine-executable instruction may represent a procedure, a function, a subprogram, a program, a routine, a subroutine, a module, a software package, a script, a class, or any combination of instructions, data structures and/or program statements. A code segment may be coupled to another code segment or a hardware circuit by passing and/or receiving information, data, arguments, parameters and/or memory content. Information, arguments, parameters, data, etc. may be passed, forwarded, or transmitted via any suitable means including memory sharing, message passing, token passing, network transmission, etc.

For a firmware and/or software implementation, the methodologies may be implemented with modules (e.g., procedures, functions, and so on) that perform the functions described herein. Any machine-readable medium tangibly embodying instructions may be used in implementing the methodologies described herein. For example, software codes may be stored in a memory. Memory may be implemented within the processor or external to the processor and may vary in implementation where the memory is employed in storing software codes for subsequent execution to that when the memory is employed in executing the software codes. As used herein the term "memory" refers to any type of long term, short term, volatile, nonvolatile, or other storage medium and is not to be limited to any particular type of memory or number of memories, or type of media upon which memory is stored.

Moreover, as disclosed herein, the term "storage medium" may represent one or more devices for storing data, including read only memory (ROM), random access memory (RAM), magnetic RAM, core memory, magnetic disk storage mediums, optical storage mediums, flash memory devices and/or other machine readable mediums for storing information. The term "machine-readable medium" includes, but is not limited to portable or fixed storage devices, optical storage devices, wireless channels and/or various other mediums capable of storing, containing, or carrying instruction(s) and/or data.

The methodologies described herein are, in one or more embodiments, performable by a machine which includes one or more processors that accept code segments containing instructions. For any of the methods described herein, when the instructions are executed by the machine, the machine performs the method. Any machine capable of executing a set of instructions (sequential or otherwise) that specify actions to be taken by that machine are included. Thus, a typical machine may be exemplified by a typical processing system that includes one or more processors. Each processor may include one or more of a CPU, a graphics-processing unit, and a programmable DSP unit. The processing system further may include a memory subsystem including main RAM and/or a static RAM, and/or ROM. A bus subsystem may be included for communicating between the components. If the processing system requires a display, such a display may be included, e.g., a liquid crystal display (LCD). If manual data entry is required, the processing system also includes an input device such as one or more of an alphanumeric input unit such as a keyboard, a pointing control device such as a mouse, and so forth.

The memory includes machine-readable code segments (e.g., software or software code) including instructions for performing, when executed by the processing system, one of more of the methods described herein. The software may reside entirely in the memory, or may also reside, completely or at least partially, within the RAM and/or within the processor during execution thereof by the computer system. Thus, the memory and the processor also constitute a system comprising machine-readable code.

In alternative embodiments, the machine operates as a standalone device or may be connected, e.g., networked to other machines, in a networked deployment, the machine may operate in the capacity of a server or a client machine in server-client network environment, or as a peer machine in a peer-to-peer or distributed network environment. The machine may be, for example, a computer, a server, a cluster of servers, a cluster of computers, a web appliance, a distributed computing environment, a cloud computing environment, or any machine capable of executing a set of instructions (sequential or otherwise) that specify actions to be taken by that machine. The term "machine" may also be taken to include any collection of machines that individually or jointly execute a set (or multiple sets) of instructions to perform any one or more of the methodologies discussed herein.

The foregoing disclosure of the exemplary embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the scope of the present invention.

What is claimed is:

1. A method comprising:

a) transmitting data from a sensor to a server connected to a network via a gateway also connected to the network;

b) determining whether the sensor established a link with the gateway;

c) upon a positive determination, executing a first process upon the sensor; and d) upon a negative determination, executing a second process upon the sensor;

wherein the data transmitted from the sensor to the gateway is via a first wireless link operating according to a first wireless protocol;

wherein the gateway relays the data to the server; and wherein the data transmitted from the sensor to the server relates to an environment within which the sensor is deployed.

2. The method according to claim 1, wherein the first process comprises:

e) transmitting data to the gateway, the data comprising at least one of all acquired data since the last transmission and all processed data since the last transmission, where the processed data is established by the sensor in dependence upon the acquired data;

f) turning off a first wireless transceiver employed to communicate with the gateway operating according to the first wireless protocol;

g) acquiring new data according to a third process in execution upon the sensor;

h) determining whether a first timer has expired;

i) upon a positive determination that the first timer has expired, stopping the first process and returning to step (a); and j) upon a negative determination that the first time has expired, returning to step (g).

3. The method according to claim 1, wherein the second process comprises:

e) turning off a first wireless transceiver employed to communicate with the gateway operating according to the first wireless protocol;

f) turning on a second wireless transceiver operating according to a second wireless protocol;

g) acquiring new data according to a third process in execution upon the sensor;

h) determining whether the sensor has been polled from an electronic device upon a channel associated with the second wireless protocol;

i) upon a negative determination that the sensor has been polled from the electronic device upon the channel associated with the second wireless protocol, returning to step (g);

j) upon a positive determination that the sensor has been polled from the electronic device upon the channel associated with the second wireless protocol, transmitting the data upon the channel associated with the second wireless protocol to the electronic device;

k) determining whether a first timer has expired;

l) Upon a positive determination that the first timer has expired, stopping the first process and returning to step (a); and j) upon a negative determination that the first timer has expired, returning to step (g).

4. A method comprising:

a) transmitting data from a sensor to a server connected to a network via a gateway also connected to the network;

b) determining whether the sensor is authenticated with the gateway;

c) upon a positive determination that the sensor is authenticated with the gateway, executing resetting a counter to zero and executing a first process upon the sensor from a first step of the first process; and d) upon a negative determination that the sensor is authenticated with the gateway, executing a first sequence comprising the steps of:

e) incrementing the counter;

f) determining whether the counter has exceeded a threshold value or not;

g) upon a positive determination, executing the first process upon the sensor from a second step of the first process; and h) upon a negative determination, executing a second process upon the sensor;

wherein the data transmitted from the sensor to the gateway is via a first wireless link operating according to a first wireless protocol;

wherein the gateway relays the data to the server; and wherein the data transmitted from the sensor to the server relates to an environment within which the sensor is deployed.

5. The method according to claim 4, wherein the first process comprises:

i) transmitting the data to the gateway, the data comprising at least one of all acquired data since the last transmission and all processed data since the last transmission, where step (i) is the first step of the first process and the processed data is established by the sensor in dependence upon the acquired data;

j) turning off a first wireless transceiver employed to communicate with the gateway operating according to the first wireless protocol, where step (j) is the second step of the first process;

k) acquiring new data according to a third process in execution upon the sensor;

l) Determining whether a first timer has expired;

m) upon a positive determination that the first timer has expired executing a second sequence comprising the steps of:

n) transmitting data to the gateway, the data comprising at least one of all acquired data since the last transmission and all processed data since the last transmission;

o) determining whether a second timer has expired;

p) upon a negative determination that the second timer has expired returning to step (i); and q) upon a positive determination that the second timer has expired returning to step (a).

6. The process according to claim 4, wherein the second process comprises:

n) turning off a first wireless transceiver employed to communicate with the gateway operating according to the first wireless protocol;

o) turning on a second wireless transceiver operating according to a second wireless protocol;

p) acquiring new data according to a third process in execution upon the sensor;

q) determining whether a second timer has expired;

r) upon a negative determination returning to step (p); and s) upon a positive determination returning to step (a).

7. A method comprising:

a) transmitting data from a sensor to a server connected to a network via a gateway also connected to the network, where the sensor transmits to the gateway with a transmitter operating according to a wireless protocol at an initial output power;

b) determining whether the sensor has established a first wireless link with the gateway;

c) upon a positive determination, storing a new initial output power where the new initial output power is the initial output power reduced by a first predetermined power offset and stopping the process;

d) upon a negative determination, executing a process comprising the steps of:

e) establishing an initial value of a counter to one;

f) incrementing the output power of the transmitter to a new output power where the new output power is the initial output power plus a value established in dependence upon the counter and a second predetermined power offset;

g) transmitting second data from a sensor to a gateway with a transmitter operating according to a wireless protocol at the new output power;

h) determining whether the sensor has established the first wireless link with the gateway;

i) upon a positive determination, storing the new initial output power where the new initial output power is the new output power reduced by a first predetermined power offset and stopping the process;

j) upon a negative determination, establishing whether the new output power is equal to or greater than a maximum output power;

k) upon a positive determination that the new output power is equal to or greater than the maximum output power, storing the new initial output power where the new initial output power is the new output power reduced by a first predetermined power offset and stopping the process; and l) Upon a negative determination that the new output power is equal to or greater than the maximum output power, incrementing the counter by one and proceeding to step f);

wherein the data transmitted from the sensor to the server relates to an environment within which the sensor is deployed.

8. A method comprising:

a) transmitting data from a sensor to a server connected to a network via a gateway also connected to the network;

b) tagging a sensor with an electronic device to acquire data relating to the sensor;

c) establishing a first wireless link according to a first wireless protocol between the sensor and the electronic device in dependence upon the data acquired through tagging;

d) determining whether the sensor supports a second wireless protocol in dependence upon the data acquired through tagging;

e) upon a positive determination, transmitting to a database stored upon a remote server an identity of the sensor established in dependence upon the data acquired through tagging;

f) monitoring by a gateway the database;

g) acquiring by the gateway the identity of the sensor from the database; and h) authenticating the sensor with the gateway in dependence upon communications between the sensor and the gateway according to the second wireless protocol;

wherein the first wireless protocol is different from the second wireless protocol; and wherein the data transmitted from the sensor to the server relates to an environment within which the sensor is deployed.

9. The method according to claim 8, further comprising:

prior to determining that the sensor supports the second wireless protocol upon establishing the first wireless link, executing a further process comprising the steps of:

transmitting further data to the electronic device from the sensor using the first wireless link; and authenticating the sensor;

wherein, upon authenticating the sensor, the process proceeds to step (c), otherwise the process stops.

10. A method comprising:

transmitting data from a sensor to a server connected to a network via a gateway also connected to the network;

wherein the device comprises:

a control circuit, and an RF circuit coupled to an antenna for receiving an output of a RF generator and generating a signal to be coupled to the antenna;

wherein the RF circuit comprises at least a tunable matching network coupled to the control circuit;

wherein the control circuit establishes the setting of the tunable matching network; and wherein the data transmitted from the sensor to the server relates to an environment within which the sensor is deployed.

* * * * *